US012155114B2

(12) United States Patent
Kwon

(10) Patent No.: US 12,155,114 B2
(45) Date of Patent: Nov. 26, 2024

(54) ELECTRONIC DEVICE INCLUDING ANTENNA

(71) Applicant: Samsung Electronics Co., Ltd., Gyeonggi-do (KR)

(72) Inventor: Hongil Kwon, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 17/939,391

(22) Filed: Sep. 7, 2022

(65) Prior Publication Data

US 2023/0058945 A1 Feb. 23, 2023

Related U.S. Application Data

(63) Continuation of application No. PCT/KR2022/012203, filed on Aug. 16, 2022.

(30) Foreign Application Priority Data

Aug. 18, 2021 (KR) ........................ 10-2021-0108710

(51) Int. Cl.
*H01Q 1/24* (2006.01)
*H01Q 1/48* (2006.01)
(Continued)

(52) U.S. Cl.
CPC ............... *H01Q 1/243* (2013.01); *H01Q 1/24* (2013.01); *H01Q 1/48* (2013.01); *H01Q 5/25* (2015.01);
(Continued)

(58) Field of Classification Search
CPC ............ H01Q 1/243; H01Q 1/24; H01Q 1/48; H01Q 9/0407; H01Q 21/065
See application file for complete search history.

(56) References Cited

U.S. PATENT DOCUMENTS 7,595,759 B2 9/2009 Schlub et al.
9,853,364 B2 * 12/2017 Zhai .................... H01Q 9/0421
(Continued)

FOREIGN PATENT DOCUMENTS

EP 2 999 046 A1 3/2016
JP 2020-88849 A 6/2020
(Continued)

OTHER PUBLICATIONS

International Search Report dated Nov. 30, 2022.

*Primary Examiner* — Hai V Tran
(74) *Attorney, Agent, or Firm* — Cha & Reiter, LLC

(57) ABSTRACT

According to certain embodiments, an electronic device comprises: a housing; and a printed circuit board positioned within the housing, and having a conductive pattern inside the printed circuit board, the printed circuit board having a first surface and a second surface opposite to the first surface, wherein the printed circuit board comprises: a first conductive layer located closer to the first surface than to the second surface and comprising a first antenna element and a second antenna element, wherein the first antenna element and the second antenna element are non-overlapping; a second conductive layer forming a ground plane and located closer to the second surface than the first conductive layer; and a dielectric located between the first conductive layer and the second conductive layer.

20 Claims, 29 Drawing Sheets

(51) Int. Cl.
*H01Q 5/25* (2015.01)
*H01Q 9/04* (2006.01)
*H01Q 21/06* (2006.01)

(52) U.S. Cl.
CPC ......... *H01Q 9/0407* (2013.01); *H01Q 21/065* (2013.01)

(56) References Cited

U.S. PATENT DOCUMENTS

| | | | | |
|---|---|---|---|---|
| 10,957,978 | B2 | 3/2021 | Cooper et al. | |
| 11,024,973 | B2 * | 6/2021 | Liu | H01Q 21/24 |
| 11,705,619 | B2 * | 7/2023 | Park | H01Q 5/48<br>343/893 |
| 2008/0314634 | A1 | 12/2008 | Kim et al. | |
| 2009/0256777 | A1 | 10/2009 | Nagai | |
| 2010/0007569 | A1 * | 1/2010 | Sim | H01Q 15/008<br>235/492 |
| 2010/0238072 | A1 * | 9/2010 | Ayatollahi | H01Q 21/28<br>343/700 MS |
| 2017/0141465 | A1 | 5/2017 | Sharawi | |
| 2020/0021011 | A1 * | 1/2020 | Cooper | G01S 3/48 |

FOREIGN PATENT DOCUMENTS

| | | | |
|---|---|---|---|
| KR | 10-2008-0050928 | A | 6/2008 |
| KR | 10-0838244 | B1 | 6/2008 |
| KR | 10-1238937 | B1 | 2/2013 |
| KR | 10-1760823 | B1 | 7/2017 |
| KR | 10-1852291 | B1 | 4/2018 |
| KR | 10-2021-0001976 | A | 1/2021 |

* cited by examiner

| | | |
|---|---|---|
| ANTENNA STRUCTURE (5) IN FIG. 7 | S11 | |
| | S12 | |
| | S22 | |
| ANTENNA STRUCTURE (1100) IN FIG. 11 | S11 | |
| | S12 | |
| | S22 | |

5

1100

ELECTRONIC DEVICE INCLUDING ANTENNA

CLAIM OF PRIORITY

This is a continuation application that is based on and claims priority under 35 U.S.C. 120 to PCT International Application No. PCT/KR2022/012203, which was filed on Aug. 16, 2022, and claims priority under 35 U.S.C. 119 to Korean Patent Application No. 10-2021-0108710, filed in the Korean Intellectual Property Office on Aug. 18, 2021.

BACKGROUND

1. Technical Field

Certain embodiments of the disclosure relate to an electronic device including an antenna.

2. Description of Related Art

An electronic device may include a plurality of antennas.

Electromagnetic effects between the plurality of antennas may degrade antenna radiation performance. For example, it may difficult to secure a spacing distance between each of the plurality of antennas due to the spatial constraints of electronic devices, such as smartphones. Accordingly, interference may occur between the plurality of antennas.

Certain embodiments of the disclosure may provide an electronic device with improved isolation with respect to an antenna.

The technical problems to be achieved in certain embodiments of the disclosure are not limited to the technical problems mentioned above, and other unmentioned technical problems based on the following description could be understood by those of ordinary skill in the art to which the disclosure belongs.

SUMMARY

According to certain embodiments, an electronic device comprises: a housing; and a printed circuit board positioned within the housing, and having a conductive pattern inside the printed circuit board, the printed circuit board having a first surface and a second surface opposite to the first surface, wherein the printed circuit board comprises: a first conductive layer located closer to the first surface than to the second surface and comprising a first antenna element and a second antenna element, wherein the first antenna element and the second antenna element are non-overlapping; a second conductive layer forming a ground plane and located closer to the second surface than the first conductive layer; and a dielectric located between the first conductive layer and the second conductive layer, and wherein the conductive pattern: electrically connects to the ground plane through one or more conductive vias included in the printed circuit board, is disposed between the first conductive layer and the second conductive layer, physically separated from the first conductive layer and the second conductive layer, at least partially overlaps with the first antenna element when viewed from above the first surface, and comprises an opening.

According to an embodiment, an antenna structure comprises: a printed circuit board comprising a first surface and a second surface opposite to the first surface; and a conductive pattern located inside the printed circuit board, wherein the printed circuit board comprises: a first conductive layer located closer to the first surface than to the second surface and comprising a first antenna element and a second antenna element, wherein the second antenna element is non-overlapping the first antenna element when viewed from above of the first surface; a second conductive layer forming a ground plane and located closer to the second surface than the first conductive layer; and a dielectric located between the first conductive layer and the second conductive layer, and wherein the conductive pattern is electrically connected to the ground plane through one or more conductive vias included in the printed circuit board, is located between the first conductive layer and the second conductive layer and physically separated from the first conductive layer and the second conductive layer, at least partially overlaps with the first antenna element when viewed from above the first surface, and comprises an opening.

DETAILED DESCRIPTION

An electronic device including an antenna according to certain embodiments of the disclosure can reduce antenna radiation degradation by improving isolation of the antenna.

The foregoing is not limiting. In addition, other effects obtainable or predicted by certain embodiments of the disclosure may be directly or implicitly provided in the detailed description of the embodiments of the disclosure.

Figure 1:
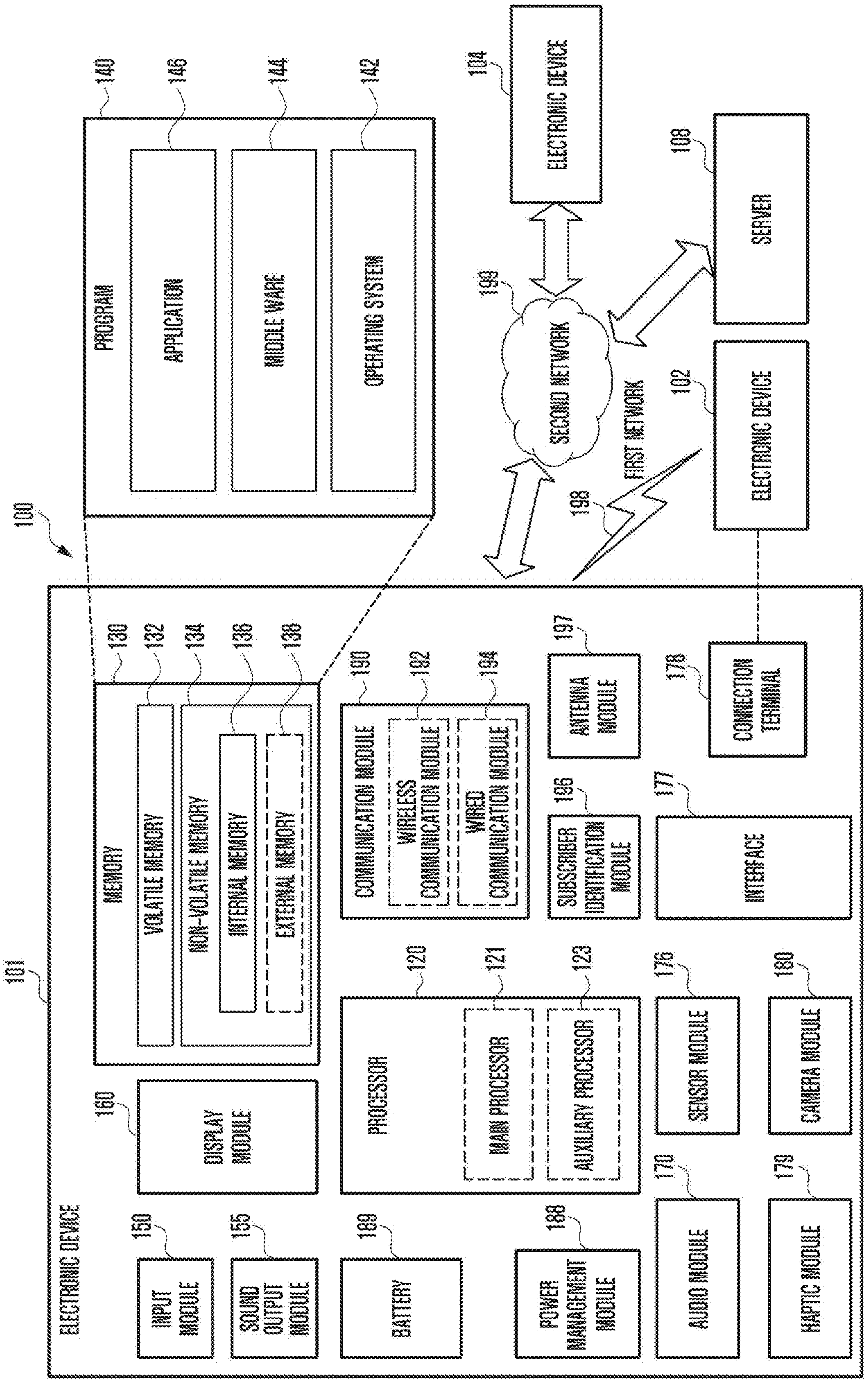
FIG. 1 is a block diagram of an electronic device in a network environment, according to one embodiment.

FIG. 1 describes an electronic device with an antenna. The electronic device can include an antenna module 197 including a plurality of antennas, wherein the plurality of antennas. According to certain embodiments, the plurality of antennas may have improved isolation.

Electronic Device

Hereinafter, certain embodiments disclosed herein will be described with reference to the accompanying drawings.

FIG. 1 is a block diagram of an electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

In this disclosure, the term "processor" shall refer to both the singular and plural contexts.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to certain embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). If an element (e.g., a first element) is referred to, with or without the term “operatively” or “communicatively,” as “coupled with,” “coupled to,” “connected with,” or “connected to” another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The electronic device 101 includes an antenna module 197. The antenna module 197 may include a plurality of antennas. The plurality of antennas may be a spacing distance between each thereof, in spite of the spatial constraints of electronic devices, such as smartphones. Accordingly, interference may be reduced between the plurality of antennas.

At least some various electronic components that provide implement the various modules, processor, memory, and the plurality of antennas may be disposed on a printed circuit board(s) or various other board assemblies disposed within, a housing. Moreover, in certain embodiments, portions of the housing may be used for certain functions.

Housing

Figure 2:
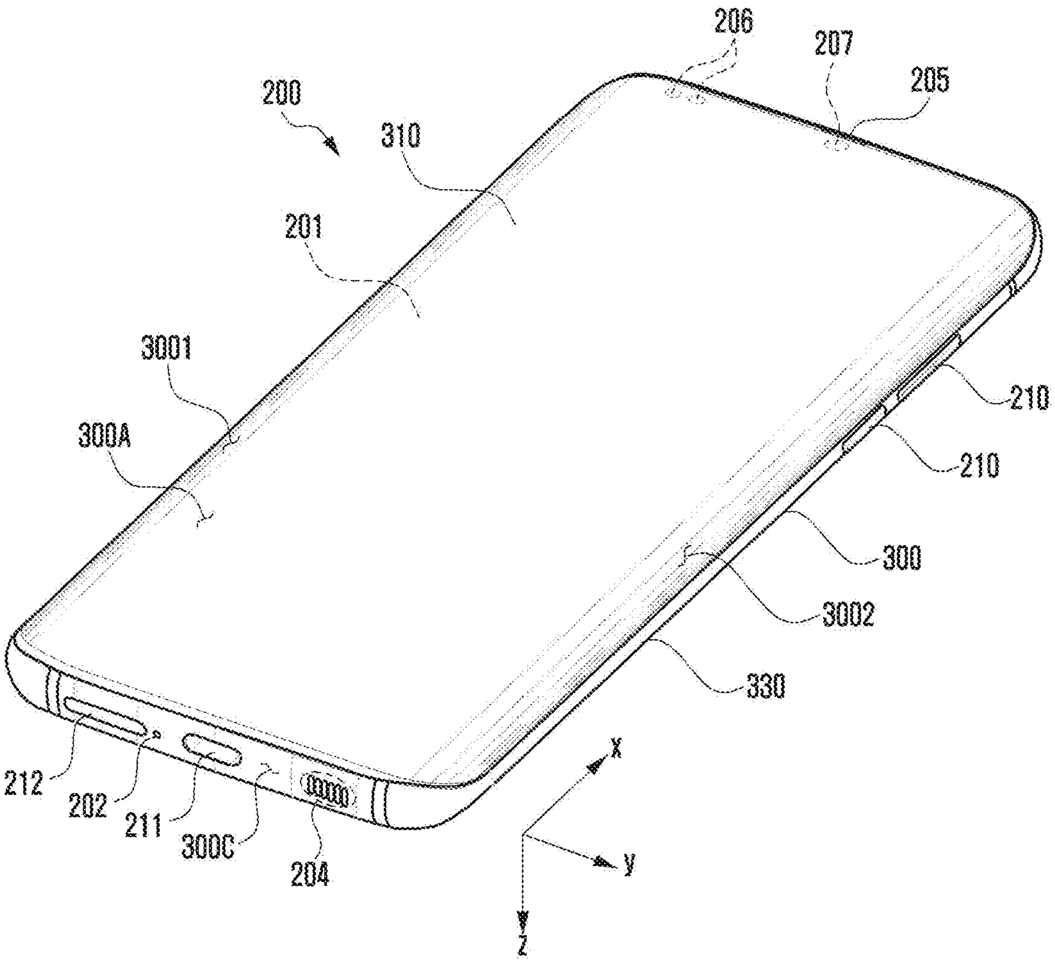
FIG. 2 is a front perspective view of an electronic device according to one embodiment.
Figure 3:
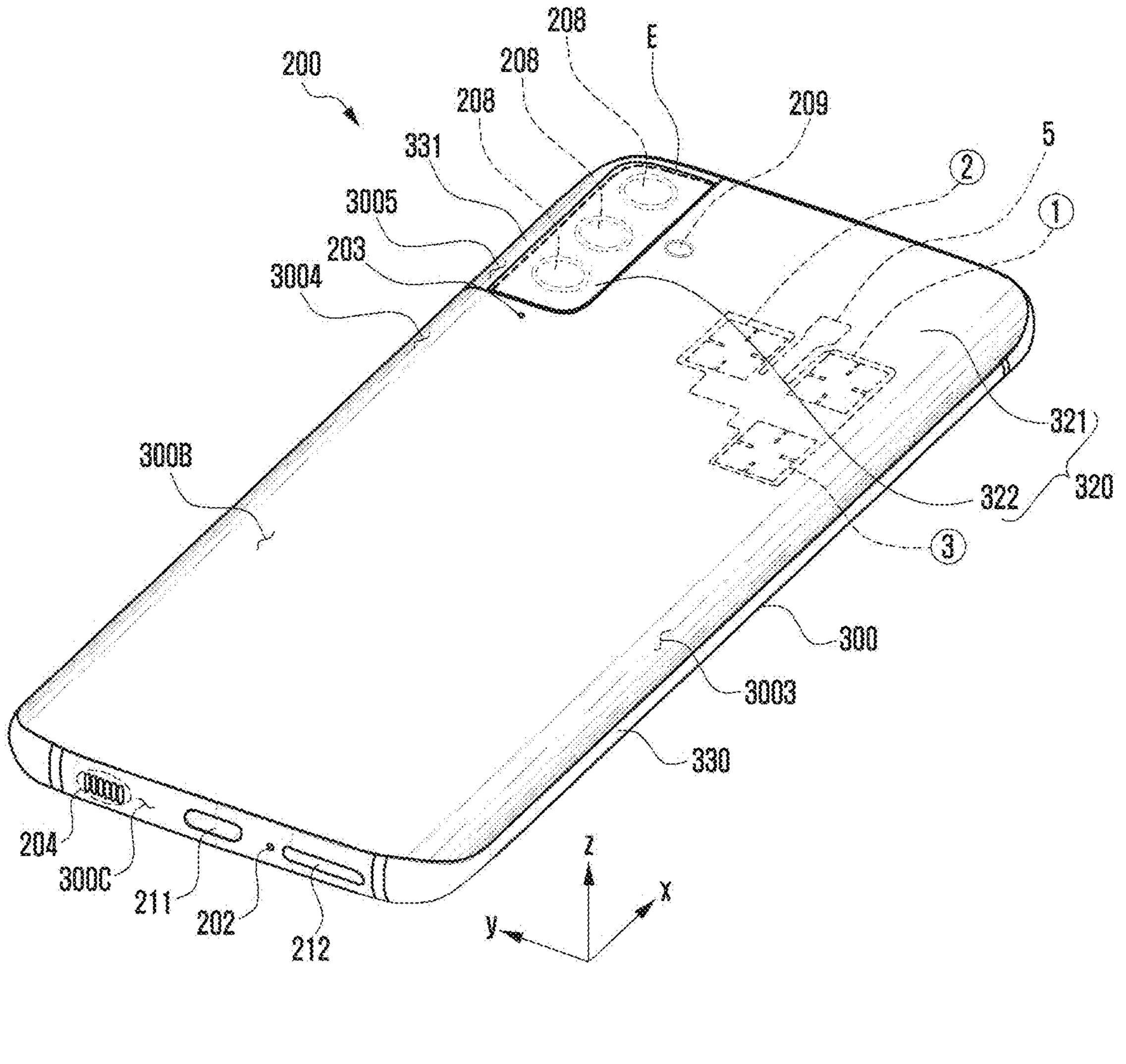
FIG. 3 is a rear perspective view of the electronic device in FIG. 2 according to one embodiment.

FIG. 2 is a front perspective view of an electronic device 200 according to one embodiment. FIG. 3 is a rear perspective view of the electronic device 200 in FIG. 2 according to one embodiment.

Referring to FIGS. 2 and 3, in one embodiment, the electronic device 200 (e.g., the electronic device 101 in FIG. 1) may include a housing 300 that provides an external appearance of the electronic device 200. The housing 300 may provide, for example, a front surface 300A of the electronic device 200, a rear surface 300B of the electronic device 200, and a side surface 300C of the electronic device 200 surrounding a space between the front surface 300A and the rear surface 300B. In an embodiment, a structure (e.g., a housing structure) that provides at least a portion of the front surface 300A, the rear surface 300B, and the side surface 300C may be referred to as the housing 300. In certain embodiments of the disclosure, for convenience of explanation, the direction in which the display 201 included in the electronic device 200 is visually exposed is defined as the front surface 300A of the electronic device 200, and the opposite direction is defined as the rear surface 300B of the electronic device 200.

The housing 300 may include a front plate 310, a rear plate 320, and/or a bezel structure 330. The front surface 300A of the electronic device 200 may be at least partially provided by the front plate 310. The front plate 310 may be substantially transparent and may include, for example, a glass plate or a polymer plate including various coating layers. The rear surface 300B of the electronic device 200 may be at least partially provided by the rear plate 320. In one embodiment, the rear plate 320 may include a first rear plate 321 providing a portion of the rear surface 300B, and a second rear plate 322 providing another portion of the rear surface 300B. The first rear plate 321 and the second rear plate 322 may be substantially opaque. The first rear plate 321 and/or the second rear plate 322 may be provided by, for example, coated or tinted glass, ceramic, polymer, metal, or a combination of at least two thereof. As another example, the first rear plate 321 and/or the second rear plate 322 may include aluminum, an aluminum alloy, magnesium, a magnesium alloy, or an alloy including iron (e.g., stainless steel). The bezel structure 330 may at least partially surround a space between the front plate 310 and the rear plate 320. The side surface 300C of the electronic device 200 may be at least partially provided by the bezel structure 330. In an embodiment, the bezel structure 330 may be referred to as a "side bezel structure" or a "side member" as an element that substantially provides the side surface 300C of the electronic device 200. The bezel structure 330 may include, for example, a metal and/or a polymer.

The front plate 302 may include a first curved portion 3001 and a second curved portion 3002 which are curved and seamlessly extend from the front surface 300A toward the rear surface 300B. The first curved portion 3001 and the second curved portion 3002 may be provided adjacent to both edges of the front plate 310 positioned opposite to each other. The first curved portion 3001 and the second curved portion 3002 may be disposed symmetrically with a flat portion (not shown) of the front plate 310 interposed therebetween.

The first rear plate 321 may include a third curved portion 3003 and a fourth curved portion 3004 which are curved and seamlessly extend from the rear surface 300B toward the front surface 300A. The third curved portion 3003 may be provided adjacent to one edge of the first rear plate 321 to correspond to the first curved portion 3001 of the front plate 310. The fourth curved portion 3004 may be provided adjacent to the other edge of the first rear plate 321 to correspond to the second curved portion 3002 of the front plate 310. In one embodiment, a portion 331 of bezel structure 330 may include a fifth curved portion 3005 smoothly connected to the fourth curved portion 3004 of the first rear plate 321 to correspond to the second curved portion 3002 of the front plate 310. For example, a curved portion on one side including the fourth curved portion 3004 and the fifth curved portion 3005 may be disposed to be symmetrical with the third curved portion 3003 on the other side. In one embodiment, the second rear plate 322 may be positioned to correspond to the fifth curved portion 3005. For example, the portion 331 of the bezel structure 330 that provides the fifth curved portion 3005 may extend along partial edges (the edges along a dotted line indicated by reference numeral "E") by the second rear plate 322 of the edge (or border) of the rear plate 320 and be brought into contact with the second rear plate 322. In an embodiment, the fifth curved portion 3005 may be provided by the first rear plate 321 or the second rear plate 322. In an embodiment, the first rear plate 321 and the second rear plate 322 may be provided integrally with each other. In an embodiment, the first rear plate 321 and/or the second rear plate 322 may be provided integrally with the bezel structure 330 and may be made of the same material (e.g., a metal material such as aluminum) as the bezel structure 330.

The housing 300 may be implemented without at least one of the first curved portion 3001, the second curved portion 3002, the third curved portion 3003, or a curved portion including the fourth curved portion 3004 and the fifth curved portion 3005.

The electronic device 200 may include at least one of a display 201, a first audio module 202, a second audio module 203, a third audio module 204, a fourth audio module 205, a sensor module 206, a first camera module 207, a plurality of second camera modules 208, a light emitting module 209, an input module 210, a first connection terminal module 211, or a second connection module 212. In an embodiment, at least one of the above components may be omitted from the electronic device 200 or another component may be added to the electronic device 200.

A display area (e.g., a screen display area or an active area) of the display 201 may be visually exposed through, for example, the front plate 310. In one embodiment, the electronic device 200 may be implemented such that the display area visible through the front plate 310 is displayed as large as possible (e.g., a large screen or a full screen). For example, the display 201 may be implemented to have an outer shape substantially the same as the outer shape of the front plate 310. As another example, a distance between the outer periphery of the display 201 and the outer periphery of the front plate 310 may be substantially the same. In one embodiment, the display 201 may include touch sensing circuit. In an embodiment, the display 201 may include a pressure sensor capable of measuring the intensity (pressure) of a touch. In an embodiment, the display 201 may be coupled to or positioned adjacent to a digitizer (e.g., an electromagnetic induction panel) that detects a magnetic field type electronic pen (e.g., a stylus pen).

The first audio module 202 may include, for example, a first microphone positioned inside the electronic device 200 and a first microphone hole provided on the side surface 300C to correspond to the first microphone. The second audio module 203 may include, for example, a second microphone positioned inside the electronic device 200 and a second microphone hole provided on the rear surface 300B to correspond to the second microphone. The second microphone hole may be provided in, for example, the first rear plate 321. In an embodiment, the second microphone hole may be provided in the second rear plate 322. The positions or number of the audio modules with respect to the microphones are not limited to the illustrated example and may vary. In an embodiment, the electronic device 200 may include a plurality of microphones used to detect the direction of sound.

The third audio module 204 may include, for example, a first speaker positioned inside the electronic device 200 and a first speaker hole provided on the side surface 300C to correspond to the first speaker. The fourth audio module 205 may include, for example, a second speaker positioned inside the electronic device 200 and a second speaker hole provided on the front surface 300A to correspond to the second speaker. In one embodiment, the first speaker may include an external speaker. In one embodiment, the second speaker may include a call receiver, and the second speaker hole may be referred to as a receiver hole. The positions or number of the third audio modules 204 or the fourth audio module 205*s* are not limited to the illustrated example and may vary. In an embodiment, the microphone hole and the speaker hole may be implemented by one hole. In an embodiment, the third audio module 204 or the fourth audio module 205 may include a piezo speaker without a speaker hole.

The sensor module 206 may generate signal or a data value corresponding to, for example, an internal operating state or an external environmental state of the electronic device 200. In one embodiment, the sensor module 206 may include an optical sensor positioned inside the electronic device 200 to correspond to the front surface 300A. The optical sensor may include, for example, a proximity sensor or an illuminance sensor. The optical sensor may be aligned with an opening provided in the display 201. External light may be introduced into the optical sensor through the opening of the front plate 310 and the display 201. In an embodiment, the optical sensor may be disposed on the lower end of the display 201, and the optical sensor may perform a related function while the position thereof is not visually distinguished (or exposed). For example, the optical sensor may be positioned on the rear surface of the display 201, or below or beneath the display 201. In an embodiment, the optical sensor may be positioned aligned with a recess provided in the rear surface of the display 201. The optical sensor may be disposed to at least partially overlap with the screen to perform a sensing function without being exposed to the outside. In this case, a partial area of the display 201 at least partially overlapping with the optical sensor may include a pixel structure and/or a wiring structure different from other areas. For example, the partial area of the display 201 at least partially overlapping with the optical sensor may have pixel density different from other areas. In an embodiment, a plurality of pixels may not be disposed in a partial area of the display 201 at least partially overlapping with the optical sensor. In an embodiment, the electronic device 200 may include a biosensor (e.g., a fingerprint sensor) positioned below the display 201. The biosensor may be implemented by an optical method, an electrostatic method, or an ultrasonic method, and the position or number thereof may vary. The electronic device 200 may further include at least one of various other sensor modules, for example, a gesture sensor, a gyro sensor, a barometric pressure sensor, a magnetic sensor, an acceleration sensor, a grip sensor, a color sensor, an infrared (IR) sensor, a temperature sensor, or a humidity sensor.

The first camera module 207 (e.g., a front camera module) may be located for example, inside the electronic device 200 to correspond to the front surface 300A. The plurality of second camera modules 208 (e.g., rear camera modules) may be located, for example, inside the electronic device 200 to correspond to the rear surface 300B. In one embodiment, the plurality of second camera modules 208 may be positioned to correspond to the second rear plate 322. The first camera module 207 and/or the plurality of second camera modules 208 may include one or more lenses, an image sensor, and/or an image signal processor. The positions or number of the first camera modules or the second camera modules are not limited to the illustrated example and may vary.

The display 201 may include an opening aligned with the first camera module 207. External light may reach the first camera module 207 through the opening of the display 201 and the front plate 310. In an embodiment, the opening of the display 201 may be provided in the form of a notch according to the position of the first camera module 207. In an embodiment, the first camera module 207 may be disposed on the lower end of the display 201, and the first camera module 207 may perform a related function (e.g., image shooting) while the position thereof is not visually distinguished (or exposed). For example, the first camera module 207 may be located on the rear surface of the display 201 or below or beneath the display 201, and may include a hidden display rear camera (e.g., an under display camera (UDC)). In an embodiment, the first camera module 207 may be positioned aligned with a recess provided in the rear surface of the display 201. The first camera module 207 may be disposed to at least partially overlap with the screen, and may acquire an image of an external subject without being visually exposed to the outside. In this case, a partial area of the display 201 at least partially overlapping with the first camera module 207 may include a pixel structure and/or a wiring structure different from other areas. For example, the partial area of the display 201 at least partially overlapping with the first camera module 207 may have a pixel density different from other areas. The pixel structure and/or wiring structure provided in the partial area of the display 201 at least partially overlapping with the first camera module 207 may reduce light loss between the first camera module 207 and the outside thereof. In an embodiment, pixels may not be disposed in a partial area of the display 201 at least partially overlapping with the first camera module 207. In an embodiment, the electronic device 200 may further include a light emitting module (e.g., a light source) positioned inside the electronic device 200 to correspond to the front surface 300A. The light emitting module may provide, for example, state information of the electronic device 200 in the form of light. In an embodiment, the light emitting module may provide a light source that interworks with the operation of the first camera module 207. The light emitting module may include, for example, an LED, an IR LED, or a xenon lamp.

The plurality of second camera modules 208 may have different properties (e.g., angle of view) or functions, and may include, for example, a dual camera or a triple camera. The plurality of second camera modules 208 may include a plurality of camera modules including lenses having different angles of view, and the electronic device 200 may perform control such that the angle of view of the camera module performed by the electronic device 200 is changed based on a user's selection. The plurality of second camera modules 208 may include at least one of a wide-angle camera, a telephoto camera, a color camera, a monochrome camera, or an infrared (IR) camera (e.g., a time of flight (TOF) camera, a structured light camera). In an embodiment, the IR camera may also be operated as at least part of a sensor module. The light emitting module 209 (e.g., a flash) may include a light source for the plurality of second camera modules 208. The light emitting module 209 may include, for example, an LED or a xenon lamp.

The input module 210 may include, for example, one or more key input devices. One or more key input devices may be positioned, for example, in an opening provided in the side surface 300C. In an embodiment, the electronic device 200 may not include some or all of the key input devices, and the key input device 317 that is not included on the electronic device 201 may be implemented as a soft key by using the display 201. The positions or number of input modules 210 may vary, and in an embodiment, the input module 210 may include at least one sensor module.

The first connection terminal module 211 (e.g., a first connector module or a first interface terminal module) may include, for example, a first connector (or a first interface terminal) located inside the electronic device 200, and a first connector hole provided on the side surface 300C corresponding to the first connector. The second connection terminal module 212 (e.g., a second connector module or a second interface terminal module) may include, for example, a second connector (or a second interface terminal) located inside the electronic device 200, and a second connector hole provided on the side surface 300C to correspond to the second connector. The electronic device 200 may transmit and/or receive power and/or data to and/or from an external electronic device electrically connected to the first connector or the second connector. In one embodiment, the first connector may include a universal serial bus (USB) connector or a high-definition multimedia interface (HDMI) connector. In one embodiment, the second connector may include a connector for a memory card (e.g., a secure digital (SD) memory card or a subscriber identity module (SIM) card). In an embodiment, the second connector may include an audio connector (e.g., a headphone connector or an earphone connector). The positions or number of the connection terminal modules are not limited to the illustrated example and may vary.

The electronic device 200 may include an antenna structure 5 positioned inside the housing 300. For example, the electronic device 200 may perform a positioning function (e.g., angle of arrival (AOA)) for a signal source (e.g., a responder, a transmitter, or a Tx device) by using the antenna structure 5. The electronic device 200 may include a wireless communication circuit (e.g., the wireless communication module 192 in FIG. 1) electrically connected to the antenna structure 5, and a processor (e.g., the processor 120 in FIG. 1) electrically connected to the wireless communication circuit. The processor may simultaneously perform positioning (AOA) for measuring an angle and positioning (ranging) for measuring a distance. In one embodiment, the processor may identify (or estimate) the distance between the electronic device and the signal source by using a first antenna element ①. In one embodiment, the processor may identify (or estimate) a reception angle of a signal (e.g., the direction of the signal) on the configured axis of the electronic device 200 through at least two antenna elements (e.g., a first antenna element ① and a second antenna element ②, or a first antenna element ① and a third antenna element ③) of the antenna structure 5 by using at least one of a difference in arrival time of a response message to a request message, a difference in arrival distance between received signals, or a phase difference. The electronic device 200 may support a positioning function by using a broadband bandwidth (e.g., UWB). The UWB is a technology that conforms to, for example, the international standard of IEEE 802.15.4 and may refer to a technology for communicating with a broadband bandwidth. In one embodiment, the electronic device 200 (e.g., an initiator, a receiver, or a receiver (Rx) device) may identify or estimate the position of a signal source (e.g., a responder, a transmitter, or a transmitter (Tx) device) by using the phase difference of the signal received through the plurality of antenna elements (e.g., the first antenna element ①, the second antenna element ②, and the third antenna element ③) included in the antenna structure 5. The antenna structure 5 may be implemented as a printed circuit board (e.g., a flexible printed circuit board (FPCB)), and the plurality of antenna elements ①, ②, and ③ may include a patch antenna.

According to various embodiments, the housing 300 may include the antenna structure 5.

The electronic device 200 may further include various components according to the provided type thereof. Although it is not possible to enumerate all of the components due to various variations according to the convergence trend of the electronic device 200, components equivalent to the above-mentioned components may be additionally added to the electronic device 200. In certain embodiments, specific components may be excluded from the above components or replaced with other components according to the provided type.

Interior of the Housing

Figure 4:
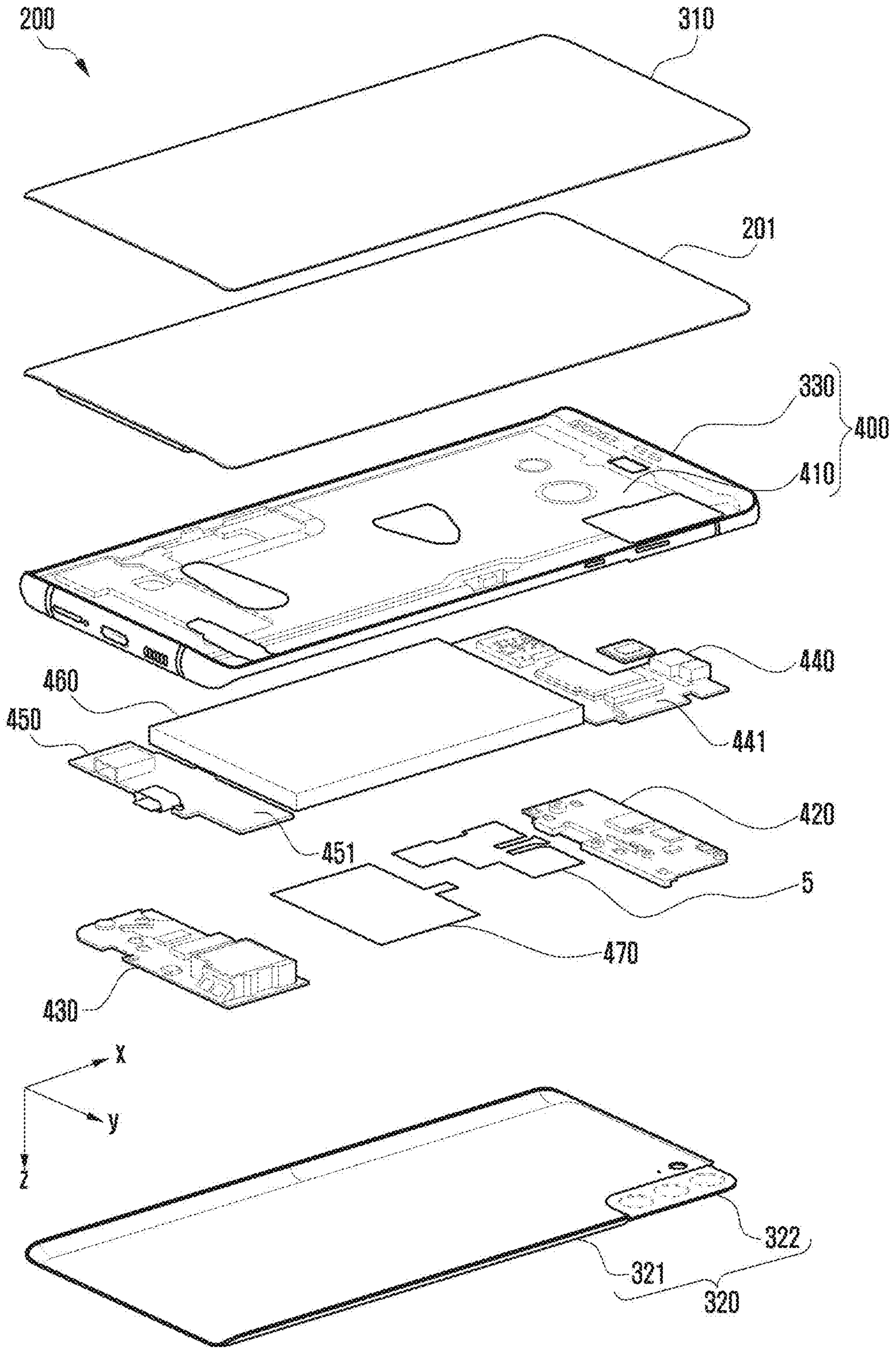
FIGS. 4 and 5 are exploded perspective views of an electronic device according to one embodiment.
Figure 5:
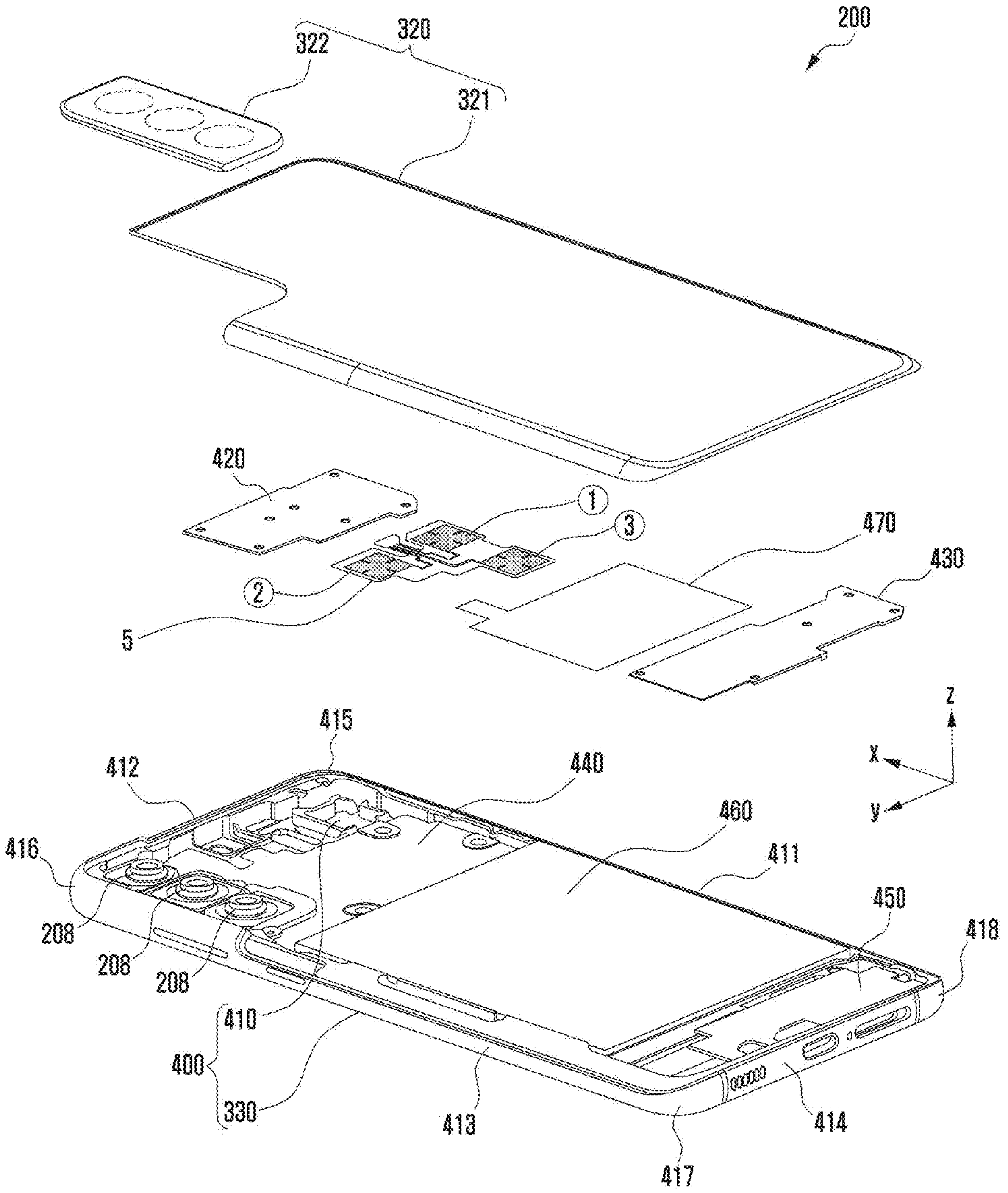

FIGS. 4 and 5 are exploded perspective views of an electronic device 200 according to one embodiment.

Referring to FIGS. 4 and 5, in one embodiment, the electronic device 200 may include a front plate 310, a rear plate 320, a bezel structure 330, a first support member 410, a second support member 420, and a third support member 430, a display 201, a first board assembly 440, a second board assembly 450, a battery 460, or a plurality of antenna structures 470 and 5. In an embodiment, at least one of the components may be omitted from the electronic device 200 or another component may be added to the electronic device 200.

The bezel structure (or side member) 330 may include a first bezel portion (or a first side portion) 411, a second bezel portion (or a second side portion) 412, a third bezel portion (or a third side portion) 413, or a fourth bezel portion (or a fourth side portion) 414. The first bezel portion 411 and the third bezel portion 413 may extend in parallel to be spaced apart from each other. The second bezel portion 412 may connect one end of the first bezel portion 411 and one end of the third bezel portion 413. The fourth bezel portion 414 may connect the other end of the first bezel portion 411 and the other end of the third bezel portion 413, and may extend in parallel to be spaced apart from the second bezel portion 412. A first corner portion 415 to which the first bezel portion 411 and the second bezel portion 412 are connected, a second corner portion 416 to which the second bezel portion 412 and the third bezel portion 413 are connected, a third corner portion 417 to which the third bezel portion 413 and the fourth bezel portion 414 are connected, and/or a fourth corner portion 418 to which the first bezel portion 411 and the fourth bezel portion 414 are connected may have at least a portion provided in a round shape. The first bezel portion 411 and the third bezel portion 413 may have a first length extending in the x-axis direction, and the second bezel portion 412 and the fourth bezel portion 414 may have a second length extending in the y-axis direction and less than the first length. In an embodiment, the first length and the second length may be provided substantially to be equal. The first support member 410 may be located inside the electronic device 200 to be connected to the bezel structure 330, or may be integrally formed with the bezel structure 330. The first support member 410 may be formed of, for example, a metal material and/or a non-metal material (e.g., a polymer). In one embodiment, a conductive portion included in the first support member 410 may serve as electromagnetic shielding for the display 201, the first board assembly 440, and/or the second board assembly 450. A configuration including the first support member 410 and the bezel structure 330 may be referred to as a front case 400. The first support member 410 is a portion of the front case 400 on which components such as a display 201, a first board assembly 440, a second board assembly 450, or a battery 460 are disposed, and may contribute to the durability or stiffness (e.g., torsional stiffness) of the electronic device 200. In an embodiment, the first support member 410 may be referred to as a "bracket", a "mounting plate", or a "support structure". In an embodiment, the first support member 410 may be defined as a part of the housing 300 (see FIG. 2).

The display 201 may be positioned between, for example, the first support member 410 and the front plate 310, and may be disposed on one surface of the first support member 410. In one embodiment, the front plate 310 and the display 201 may be integrally formed with each other. The first board assembly 440 and the second board assembly 450 may be positioned between, for example, the first support member 410 and the rear plate 320, and may be disposed on the other surface of the first support member 410. The battery 460 may be positioned between, for example, the first support member 410 and the rear plate 320, and may be disposed on the first support member 410.

The first board assembly 440 may include a first printed circuit board 441 (e.g., a printed circuit board (PCB), or a printed circuit board assembly (PBA)). The first board assembly 440 may include various electronic components electrically connected to the first printed circuit board 441. The electronic components may be disposed on the first printed circuit board 441 or may be electrically connected to the first printed circuit board 441 through an electrical path such as a cable or a flexible printed circuit board (FPCB). Referring to FIGS. 2 and 3, the electronic components may include, for example, a second microphone included in the second audio module 203, a second speaker included in the fourth audio module 205, a sensor module 206, a first camera module 207, a plurality of second camera modules 208, a light emitting module 209, or an input module 210.

The second board assembly 450 may be spaced apart from the first board assembly 440 with the battery 460 interposed therebetween when viewed from above the front plate 310 (e.g., when viewed in the +z-axis direction). The second board assembly 450 may include a second printed circuit board 451 electrically connected to the first printed circuit board 441 of the first board assembly 440. The second board assembly 450 may include various electronic components electrically connected to the second printed circuit board 451. The electronic components may be disposed on the second printed circuit board 451 or may be electrically connected to the second printed circuit board 451 through an electrical path such as a cable or FPCB. Referring to FIGS. 2 and 3, the electronic components may include, for example, a first microphone included in the first audio module 202, a first speaker included in the third audio module 204, a first connector included in the first connection terminal module 211, or a second connector included in the second connection terminal module 212.

The first board assembly 440 or the second board assembly 450 may include a primary PCB (e.g., the primary PCB 611 in FIG. 6) (or a main PCB or a master PCB), a secondary PCB (e.g., the secondary PCB 612 in FIG. 6) (or a slave PCB) disposed to partially overlap with the primary PCB, and/or an interposer substrate (e.g., the interposer substrate 613 in FIG. 6) between the primary PCB and the secondary PCB.

The battery 460 is a device for supplying power to at least one component of the electronic device 200 and may include, for example, a non-rechargeable primary battery, a rechargeable secondary battery, or a fuel cell. The battery 460 may be integrally disposed inside the electronic device 200, or may be disposed to be attachable to or detachable from the electronic device 200.

The second support member 420 may be positioned between the first support member 410 and the rear plate 320, and may be coupled to the first support member 410 and/or the first board assembly 440 by using a fastening element such as a bolt (or screw). At least a portion of the first board assembly 440 may be positioned between the first support member 410 and the second support member 420, and the second support member 420 may cover and protect the first board assembly 440. The third support member 430 may be at least partially spaced apart from the second support member 420 with the battery 460 interposed therebetween when viewed from above the rear plate 320 (e.g., when viewed in the −z axis direction). The third support member 430 may be positioned between the first support member 410 and the rear plate 320, and may be coupled to the first support member 410 and/or the second board assembly 450 by using a fastening element such as a bolt (or screw). At least a portion of the second board assembly 450 may be positioned between the first support member 410 and the third support member 430, and the third support member 430 may cover and protect the second board assembly 450. The second support member 420 and/or the third support member 430 may be formed of a metal material and/or a non-metal material (e.g., a polymer). In an embodiment, the second support member 420 may serve as electromagnetic shielding for the first board assembly 440, and the third support member 430 may serve as electromagnetic shielding for the second board assembly 450. In an embodiment, the second support member 420 and/or the third support member 430 may be referred to as a rear case. In an embodiment, the second support member 420 and/or the third support member 430 may be defined as part of the housing 300 (see FIG. 2).

According to an embodiment, an integrated board assembly including the first board assembly 440 and the second board assembly 450 may be implemented. For example, the board assembly may include a first portion and a second portion spaced apart from each other with the battery 460 therebetween, and a third portion extending between the battery 460 and the bezel structure 330 and connecting the first portion and the second portion, when viewed from above the rear plate 320 (e.g., when viewed in the −z-axis direction). The third portion may be implemented to be substantially rigid. In an embodiment, the third portion may be implemented to be substantially flexible. In an embodiment, a single support member including the second support member 420 and the third support member 430 may be implemented.

The second support member 420 (e.g., a rear case) may include a non-conductive member (not shown) formed of a non-metal material (e.g., a polymer), and/or a plurality of conductive patterns (not shown) disposed on the non-conductive member. For example, the conductive pattern may be implemented by laser direct structuring (LDS). The LDS may be, for example, a method in which a pattern is drawn (or designed) on a non-conductive member using a laser, and a conductive material such as copper or nickel is plated thereon to form a conductive pattern. The plurality of conductive patterns may be electrically connected to a wireless communication circuit (e.g., the wireless communication module 192 in FIG. 1) included in the first board assembly 440 to operate as an antenna radiator. In one embodiment, at least a partial conductive part included in the bezel structure 330 may operate as an antenna radiator electrically connected to a wireless communication circuit. The wireless communication circuit may process a transmission signal or a reception signal in at least one selected or designated frequency band through the at least one antenna radiator. The selected or designated frequency band may include at least one of, for example, low band (LB) (about 600 MHz to about 1 GHz), middle band (MB) (about 1 GHz to about 2.3 GHz), high band (HB) (about 2.3 GHz to about 2.7 GHz), or an ultra-high band (UHB) (about 2.7 GHz to about 6 GHz). The designated frequency band may include various other frequency bands.

The antenna structure 470 may be positioned at least partially between the battery 460 and the rear plate 320. The antenna structure 470 may be implemented in the form of a film such as, for example, an FPCB. The antenna structure 470 may include at least one conductive pattern used as a loop-type radiator. For example, the at least one conductive pattern may include a planar spiral conductive pattern (e.g., a planar coil or a pattern coil). At least one conductive pattern included in the antenna structure 470 may be electrically connected to a wireless communication circuit (or a wireless communication module) included in the first board assembly 440. For example, the at least one conductive pattern may be utilized for short-range wireless communication such as near field communication (NFC). As another example, the at least one conductive pattern may be utilized for magnetic secure transmission (MST) for transmitting and/or receiving a magnetic signal. In an embodiment, at least one conductive pattern included in the antenna structure 470 may be electrically connected to a power transmission/reception circuit included in the first board assembly 440. The power transmission/reception circuit may wirelessly receive power from an external electronic device or wirelessly transmit power to the external electronic device by using at least one conductive pattern. The power transmission/reception circuit may include a power management module, for example, a power management integrated circuit (PMIC) or a charger integrated circuit (IC). The power transmission/reception circuit may charge the battery 460 by using power wirelessly received using a conductive pattern.

The antenna structure 5 including the plurality of antenna elements ①, ②, and ③ may be positioned at least partially between the first board assembly 440 and the rear plate 320.

In an embodiment, the antenna structure 5 may be positioned between the second support member 420 and the battery 460 when viewed from above the rear plate 320 (e.g., when viewed in the −z axis direction). The antenna structure 5, when viewed from above the rear plate 320, may be disposed so as not to substantially overlap with a second support member 420, another antenna structure 470, a battery 460, a plurality of second camera modules 208, or a light emitting module 209. For example, the antenna structure 5 may not substantially overlap with a plurality of conductive patterns among the second support members 420 used as an antenna radiator, or a conductive pattern of another antenna structure 470 when viewed from above the rear plate 320.

The plurality of antenna elements ①, ②, ③ may have different sizes or shapes. The size of the plurality of antenna elements ①, ②, ③ may be determined in consideration of the resonant frequency band of the antenna structure 5. In one embodiment, although the antenna structure 5 is described as including the first antenna element ①, the second antenna element ②, and the third antenna element ③, the antenna structure 5 is not limited thereto. For example, the antenna structure 5 may include a larger number of antennas.

The electronic device 200 has a bar-type or plate-type external appearance, but is not limited thereto. For example, the electronic device 200 may be one of a foldable electronic device, a slidable electronic device, a stretchable electronic device, and/or a rollable electronic device.

Figure 6:
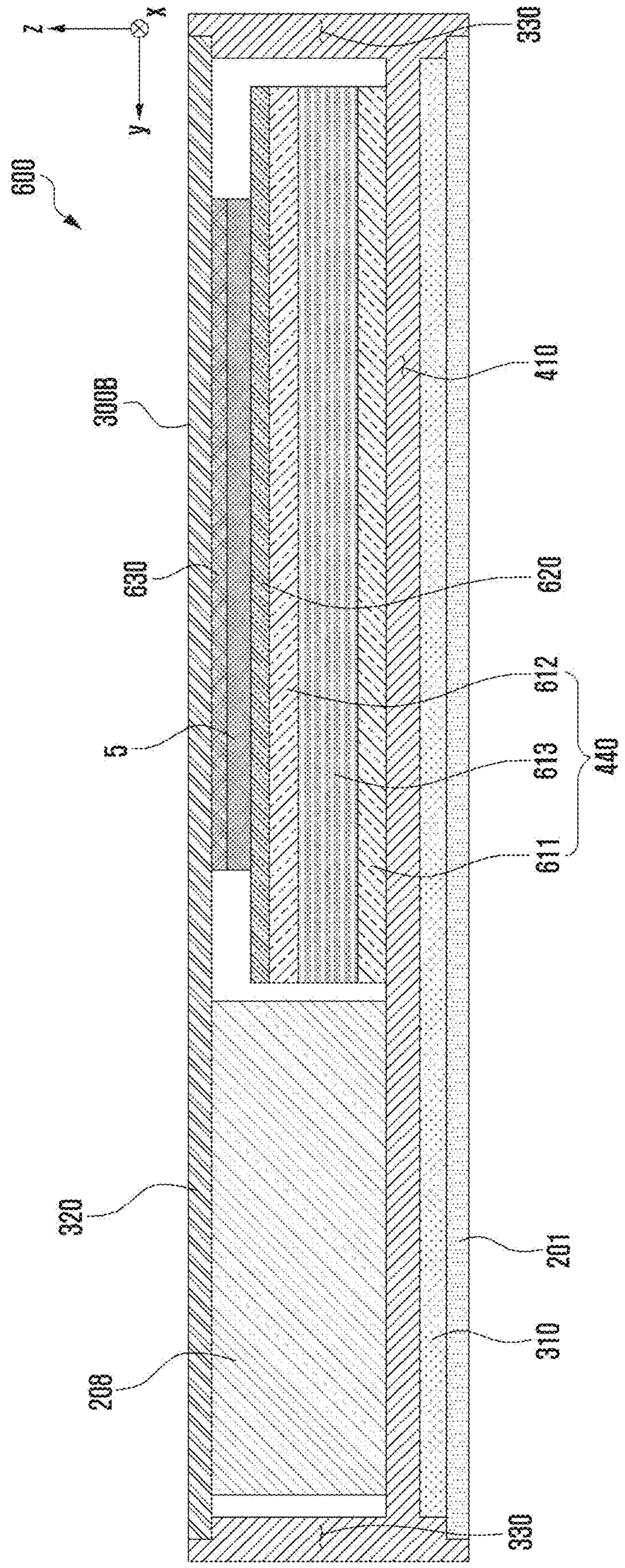
FIG. 6 is a cross-sectional view illustrating a portion of the electronic device illustrated in FIG. 3, according to one embodiment.

FIG. 6 is a cross-sectional view 600 illustrating a portion of the electronic device 200 according to one embodiment. The antenna structure 5 may be disposed closer to the rear plate 320 than the front plate 310.

Referring to FIG. 6, the electronic device 200 may include a bezel structure 330, a first support member 410, a front plate 310, a rear plate 320, a display 201, a plurality of second camera modules 208, a first board assembly 440, an antenna structure 5, a cover member 620, or a buffer member 630. The display 201 may be positioned between the first support member 410 and the front plate 310. The plurality of second camera modules 208, the first board assembly 440, the antenna structure 5, the cover member 620, or the buffer member 630 may be located between the first support member 410 and the rear plate 320. In one embodiment, the cover member 620 may be positioned between the first board assembly 440 and the rear plate 320. The antenna structure 5 may be positioned at least partially between the cover member 620 and the rear plate 320. The buffer member 630 may be positioned between the antenna structure 5 and the rear plate 320. The second camera modules 208 may not substantially overlap with the first board assembly 440, the cover member 620, the antenna structure 5, or the buffer member 630 when viewed from above the rear plate 320 (e.g., when viewed in the −z axis direction).

The first board assembly 440 may include a primary PCB 611, a secondary PCB 612, and an interposer substrate 613 between the primary PCB 611 and the secondary PCB 612. The primary PCB 611 may be disposed on the first support member 410. The secondary PCB 612 may be disposed at least partially overlapping with the primary PCB 611 when viewed from above the rear plate 320 (e.g., when viewed in the −z axis direction). The interposer substrate 613 may electrically connect the primary PCB 611 and the secondary PCB 612. The interposer substrate 613 may include, for example, a plurality of conductive vias (not shown) electrically connecting the primary PCB 611 and the secondary PCB 612. At least some of the plurality of conductive vias included in the interposer substrate 613 may be part of signal lines through which signals are transmitted between a first electronic component disposed on the primary PCB 611 and a second electronic component disposed on the secondary PCB 612. In an embodiment, some of the plurality of conductive vias included in the interposer substrate 613 may be a part of a ground path that electrically connects a first ground plane included in the primary PCB 611 and a second ground plane included in the secondary PCB 612 to each other.

The cover member (or a cover structure or a support structure) 620 may include a metal and/or a polymer, and may be coupled to the first board assembly 440 and/or the first support member 410 by using a coupling member such as a bolt (or screw). When viewed from above the rear plate 320 (e.g., when viewed in the −z axis direction), a portion of the first board assembly 440 may overlap with the second support member 420 (see FIG. 4 or 5), and the other portion of the first board assembly 440 may overlap with the cover member 620. The cover member 620 may be in contact with the secondary PCB 612. In one embodiment, the antenna structure 5 may be disposed on the cover member 620. For example, a polymer adhesive material may be positioned between the antenna structure 5 and the cover member 620. For example, the adhesive material may include at least one of an optical clear adhesive (OCA), a pressure sensitive adhesive (PSA), a heat-reactive adhesive, a general adhesive, and a double-sided tape.

The antenna structure 5 may include a first portion (not shown) including a plurality of antenna elements ①, ②, ③ (see FIG. 5), and a second portion (not shown) extending from the first portion to be electrically connected to the first board assembly 440. The first portion of the antenna structure 5 may be disposed on the cover member 620. The second portion of the antenna structure 5 may be electrically connected to the first board assembly 440 through, for example, an opening (e.g., a notch-shaped opening) (not shown) provided in the cover member 620. In an embodiment, the second support member 420 (see FIG. 4 or 5) and the cover member 620 may be integrally formed with each other.

The buffer member 630 may be disposed on the antenna structure 5 or disposed on the rear plate 320. The buffer member 630 may be positioned in a gap between the antenna structure 5 and the rear plate 320. The buffer member 630 may press the antenna structure 5 between the antenna structure 5 and the rear plate 320 toward the first board assembly 440. The buffer member 630 may reduce the effect (e.g., scratch) occurring between the antenna structure 5 and the rear plate 320. The buffer member 630 may reduce a friction joint between the antenna structure 5 and the rear plate 320. The buffer member 630 may include a non-conductive material capable of reducing deterioration in antenna radiation performance when the antenna structure 5 transmits or receives a frequency signal toward the rear surface 300B of the electronic device 200. The buffer member 630 may have a dielectric constant (e.g., a low dielectric constant) capable of reducing deterioration of the antenna radiation performance of the antenna structure 5. The cushioning member 630 may be, for example, in the form of a film, or may include a flexible member such as a sponge.

The rear plate 320 may be formed of a non-conductive material such as a polymer or glass.

The rear plate 320 may include a metal material, and in this case, may include a plurality of openings (not shown) positioned to correspond to the plurality of antenna elements ①, ②, ③ (see FIG. 5) of the antenna structure 5. In one embodiment, the plurality of openings may be provided as one opening. The plurality of openings may overlap with the plurality of antenna elements ①, ②, ③ when viewed from above the rear plate 320 (e.g., when viewed in the −z axis direction). A non-conductive member (not shown) may be positioned in the plurality of openings to be provided as a portion of the rear surface 300B of the electronic device 200. In one embodiment, the non-conductive member positioned in the plurality of openings may be a radio frequency window area (or radiating aperture area). In case that the antenna structure 5 transmits or receives a frequency signal, a radio wave relating to the frequency signal may propagate through the non-conductive member. The non-conductive member may secure coverage while reducing deterioration of the radiation performance of the antenna structure 5 on the rear plate 320. In one embodiment, when viewed from above of the rear plate 320, the plurality of openings may have a size such that the entirety of the plurality of antenna elements ①, ②, ③ can be overlapped therewith.

The antenna structure 5 may include a circuit board (or circuit substrate) (not shown) on which the plurality of antenna elements ①, ②, ③ (see FIG. 5) are located. The circuit board may refer to an insulation material on which a conductive pattern (e.g., a pattern of copper foil) (or circuit) such as the plurality of antenna elements ①, ②, ③ can be disposed. In one embodiment, the antenna structure 5, which has a structure in which a circuit (e.g., a conductive pattern) is positioned on a circuit board (e.g., an insulation substrate), may include, for example, a printed circuit board (PCB). The printed circuit board of the antenna structure 5 may include, for example, a rigid printed circuit board (RPCB), a flexible printed circuit board (FPCB), or a rigid flexible printed circuit board (RFPCB).

Figure 7:
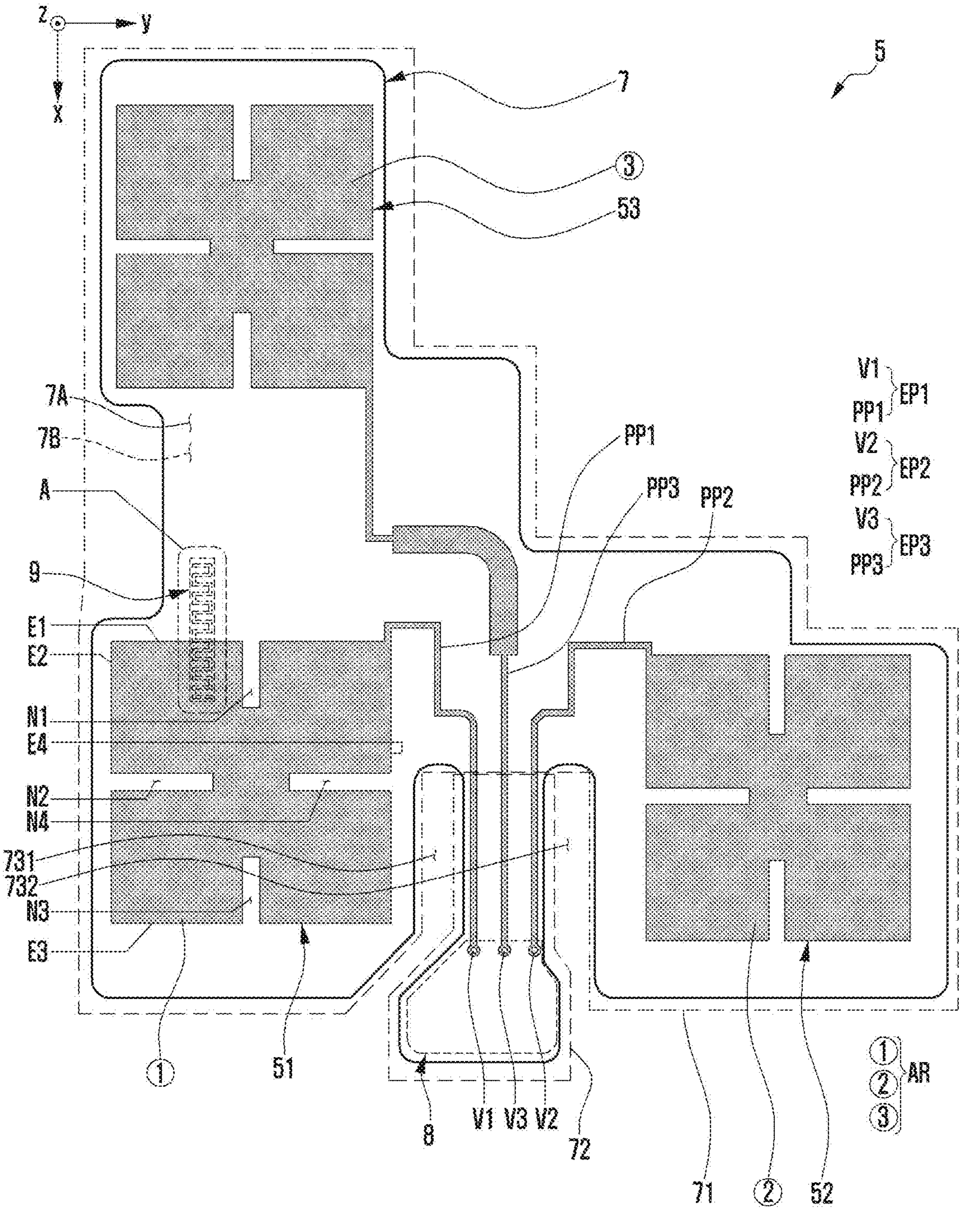
FIG. 7 illustrates an antenna structure according to one embodiment.
Figure 8:
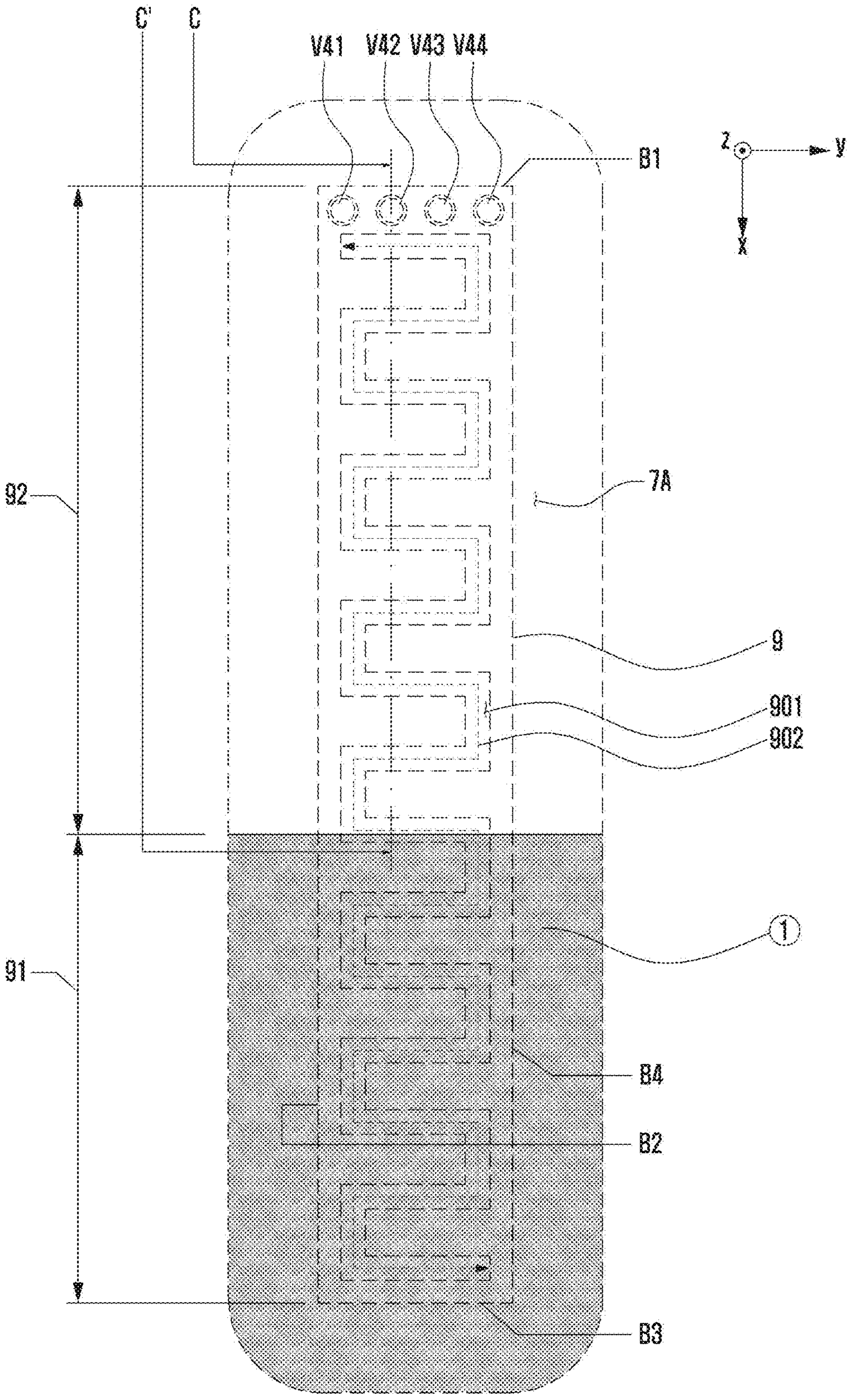
FIG. 8 is an enlarged view of a portion indicated by reference numeral "A" in FIG. 7, according to one embodiment.

FIG. 7 illustrates the antenna structure 5 according to one embodiment. FIG. 8 is an enlarged view of a portion indicated by reference numeral "A" in FIG. 7, according to one embodiment.

Referring to FIG. 7, in one embodiment, the antenna structure 5 may include a printed circuit board 7, a connector 8, and a conductive pattern 9 disposed on the printed circuit board 7. The printed circuit board 7 includes a first portion 71 and a second portion 72. The first portion 71 may include a plurality of antenna elements ①, ②, ③, therein. The second portion 72 may include a connector 8 and may be separated from the first portion 71 by notches 731 and 732.

The printed circuit board 7 can include a first conductive layer 701. The first conductive layer 701 may comprise a plurality of antenna elements ①, ②, ③, each respectively connected to a printing pattern PP1, PP2, and PP3. The printing patterns PP1, PP2, and PP3 may connect the respective antenna elements to a respective conductive vias V1, V2, and V3. The conductive vias may connect the antenna elements to connector 8. A second conductive layer 702 may form aground plane. A conductive pattern 9 may be electrically connected to the ground plane formed by the second conductive layer 702 by vias V41, V42, V43, V44. The conductive pattern 9 may be disposed to overlap the first antenna element.

For example, a plurality of conductive layers including at least one conductive pattern can be stacked on the printed circuit board 7, and a dielectric (or an insulator) may be positioned between the plurality of conductive layers. At least a portion of the printed circuit board 7 may be implemented using, for example, a flexible copper clad laminate (FCCL).

The flexible copper clad laminate is a laminate used for the printed circuit board 7, and may include a structure formed by attaching copper foil to one surface or both surfaces of a flexible insulation film (or a dielectric film) by using an adhesive material (e.g., an acrylic adhesive). The flexible insulation film may include, for example, various non-conductive materials such as a polyimide film or a polyester film. The flexible insulation film may include, for example, pre-impregnated materials (PREPREG) (e.g., an insulating resin layer). One or more conductive patterns included in the plurality of conductive layers may be used as an antenna radiator. One or more conductive patterns included in the plurality of conductive layers may be used as an electrical path (e.g., a signal line). One or more conductive patterns included in the plurality of conductive layers may be used as a ground plane. A conductive pattern used as an antenna radiator may be referred to as an "antenna element" or a "radiation pattern". A conductive pattern used as at least a part of an electrical path may be referred to as a "path pattern". A conductive pattern used as at least a part of a ground plane may be referred to as a "ground pattern".

The printed circuit board 7 may include a plurality of conductive vias. The conductive via may be a conductive hole drilled through which connection leads for electrically connecting conductive patterns of different conductive layers can be disposed. The conductive via may include, for example, a plated through hole (PTH), a laser via hole (LVH), a buried via hole (BVH), or a stacked via. In certain embodiments, the through hole can be surrounded by a cylinder of conductive material.

The printed circuit board 7 may include a first surface 7A and a second surface 7B positioned opposite to the first surface 7A. That is, in certain embodiments, the first surface 7A can be along the surface of the paper in the drawing, while the second surface 7B is a plane parallel to the paper and separated by a distance. The first surface 7A may substantially face the rear plate 320 (see FIG. 6). The second surface 7B may substantially face the front plate 310 (see FIG. 6).

The connector 8 may be arranged on the second surface 7B. In one embodiment, the printed circuit board 7 may include a first portion 71 including a plurality of antenna elements ①, ②, ③, and a second portion 72 extending from the first portion 71 to be electrically connected to the first board assembly 440 (FIG. 4, 5, or 6). The connector 8 may be positioned on the second portion 72. The second portion 72 of the printed circuit board 7 may be electrically connected to the first board assembly 440 through, for example, an opening (e.g., a notch-shaped opening). The opening may be provided in the cover member 620 (see FIG. 6). In an embodiment, a flexible member, such as a sponge, may be positioned between the rear plate 320 (see FIG. 6) and the connector 8. The flexible member may resiliently press the connector 8 toward the first board assembly 440 between the connector 8 and the rear plate 320 such that the connector 8 is not separated from the first board assembly 440.

The printed circuit board 7 may include a first notch 731 and a second notch 732. The first notch 731 is to be provided between the area of the first portion 71 of the printed circuit board 7 including the first antenna element ① and the second portion 72 of the printed circuit board 7. The second notch 732 may be provided between the area of the first portion 71 of the printed circuit board 7 including the second antenna element ② and the second portion 72 of the printed circuit board 7. The second portion 72 of the printed circuit board 7 may be provided due to the first notch 731 and the second notch 732.

The first portion 71 and the second portion 72 of the printed circuit board 7 may be substantially flexible.

The second portion 72 of the printed circuit board 7 may have greater flexibility than the first portion 71 of the printed circuit board 7. Compared to the first portion 71, the second portion 72 may have bending characteristics (e.g., flexibility) that can be bent without breakage while reducing stress generation under the same conditions. In one embodiment, the first portion 71 and the second portion 72 may be substantially flexible, and the second portion 72 may have greater flexibility than the first portion 71. For example, the second portion 72 may have a smaller thickness or a smaller number of layers than the first portion 71, and thus may be implemented to be more flexible than the first portion 71. As another example, the second portion 72 may include a material different from the first portion 71 to be implemented more rigid than the first portion 71. In an embodiment, the second portion 72 may be a substantially flexible portion (or flexible section) of the printed circuit board 7, and the first portion 71 may be substantially rigid portions (or rigid sections) of the printed circuit board 7. The printed circuit board 7 including a flexible portion, a rigid portion, or portions having different flexibility may be provided using other various structures.

The printed circuit board 7 may include a first antenna element ①, a second antenna element ②, a third antenna element ③, a first path pattern (PP1), a second path pattern (PP2), a third path pattern (PP3), a first conductive via (V1), a second conductive via (V2), and/or a third conductive via (V3). Each one of the path patterns PP1, PP2, PP3 connects a respective one of the antenna elements ①, ②, ③, to a respective via V1, V2, V3. The vias V1, V2, V3 are in turn, each connected to the connector 8.

The first conductive via (V1), the second conductive via (V2), and the third conductive via (V3) may be located on the second portion 72 of the printed circuit board 7. The first path pattern (or a first signal line pattern) (PP1) may electrically connect the first antenna element ① and the first conductive via (V1) to each other. The first path pattern (PP1) may be electrically connected to the connector 8 through the first conductive via (V1). The second path pattern (or a second signal line pattern) (PP2) may electrically connect the second antenna element ② and the second conductive via (V2) to each other. The second path pattern (PP2) may be electrically connected to the connector 8 through the second conductive via (V2). The third path pattern (or a third signal line pattern) (PP3) may electrically connect the third antenna element ③ and the third conductive via (V3) to each other. The third path pattern (PP3) may be electrically connected to the connector 8 through the third conductive via (V3). A first electrical path (EP1) including the first path pattern (PP1) and the first conductive via (V1) may form a first signal line connecting the first antenna element ① and the connector 8 to each other. A second electrical path (EP2) including the second path pattern (PP2) and the second conductive via (V2) may form a second signal line connecting the second antenna element ② and the connector 8 to each other. A third electrical path (EP3) including the third path pattern (PP3) and the third conductive via (V3) may form a third signal line connecting the third antenna element ③ and the connector 8 to each other.

A wireless communication circuit (e.g., the wireless communication module 192 in FIG. 1) included in the first board assembly 440 (see FIG. 4, 5, or 6) may provide a radiation current (or an electromagnetic signal) (e.g., a UWB signal) to the first antenna element ① via the first electrical path (EP1). The first antenna element ① may radiate radio waves, therefrom. That is, the first antenna element ① may radiate the electromagnetic signal to the outside or receive an electromagnetic signal from the outside. The wireless communication circuit may provide a radiation current (or an electromagnetic signal) (e.g., a UWB signal) to the second antenna element ② via the second electrical path (EP2). The second antenna element ② may radiate radio waves, therefrom. That is, the second antenna element ② may radiate the electromagnetic signal to the outside or receive an electromagnetic signal from the outside. The wireless communication circuit may provide a radiation current (or an electromagnetic signal) (e.g., a UWB signal) to the third antenna element ③ via the third electrical path (EP3). The third antenna element ③ may radiate radio waves therefrom. That is, the third antenna element ③ may radiate the electromagnetic signal to the outside or receive an electromagnetic signal from the outside.

In an embodiment, the first path pattern (PP1) may be referred to as a "first feeding pattern", the second path pattern (PP2) may be referred to as a "second feeding pattern", and the third path pattern (PP3) may be referred to as a "third feeding pattern". In one embodiment, the first antenna element ① to the third antenna element ③ may be connected to a communication circuit (e.g., the processor 120 in FIG. 1, a communication processor) via the first feeding pattern to the third feeding pattern so as to secure the frequency resonance characteristic. Since the first to third feeding patterns are spaced apart from each other, coupling characteristics can be improved.

An "antenna" can refer to the combined antenna element, and electrical path. For example, a configuration including the first antenna element ① and the first electrical path (EP1) may be referred to as the first antenna 51. A configuration including the second antenna element ② and the second electrical path (EP2) may be referred to as a second antenna 52. A configuration including the third antenna element ③ and the third electrical path (EP3) may be referred to as a third antenna 53. The first electrical path (EP1) may be referred to as a first feeding part (e.g., a first feeding line) that provides an electromagnetic signal (or a radiation current) to the first antenna element ①, and the first antenna element ① may be referred to as a first radiation part (or a first radiator or a first antenna radiator) that radiates a fed electromagnetic signal to the outside or receives an electromagnetic signal from the outside. The second electrical path (EP2) may be referred to as a second feeding part (e.g., a second feeding line) that provides an electromagnetic signal (or a radiation current) to the second antenna element ②, and the second antenna element ② may be referred to as a second radiator (or a second radiator or a second antenna radiator) that radiates a fed electromagnetic signal to the outside or receives an electromagnetic signal from the outside. The third electrical path (EP3) may be referred to as a third feeding part (e.g., a third feeding line) that provides an electromagnetic signal (or a radiation current) to the third antenna element ③, and the third antenna element ③ may be referred to as a third radiator (or a third radiator or a third antenna radiator) that radiates a fed electromagnetic signal to the outside or receives an electromagnetic signal from the outside.

The first antenna element ①, the second antenna element ②, and the third antenna element ③ may be included in a first conductive layer (not shown) among a plurality of conductive layers included in the printed circuit board 7.

When the first antenna element ①, the second antenna element ②, and the third antenna element ③ are formed of material that is then overlaid onto the first conductive layer, shall also be referred to "included in the first conductive layer."

The first conductive layer may be located closer to the first surface 7A than to the second surface 7B of the printed circuit board 7. The first path pattern (PP1), the second path pattern (PP2), and the third path pattern (PP3) may be included in the first conductive layer. The first path pattern (PP1) may extend from, for example, the edge of the first antenna element ① when viewed from above the first surface 7A (e.g., when viewed in the −z axis direction). The second path pattern (PP2) may extend from, for example, the edge of the second antenna element ② when viewed from above the first surface 7A. The third path pattern (PP3) may extend from, for example, the edge of the third antenna element ③ when viewed from above the first surface 7A. When viewed from above the first surface 7A, the third path pattern (PP3) may extend between the first path pattern (PP1) and the second path pattern (PP2) from the third antenna element ③ to be electrically connected to the third conductive via (V3).

According to an embodiment (not shown), in case that the first path pattern (PP1) and the first antenna element ① are included in different conductive layers, the first electrical path (EP1) may include a conductive via configured to electrically connect the first path pattern (PP1) and the first antenna element ① to each other. In case that the second path pattern (PP2) is included in a conductive layer different from that of the second antenna element ②, the second electrical path (EP2) may include a conductive via configured to electrically connect the second path pattern (PP2) and the second antenna element ② to each other. In case that the third path pattern (PP3) is included in a conductive layer different from that of the third antenna element ③, the third electrical path (EP3) may include a conductive via configured to electrically connect the third path pattern (PP3) and the third antenna element ③ to each other. Any two of the first path pattern (PP1), the second path pattern (PP2), and the third path pattern (PP3) may be included in the same conductive layer or the first path pattern (PP1), the second path pattern (PP2), and the third path pattern (PP3) may be included in different conductive layers, respectively.

According to an embodiment (not shown), in case that the first path pattern (PP1), the second path pattern (PP2), or the third path pattern (PP3) include the first pattern and second pattern respectively included in different layers, the printed circuit board 7 may include a conductive via electrically connecting the first pattern and the second pattern.

The electronic device 200 (see FIG. 2) may communicate with a signal source by using the first antenna element ①, the second antenna element ②, and the third antenna element ③. A configuration including the first antenna element ①, the second antenna element ②, and the third antenna element ③ may be referred to as an antenna array (AR). For example, the electronic device 200 may perform a positioning function (e.g., AOA) for a signal source (e.g., a responder, a transmitter, or a Tx device) by using the antenna array (AR). In one embodiment, the antenna array (AR) may be arranged in an "L" shape. For example, according to the "L"-shaped arrangement, the first antenna element ① and the third antenna element ③ of the antenna array (AR) may be arranged to be spaced apart in the x-axis direction, and the first antenna element ① and the second antenna element ② of the antenna array (AR) may be arranged to be spaced apart in the y-axis direction. The processor (e.g., the processor 120 in FIG. 1) may identify or estimate a first angle (e.g., a first signal reception angle) at which a signal is received with respect to the x-axis configured in the electronic device 200, by using the time difference between signals received through the first antenna element ① and the third antenna element ③ aligned in the x-axis direction and the phase difference resulting therefrom.

The x-axis configured in the electronic device 200 may be, for example, a direction in which the first bezel part 411 and the third bezel part 413 in FIG. 5 extend in parallel. The processor may identify or estimate a second angle (e.g., a second signal reception angle) at which a signal is received with respect to the y-axis configured in the electronic device 200, by using the time difference between signals received through the first antenna elements ① and the second antenna element ② aligned in the y-axis direction and the phase difference resulting therefrom.

The y-axis configured in the electronic device 200 may be, for example, a direction in which the second bezel part 412 and the fourth bezel part 414 in FIG. 5 extend in parallel. The processor may identify or estimate the direction of a signal source with respect to the electronic device 200 by using the first angle and the second angle. The electronic device 200 may identify or estimate the distance between the electronic device 200 and the signal source by using the time between signals received through the antenna array (AR) and the phase difference resulting therefrom.

In an embodiment, in case that the first antenna element ① and the third antenna element ③ are in a misaligned state in the x-axis direction, or the first antenna element ① and the second antenna element ② are in a misalignment state in the y-axis direction, in order to reduce a recognition error of positioning, the electronic device 200 may be implemented to perform correction by applying an offset value based on the misalignment distance between antennas. In an embodiment, the number or positions of antenna elements included in the antenna array (AR) may vary without being limited to the illustrated example. In an embodiment, the antenna array (AR) may be arranged in various shapes other than the illustrated "L" shape. In one embodiment, the processor may identify or estimate a first angle and a second angle at which the signal is received with respect to the x-axis and y-axis configured in the electronic device 200, by using the time difference or the phase difference between signals received through all of the first antenna element ① to the third antenna element ③. In case that 3D AOA (measuring up, down, left and right) is measured through all of the first antenna element ① to the third antenna element ③, more reliable AOA positioning can be performed.

The antenna elements can be have a square-like shape with edges E1 . . . E4, notches N1 . . . N4 on each of the edges. The first antenna element ① may include a first edge (E1), a second edge (E2), a third edge (E3), a fourth edge (E4), and/or a plurality of notches (N1, N2, N3, N4) when viewed from above the first surface 7A of the printed circuit board 7 (e.g., when viewed in the −z axis direction). The first edge (E1) and the third edge (E3) may be spaced apart from each other, for example, in the x-axis direction, and may extend substantially in parallel. The second edge (E2) and the fourth edge (E4) may be spaced apart from each other, for example, in the y-axis direction, and may extend substantially in parallel. The first edge (E1) and the third edge (E3) may be substantially perpendicular to the second edge (E2) and the fourth edge (E4). In one embodiment, a first distance in the x-axis direction between the first edge (E1)

and the third edge (E3) may be substantially equal to a second distance in the y-axis direction between the second edge (E2) and the fourth edge (E4). In an embodiment, the first distance and the second distance may be different. The plurality of notches (or slits) (N1, N2, N3, N4) may be openings provided in the form of a recess in the first edge (E1), the second edge (E2), the third edge (E3), and the fourth edge (E4).

The second antenna element ② and/or the third antenna element ③ may be provided in substantially the same manner as the first antenna element ①. A plurality of notches included in the antenna element (e.g., the first antenna element ①, the second antenna element ②, or the third antenna element ③) may contribute to causing the antenna element to generate a dual-band radio wave. For example, the first antenna element ①, the second antenna element ②, and the third antenna element ③ may substantially resonate at a first used frequency (e.g., about 8 GHz) and a second used frequency (e.g., 6.5 GHz). The resonant frequency band in which the antenna element can transmit and receive a signal may be changed depending on the shape of the antenna element (e.g., the first antenna element ①, the second antenna element ②, or the third antenna element ③), or the shape of the notch included in the antenna element.

In certain embodiments, the antenna element (e.g., the first antenna element ①, the second antenna element ②, or the third antenna element ③) may not include a notch. In this case, the first antenna 51, the second antenna 52, and the third antenna 53 may substantially resonate at one frequency (e.g., the first used frequency (e.g., about 8 GHz) or the second used frequency (e.g., about 6.5 GHz)).

The antenna element (e.g., the first antenna element ①, the second antenna element ②, or the third antenna element ③) are not limited to the illustrated example, and may be provided in various other shapes (e.g., circular, oval, polygonal, or ring-shape).

The printed circuit board 7 may include a second conductive layer (not shown) forming a ground plane. The second conductive layer may be located closer to the second surface 7B than to the first surface 7A of the printed circuit board 7. The ground plane may reduce electromagnetic effects (e.g., electromagnetic interference (EMI)) on the circuit (or circuit pattern) of the printed circuit board 7. The ground plane, for example, may reduce the effect of external electromagnetic noise on the circuit of the printed circuit board 7. The ground plane, for example, may reduce the effect of electromagnetic fields generated when current flows through the circuit of the printed circuit board 7 on electrical elements around the printed circuit board 7. The ground plane may operate as an antenna ground for the first antenna 51, the second antenna 52, and the third antenna 53. The ground plane may be electrically connected to a ground (e.g., a ground plane included in the first printed circuit board 441) included in the first board assembly 440 in FIG. 4, 5, or 6 through the connector 8.

The conductive pattern 9 may be located inside the first portion 71 included in the printed circuit board 7. The conductive pattern 9 may at least partially overlap with the first antenna element ① when viewed from above the first surface 7A of the printed circuit board 7 (e.g., when viewed in the −z axis direction). The conductive pattern 9 may not overlap with the first electrical path (EP1), the second electrical path (EP2), and the third electrical path (EP3) when viewed from above the first surface 7A of the printed circuit board 7. The conductive pattern 9 may be positioned at least partially between a first conductive layer including the first antenna element ①, the second antenna element ②, and the third antenna element ③ and a second conductive layer including a ground plane. The conductive pattern 9 may be physically separated from the first conductive layer and the second conductive layer. The printed circuit board 7 may include a plurality of fourth conductive vias (V41, V42, V43, V44) (see FIG. 8) electrically connecting the conductive pattern 9 and the ground plane of the printed circuit board 7. In an embodiment, the conductive pattern 9 may be defined as a component of the printed circuit board 7 as part of the plurality of conductive layers included in the printed circuit board 7. The conductive pattern 9 may be a conductive layer positioned between the first conductive layer 701 and the second conductive layer 702. A dielectric layer may be included between the conductive pattern 9 and the second conductive layer 702. The conductive pattern 9 and the second conductive layer 702 may be electrically connected using a plurality of fourth conductive vias (V41, V42, V43, V44) passing through the dielectric layer between the conductive pattern 9 and the second conductive layer 702. In an embodiment, the conductive pattern 9 may be referred to as a micro strip.

The conductive pattern 9 may include a conductive layer or conductive plate substantially parallel to the first conductive layer, or the second conductive layer of the printed circuit board 7. For example, one surface of the conductive pattern 9 facing the first conductive layer and the other surface of the conductive pattern 9 facing the second conductive layer may include a plane and be substantially parallel to each other. In an embodiment, one surface of the conductive pattern 9 facing the first conductive layer or the other surface of the conductive pattern 9 facing the second conductive layer may include an uneven or curved surface. In an embodiment, any two areas of the conductive pattern 9 may have thicknesses different from each other in the z-axis direction.

The conductive pattern 9 may include a first area 91 overlapping with the first antenna element ① and a second area 92 overlapping with the first antenna element ① when viewed from above the first surface 7A of the printed circuit board 7 (e.g., when viewed in the −z axis direction). The plurality of fourth conductive vias (V41, V42, V43, V44) may electrically connect the second area 92 of the conductive pattern 9 and the ground plane of the printed circuit board 7 to each other.

The conductive pattern 9 may include a rectangular edge when viewed from above the first surface 7A of the printed circuit board 7 (e.g., when viewed in the −z axis direction). For example, when viewed from above the first surface 7A of the printed circuit board 7, the conductive pattern 9 may include a first border (B1) and a third border (B3) parallel to the y-axis, and a second border (B2) and a fourth border (B4) parallel to the x-axis. When viewed from above the first surface 7A of the printed circuit board 7, a first distance at which the third border (B3) is spaced apart from the first border (B1) in the +x axis direction may be greater than a second distance at which the fourth border (B4) is spaced apart from the second border (B2) in the +y-axis direction. For example, the first distance may have a value (e.g., about 4.55 mm) included in a range of about 2 mm to about 10 mm. For example, the second distance may have a value (e.g., about 0.8 mm) included in the range of about 0.3 mm to about 1.2 mm. In an embodiment, the first distance and the second distance may be implemented to be substantially the same. When viewed from above the first surface 7A of the printed circuit board 7, the first area 91 and the second area 92 of the conductive pattern 9 may be distinguished by the first edge (E1) of the first antenna element ①. When viewed from above the first surface 7A of the printed circuit board 7, the first border (B1) of the conductive pattern 9 may be spaced apart from the first edge (E1) of the first antenna element ① in the −x axis direction so as not to overlap with the first antenna element ①. When viewed from above of the first surface 7A of the printed circuit board 7, the third border (B3) of the conductive pattern 9 may be spaced apart from the first edge (E1) of the first antenna element ① in the +x-axis direction to overlap with the first antenna element ①. In one embodiment, the second area 92 of the conductive pattern 9 may be located between the first antenna element ① and the third antenna element ③ when viewed from above the first surface 7A of the printed circuit board 7. In one embodiment, when viewed from above of the first surface 7A of the printed circuit board 7, the plurality of fourth conductive vias (V41, V42, V43, V44) may be located closer to the first border (B1) of the conductive pattern 9 than to the third border (B3) of the conductive pattern 9 which is close to the first edge (E1) of the first antenna element ①. For example, the plurality of fourth conductive vias (V41, V42, V43, V44) may be positioned adjacent to the first edge (B1) of the conductive pattern 9. The plurality of fourth conductive vias (V41, V42, V43, V44) may be arranged in the y-axis direction. In some embodiments, the plurality of fourth conductive vias (V41, V42, V43, V44) may be referred to as a conductive via structure (or one row of a conductive via structure). The position or number of the fourth conductive vias are not limited to the illustrated example and may vary. In an embodiment, the plurality of fourth conductive vias may be positioned adjacent to the second border (B2) or the fourth border (B4) of the conductive pattern 9, and may be arranged in the x-axis direction. When viewed from above the first surface 7A of the printed circuit board 7, the conductive pattern 9 is not limited to a rectangular border according to the illustrated example, and may be provided in various other shapes such as a polygonal or circular shape.

The conductive pattern 9 may include an opening (or a slot) 901 extending from the first area 91 to the second area 92. The opening 901 may be provided, for example, inside a rectangular border of the conductive pattern 9 when viewed from above the first surface 7A of the printed circuit board 7.

The opening 901 may be provided in a meander-shaped pattern (hereinafter, referred to as a "meander pattern") 902. The opening 901 provided in a pattern such as the meander pattern 902 may be referred to as an opening pattern. The meander pattern 902 may include, for example, a series of sinuous curves, bends, loops, turns, or windings. In one embodiment, the meander pattern 902 may include a corrugated pattern including patterns extending in the x-axis direction and patterns extending in the y-axis direction. The opening 901 may be provided in various other shapes.

Figure 9:
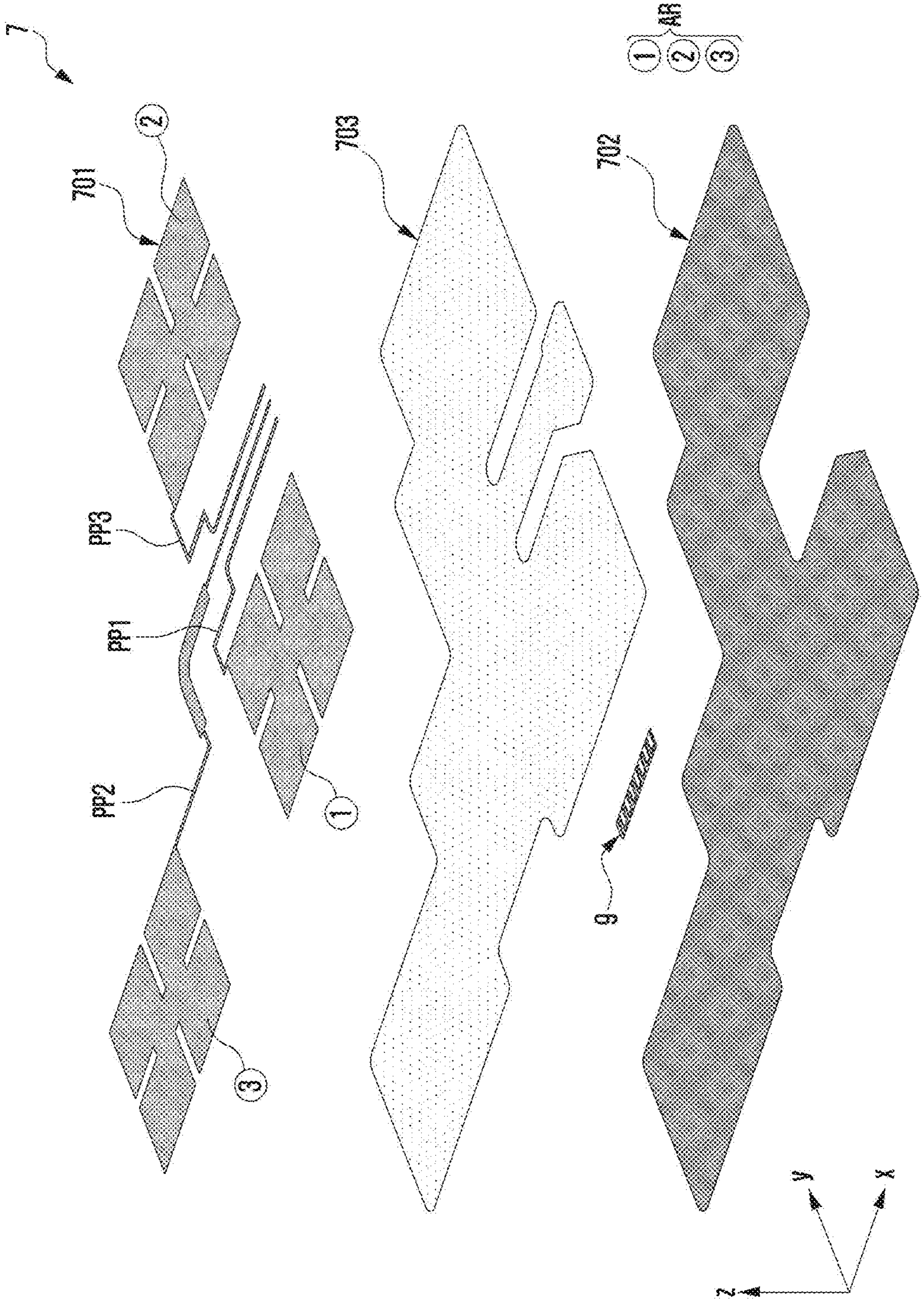
FIG. 9 is an exploded perspective view of a printed circuit board of an antenna structure, according to one embodiment.
Figure 10:
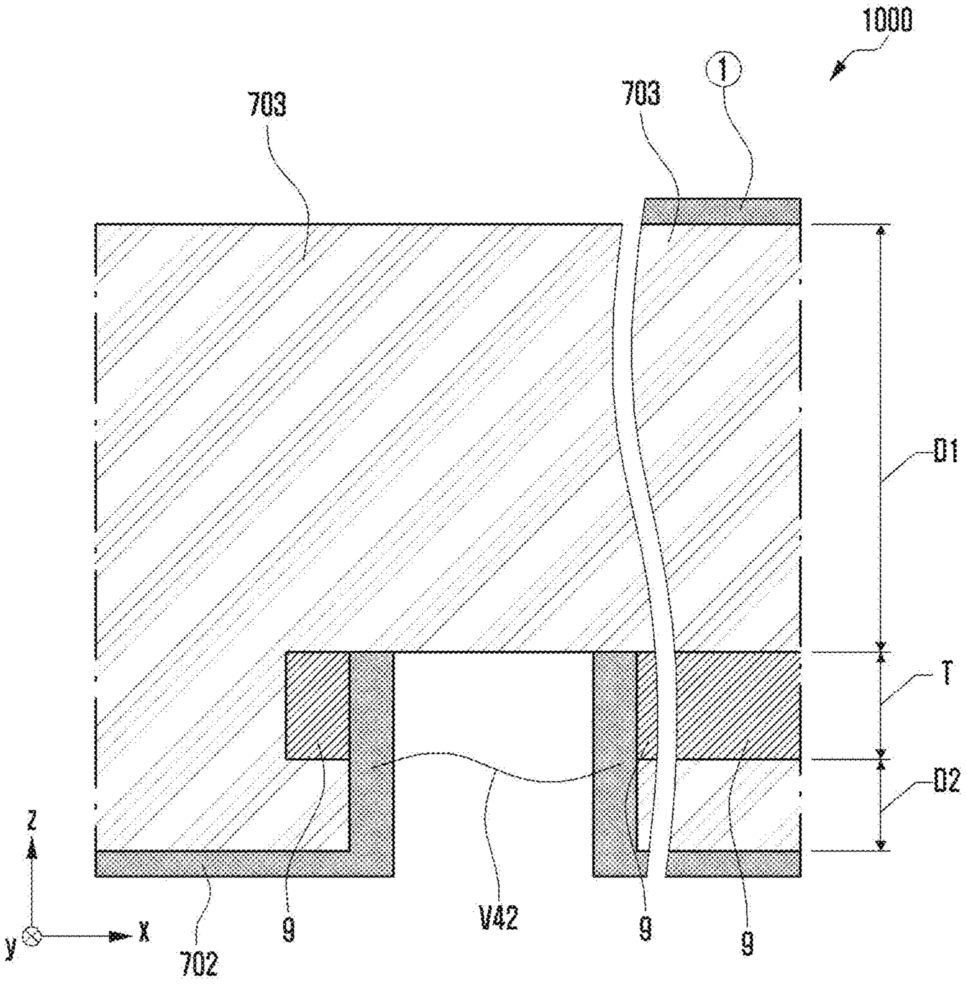
FIG. 10 is a cross-sectional view of the antenna structure, taken along line C-C' in FIG. 8, according to one embodiment.

FIG. 9 is an exploded perspective view of the printed circuit board 7 of the antenna structure 5, according to one embodiment. FIG. 10 is a cross-sectional view 1000 of the antenna structure 5, taken along line C-C' in FIG. 8, according to one embodiment. The printed circuit board 7 can include a first conductive layer 701 comprising antenna elements and the printed patterns, a second conductive layer 702, and a dielectric layer 703 and conductive pattern 9 between the first conductive layer 701 and the second conductive layer 702.

Referring to FIGS. 9 and 10, the printed circuit board 7 may include a first conductive layer 701, a second conductive layer 702, and a dielectric (or a dielectric material layer) 703. The first conductive layer 701 may be located closer to the first surface 7A (see FIG. 7) of the printed circuit board 7 than to the second surface 7B (see FIG. 7) of the printed circuit board 7. The first conductive layer 701 may include a first antenna element ①), a second antenna element ②, a third antenna element ③, a first path pattern (PP1), a second path pattern (PP2), and a third path pattern (PP3). The second conductive layer 702 may be located closer to the second surface 7B than to the first surface 7A of the printed circuit board 7. The second conductive layer 702 may be used as a ground plane. The dielectric 703 may be positioned between the first conductive layer 701 and the second conductive layer 702. Although not shown, the printed circuit board 7 may further include a first surface protection layer providing at least a portion of the first surface 7A (see FIG. 7), or a second surface protection layer providing at least a portion of the second surface 7B (see FIG. 7). The first surface protection layer (e.g., a first coverlay) or the second surface protection layer (e.g., a second coverlay) may serve to protect the circuit (or the circuit pattern) of the printed circuit board 7, and for example, may include an insulation layer or a non-conductive layer. The first surface protection layer or the second surface protection layer may include various insulation materials such as, for example, an epoxy-based solder mask insulation ink (e.g., photo imageable solder resist mask ink (PSR ink)). In an embodiment, the first surface protection layer may include an electromagnetic shielding component (or an electromagnetic wave shielding component), and in this case, may be disposed so as not to overlap with the antenna array (AR) when viewed in the −z axis direction.

The conductive pattern 9 may be positioned at least partially between the first conductive layer 701 and the second conductive layer 702. The conductive pattern 9 may be electrically connected to the second conductive layer 702 (e.g., a ground plane) through the plurality of fourth conductive vias (V41, V42, V43, V44) (see FIGS. 8 and 10). In an embodiment, a configuration including the conductive pattern 9, the second conductive layer 702, and the plurality of fourth conductive vias (V41, V42, V43, V44) may be referred to as a ground structure. The second conductive layer 702 may be referred to as a first ground pattern, and the conductive pattern 9 may be referred to as a second ground pattern. The second conductive layer 702 may be referred to as a first ground plane, and the conductive pattern 9 may be referred to as a second ground plane.

The first conductive layer 701 and the second conductive layer 702 may form a coplanar waveguide (CPW) that transmits a frequency signal.

As can be seen in FIG. 10, the first antenna element ① of the first conductive layer 701 may be separated from the conductive pattern 9 by the dielectric layer 703. The conductive pattern 9 may connect to the second conductive layer 702 through the conductive via V42.

According to one embodiment, a first distance (D1) at which the conductive pattern 9 is spaced apart from the first antenna element ① in the −z axis direction may be greater than a second distance (D2) at which the conductive pattern 9 is spaced apart from the second conductive layer 702 (e.g., a ground plane) in the +z-axis direction. For example, the first distance (D1) may have a value (e.g., about 0.245 mm) included in a range of about 0.2 mm to about 0.3 mm. For example, the second distance (D2) may have a value (e.g., about 0.05 mm) included in a range of about 0.03 mm to about 0.06 mm. In one embodiment, the second distance (D2) may be greater than a thickness (e.g., a thickness in the z-axis direction) of the first conductive layer 701 or the second conductive layer 702.

The thickness (T) (e.g., the thickness in the z-axis direction) of the conductive pattern 9 may be greater than that of the first conductive layer 701 or the second conductive layer 702. For example, the thickness (T) of the conductive pattern 9 may have a value (e.g., about 0.06 mm) included in the range of about 0.03 mm to about 0.1 mm.

The conductive pattern 9 may reduce energy (or electromagnetic wave energy) transferred (or excited) to the first antenna 51 that results from electromagnetic coupling between the first antenna 51 (see FIG. 7) and the second antenna 52 (see FIG. 7). Accordingly, isolation between the first antenna 51 and the second antenna 52 is improved. For example, energy (e.g., "coupled energy", "coupled energy component", "coupled electromagnetic wave", or "coupled electromagnetic wave energy") transferred to the first antenna 51 due to the electromagnetic coupling may flow into the second conductive layer 702 (e.g., the ground plane) through the conductive pattern 9 and the plurality of fourth conductive vias (V41, V42, V43, V44) (see FIG. 8). Accordingly, the energy can be absorbed by the second conductive layer 702.

The conductive pattern 9 is an element to which energy is transferred in an electromagnetic coupling manner, and may be referred to by various other terms such as a "coupling conductive pattern" or a "coupling conductive area". In one embodiment, the opening 901 (see FIG. 8) of the meander pattern 902 included in the conductive pattern 9 may reduce energy transferred to the first antenna 51 that occurs due to the electromagnetic coupling between the first antenna 51 and the second antenna 52. An antenna structure without the conductive pattern 9 will be described below with reference to FIGS. 11, 12, 13, and 14.

Figure 11:
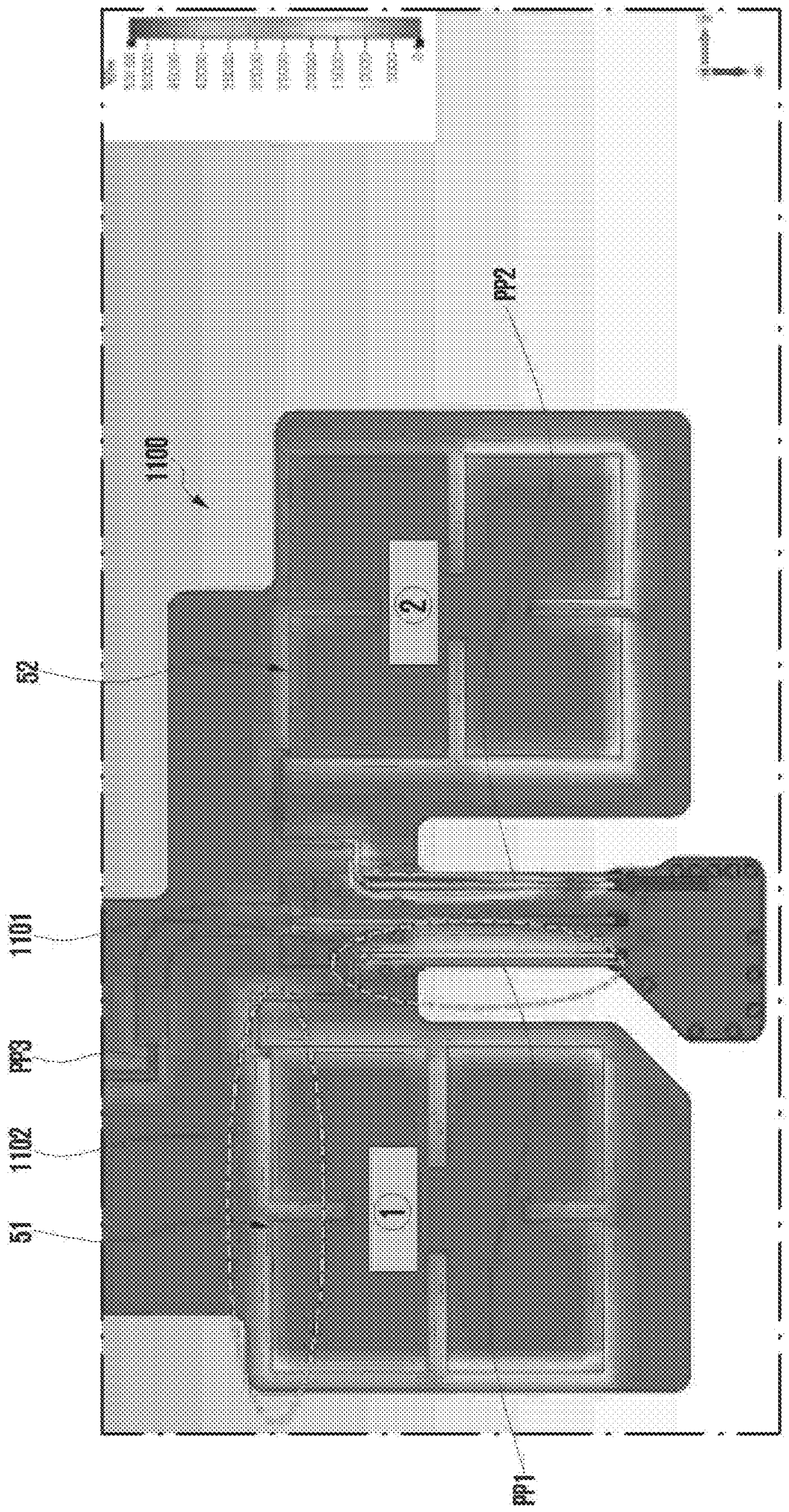
FIG. 11 is an x-y plan view of an antenna structure that does not include a conductive pattern, showing the electric field with respect to the effect of a second antenna on a first antenna, for example, in case that a radiation current is provided to a second feeding pattern in the antenna structure.
Figure 12:
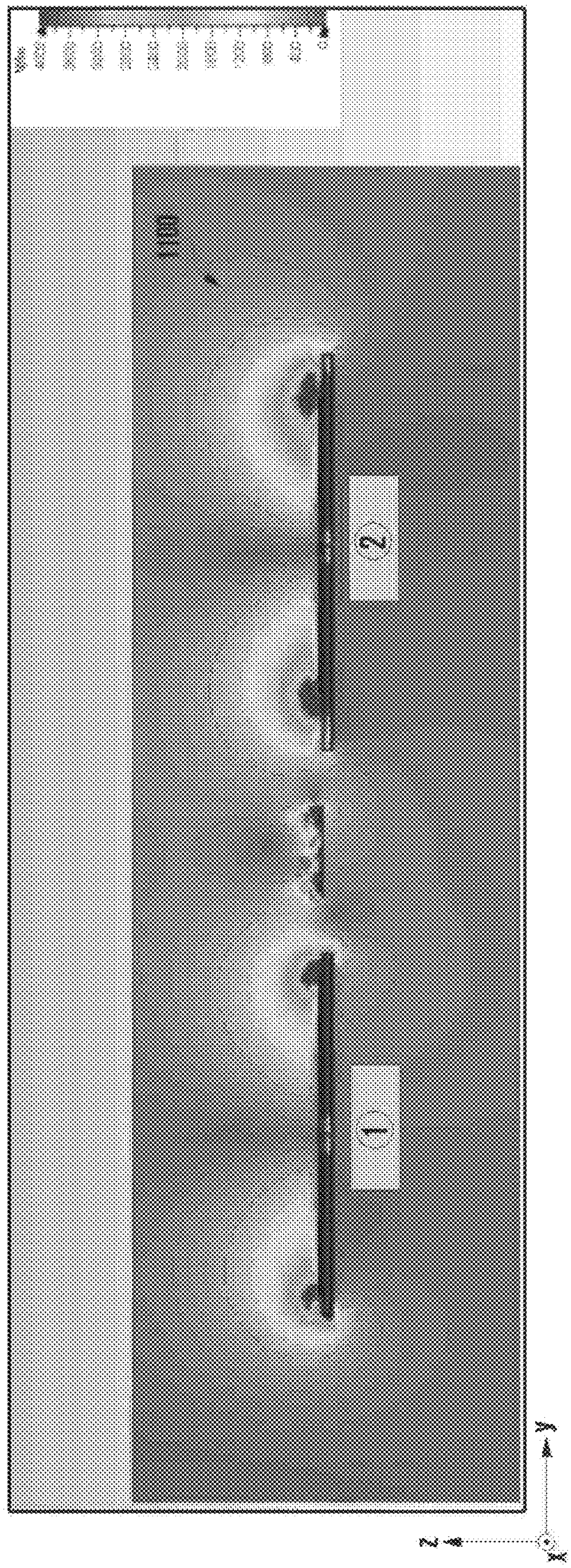
FIG. 12 is a cross-sectional view of the y-z plane of an antenna structure, showing the electric field with respect to the effect of a second antenna on a first antenna, for example, in case that a radiation current is provided to a second feeding pattern in the antenna structure.
Figure 13:
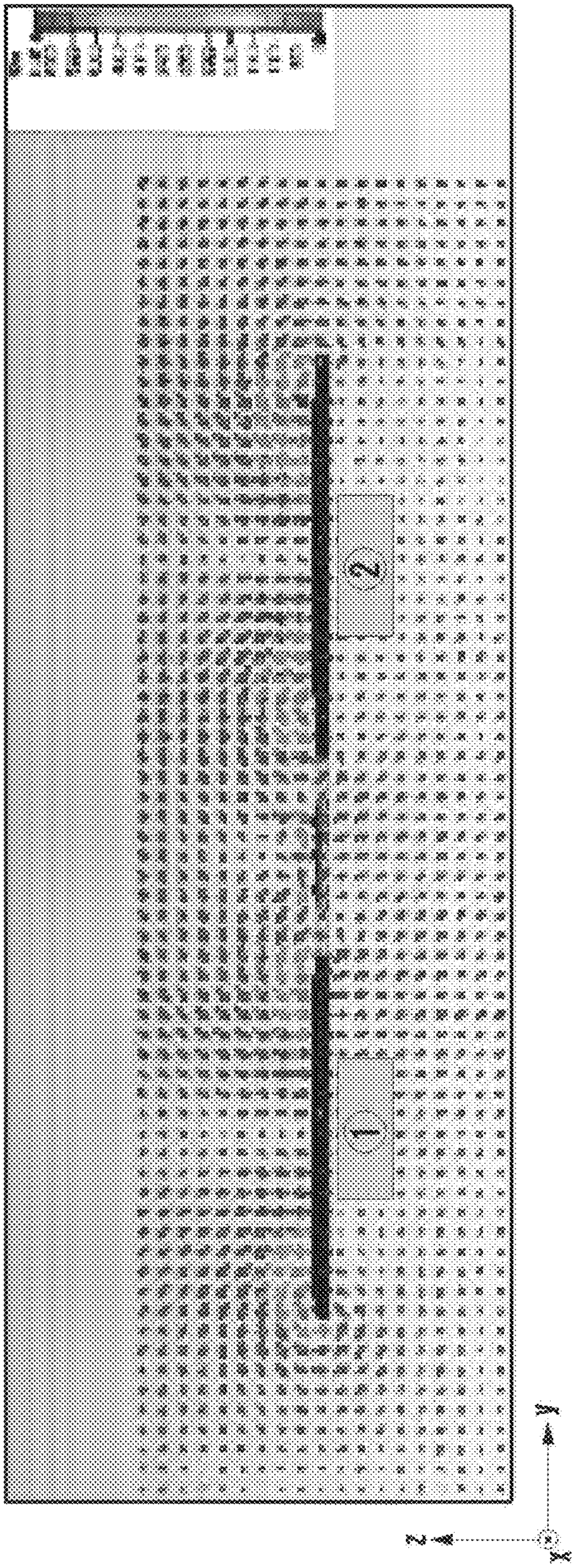
FIG. 13 is a cross-sectional view of the y-z plane of an antenna structure, showing the magnetic field with respect to the effect of a second antenna on a first antenna, for example, in case that a radiation current is provided to a second feeding pattern in the antenna structure.
Figure 14:
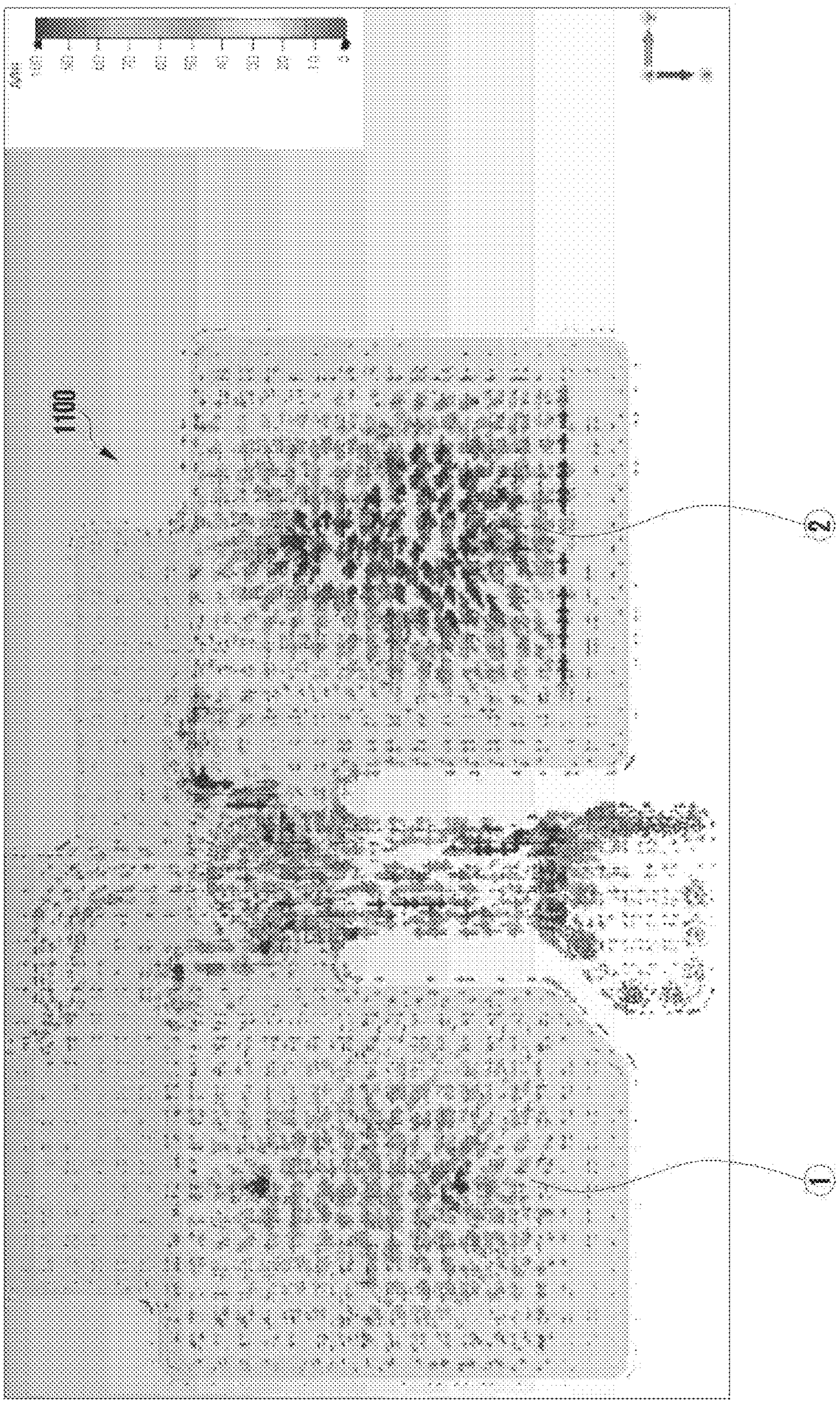
FIG. 14 is an x-y plan view of an antenna structure, showing a flow of a surface current with respect to the effect of a second antenna on a first antenna, for example, in case that a radiation current is provided to a second feeding pattern in the antenna structure.

FIG. 11 is an x-y plan view of an antenna structure 1100 that does not include the conductive pattern 9, showing the electric field with respect to the effect of the second antenna 52 on the first antenna 51, for example, in case that a radiation current is provided to the second feeding pattern (PP2) in the antenna structure 1100. FIG. 12 is a cross-sectional view of the y-z plane of the antenna structure 1100, showing the electric field with respect to the effect of the second antenna 52 on the first antenna 51, for example, in case that a radiation current is provided to the second feeding pattern (PP2) (see FIG. 11) in the antenna structure 1100. FIG. 13 is a cross-sectional view of the y-z plane of the antenna structure 1100, showing the magnetic field (H-field) with respect to the effect of the second antenna 52 on the first antenna 51, for example, in case that a radiation current is provided to the second feeding pattern (PP2) (see FIG. 11) in the antenna structure 1100. FIG. 14 is an x-y plan view of the antenna structure 1100, showing a flow of a surface current with respect to the effect of the second antenna 52 on the first antenna 51, for example, in case that a radiation current is provided to the second feeding pattern (PP2) in the antenna structure 1100.

Referring to FIGS. 11, 12, and 13, in case that a radiation current is provided to the second feeding pattern (PP2), energy may be excited to the first antenna element 51 due to electromagnetic coupling between the second antenna 52 and the first antenna 51. For example, there may be an energy component (e.g., see the portion indicated by reference numeral "1101" in FIG. 11) excited from the second feeding pattern (PP2) of the second antenna 52 to the first feeding pattern (PP1) of the first antenna 51. For example, there may be an energy component (e.g., see the portion indicated by reference numeral "1102" in FIG. 11) excited from the second antenna element ② of the second antenna 52 to the first antenna element ① of the first antenna 51. In case that a radiation current is provided to the second feeding pattern (PP2), a surface current may flow as shown in FIG. 14. For example, in case that a radio wave radiated from the second antenna 52 reaches the first antenna 51, a surface current in the form of alternating current may be excited and flow. The radio waves that met the first antenna 51 while flowing may reach the first antenna 51 through which electricity is well conducted, and accordingly, substantially all of the energy may be changed into an electric current on the surface of the conductor in an instant. The surface current in the form of alternating current may generate radio waves (radiation energy) according to the change in the current. For example, in case that a radiation current is provided to the second feeding pattern (PP2), the surface current formed due to the electromagnetic effect of the second antenna 52 on the first antenna 51 may generate radio waves (radiated energy) at the edge of the first antenna element ①. The surface current generated by the electromagnetic effect of the second antenna 52 on the first antenna 51 and radio waves resulting therefrom may reduce the antenna radiation performance of the first antenna 51.

Figure 15:
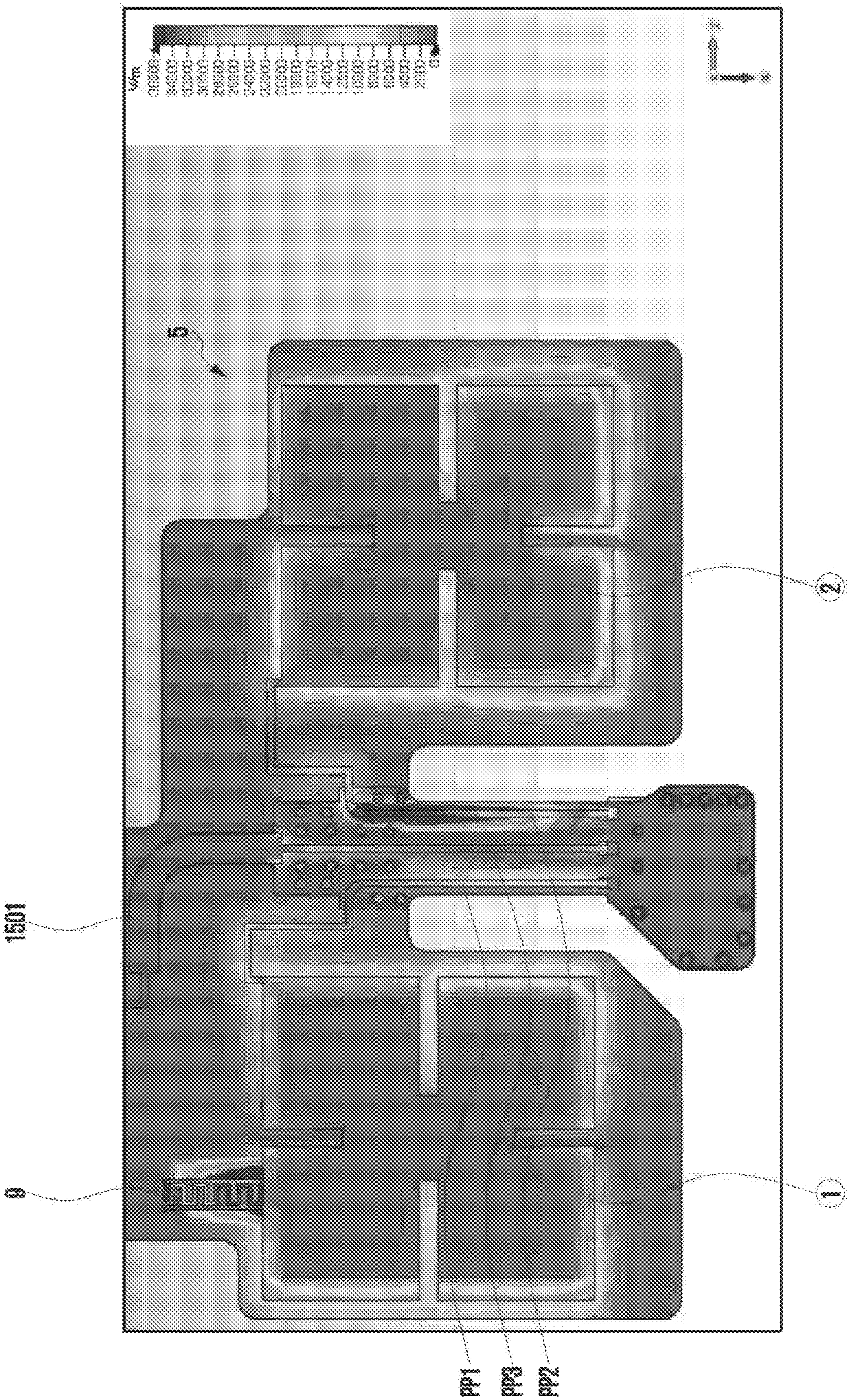
FIG. 15 is an x-y plan view of an antenna structure according to one embodiment, showing the electric field with respect to the effect of a second antenna on a first antenna in case that a radiation current is provided to a second feeding pattern in the antenna structure.
Figure 16:
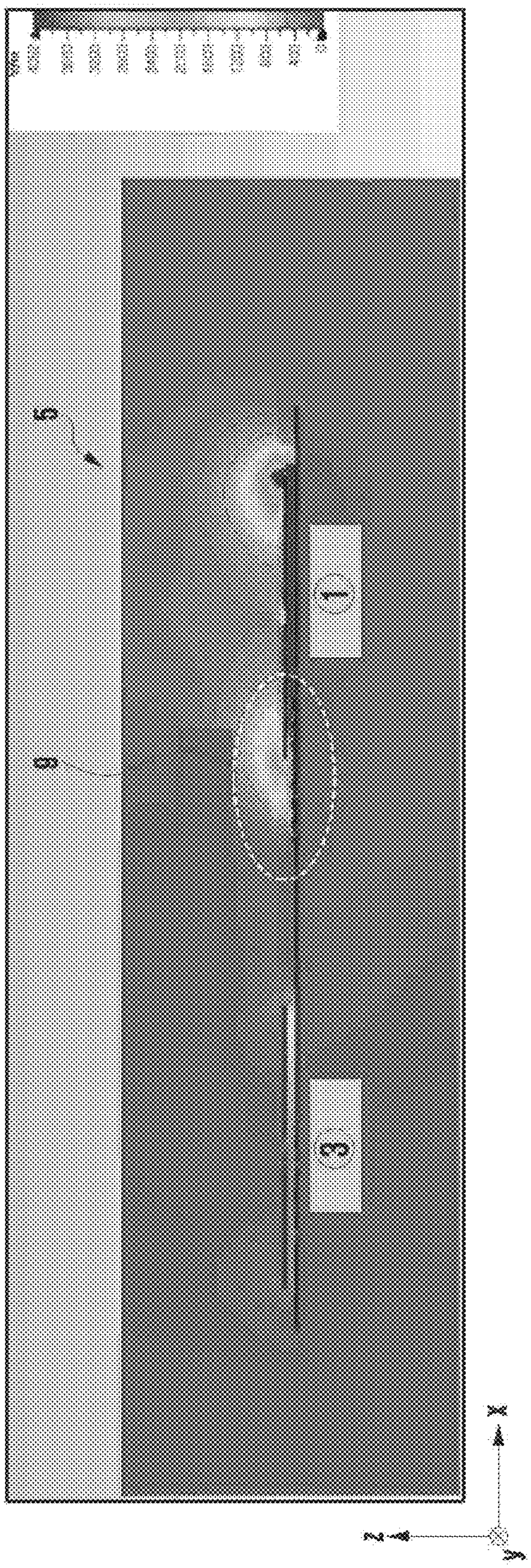
FIG. 16 is a cross-sectional view of the x-z plan of an antenna structure according to one embodiment, showing the electric field with respect to the effect of a second antenna on a first antenna in case that a radiation current is provided to a second feeding pattern in the antenna structure.
Figure 17:
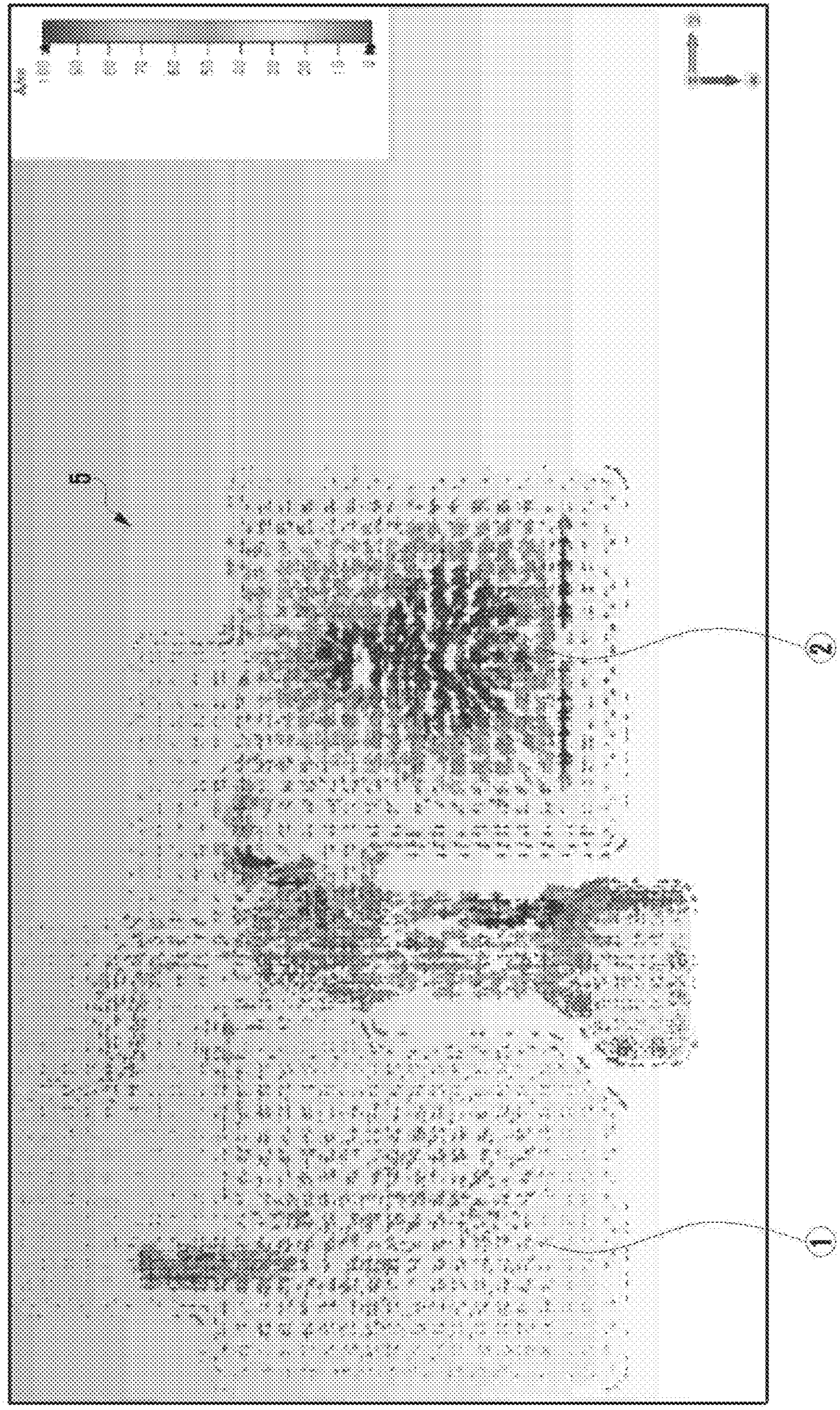
FIG. 17 is an x-y plan view of an antenna structure according to one embodiment, showing a flow of a surface current with respect to the effect of a second antenna on a first antenna in case that a radiation current is provided to a second feeding pattern in the antenna structure.

FIG. 15 is an x-y plan view of an antenna structure 5 showing the electric field with respect to the effect of the second antenna 52 on the first antenna 51 in case that a radiation current is provided to the second feeding pattern (PP2) in the antenna structure 5. FIG. 16 is a cross-sectional view of the x-z plan of the antenna structure 5, showing the electric field with respect to the effect of the second antenna 52 on the first antenna 51 in case that a radiation current is provided to the second feeding pattern (PP2) (see FIG. 15) in the antenna structure 5. FIG. 17 is an x-y plan view of the antenna structure 5, showing a flow of a surface current with respect to the effect of the second antenna 52 on the first antenna 51 in case that a radiation current is provided to the second feeding pattern (PP2) (see FIG. 15) in the antenna structure 5.

The antenna structure 5 of FIGS. 15, 16, and 17, compared to the antenna structure 1100 described with reference to FIGS. 11, 12, 13, and 14, the antenna structure 5 may reduce the electromagnetic effect of the second antenna 52 on the first antenna 51 due to the conductive pattern 9 electrically connected to the ground plane (e.g., the second conductive layer 702 in FIG. 10).

Compared to the antenna structure 1100, the antenna structure 5 according to one embodiment may reduce the energy (or surface current) excited to the first antenna 51 due to electromagnetic coupling between the second antenna 52 and the first antenna 51 from being formed in the first antenna 51. For example, in case that a radiation current is provided to the second feeding pattern (PP2), the energy (or surface current) excited to the first antenna 51 due to electromagnetic coupling between the second antenna 52 and the first antenna 51 may be transferred (or transmitted, excited, or induced) to the conductive pattern 9 due to electromagnetic coupling between the first antenna 51 and the conductive pattern 9 and thus be absorbed by the ground plane. The electromagnetic effect of the second antenna 52 on the first antenna 51 can be reduced due to the conductive pattern 9 electrically connected to the ground plane, to improve isolation of the first antenna 51 from the second antenna 52. Accordingly, degradation of the antenna radiation performance can be mitigated, if not prevented.

According to one embodiment, a distance at which the first antenna element ① of the first antenna 51 is spaced apart from the second antenna element ② of the second antenna 52 may be greater than a distance at which the third antenna element ③ of the third antenna 53 is spaced apart from the second antenna element ② of the second antenna 52. For example, the second antenna element ② and the third antenna element ③ may be positioned to be spaced apart from each other so as to have isolation of a designated value or higher at which the antenna radiation performance can be secured. Referring to the electric field distribution shown in FIG. 16, in case that a radiation current is provided to the second feeding pattern (PP2), the electromagnetic effect of the second antenna 52 on the third antenna 53 may be smaller than the electromagnetic effect of the second antenna 52 on the first antenna 51 or may be weak enough to ensure the antenna radiation performance. Energy (or surface current) excited to the third feeding pattern (PP3) due to electromagnetic coupling between the second feeding pattern (PP2) of the second antenna 52 and the third feeding pattern (PP3) of the third antenna 53 may exist. However, in one embodiment, a portion 1501 (e.g., a transformer line) (see FIG. 15) having a width greater than other portions of the third feeding pattern (PP3) may contribute to reducing the effect of the second antenna 52 on the third antenna 53, based on the phase difference in a current.

The opening 901 (see FIG. 8) of the meander pattern 902 included in the conductive pattern 9 may reduce the energy (or surface current) transferred to the first antenna 51 due to the electromagnetic coupling between the first antenna 51 and the second antenna 52. This will be described with reference to FIG. 18.

Figure 18:
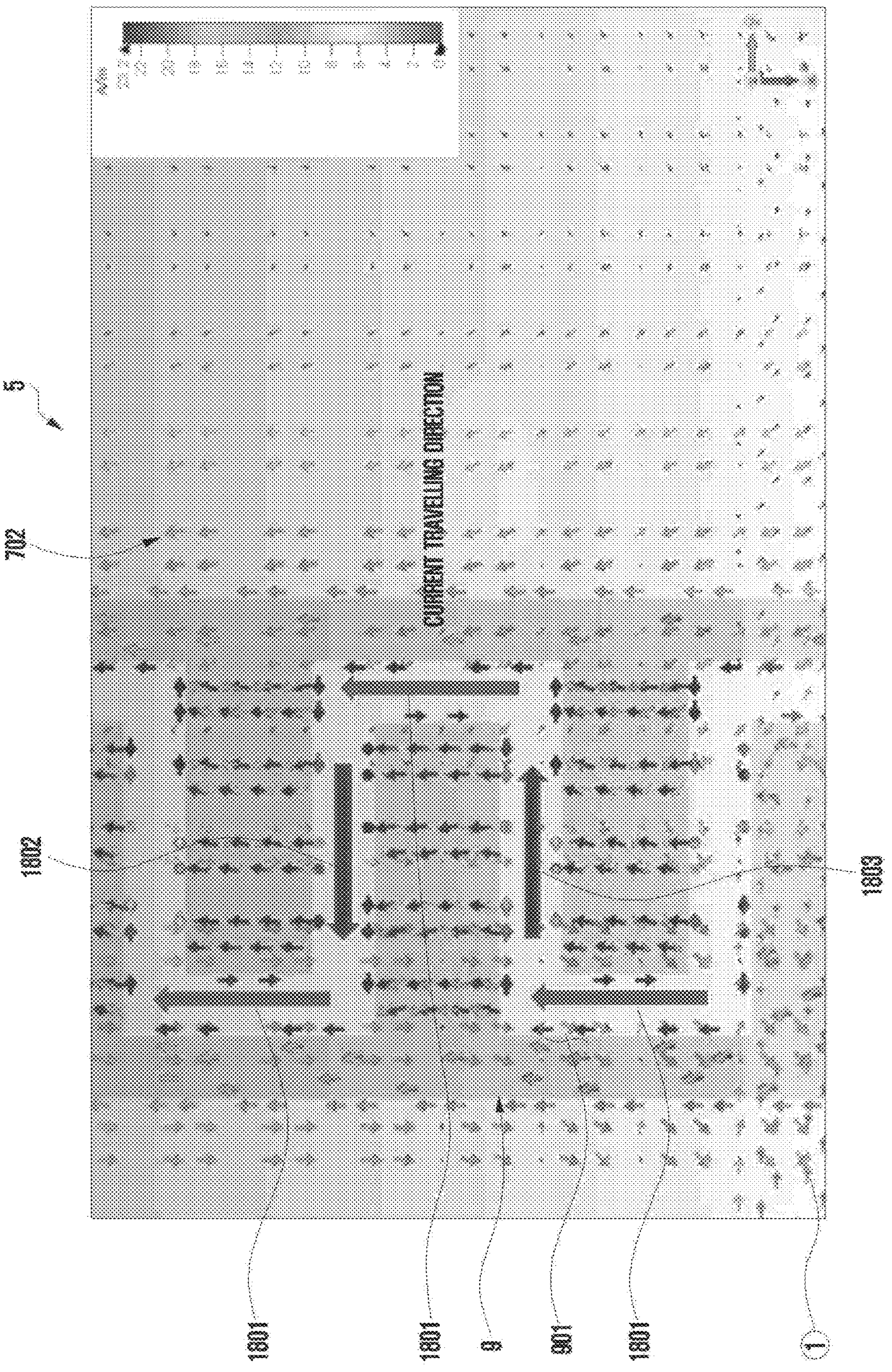
FIG. 18 is an x-y plan view of an antenna structure according to one embodiment, showing a flow of surface current in case that a radiation current is provided from the antenna structure to a second feeding pattern in the antenna structure.

FIG. 18 is an x-y plan view of the antenna structure 5 according to one embodiment, showing a flow of surface current in case that a radiation current is provided from the antenna structure 5 to the second feeding pattern (PP2) (see FIG. 15) in the antenna structure 5.

It can be seen that current flows in three directions 1801, 1802, and 1803. Referring to FIG. 18, in case that a radiation current is provided to the second feeding pattern (PP2), a surface current excited to the first antenna 51 due to the electromagnetic coupling between the first antenna 51 and the second antenna 52 may be transferred (or transmitted, excited, or induced) to the conductive pattern 9 electrically connected to the second conductive layer 702 (e.g., a ground plane) of the printed circuit board 7 due to electromagnetic coupling between the first antenna element ①) and the conductive pattern 9 to flow thereinto. In one embodiment, a relatively higher amount of surface current may flow along the surface of or around the surface of the opening 901 of the conductive pattern 9. A surface current in the form of alternating current flowing along the surface of or around the surface of the opening 901 may flow along the meander pattern 902 (see FIG. 8) of the opening 901, and, for example, may include a first current component, a second current component, and a third current component. As indicated by reference numeral "1801", in the meander patterns 902, the first current component may flow in a first travelling direction (e.g., the −x-axis direction) along a pattern extending in a first direction (e.g., the x-axis direction). As indicated by reference numeral "1802", in the meander patterns 902, the second current component may flow in a second travelling direction (e.g., the −y-axis direction) along a pattern extending in a second direction (e.g., the y-axis direction) different from the first direction. As indicated by reference numeral "1803", in the meander pattern 902, the third current component may flow in a third travelling direction (e.g., in the +y-axis direction) substantially opposite to the second travel direction along a pattern extending in the second direction (e.g., the y-axis direction). The first current component may emit first wave energy according to a change in a current. The second current component may emit second wave energy according to a change in a current. The third current component may emit third wave energy according to a change in a current. The first wave energy, the second wave energy, and the third wave energy may be synthesized through cancellation and/or compensation according to the phase of a current. For example, the second wave energy based on the surface current in the second travelling direction and the third wave energy based on the surface current in the third travelling direction may be synthesized and substantially cancel each other. The first wave energy based on the surface current in the first travelling direction may flow into the ground plane (e.g., the second conductive layer 702 in FIG. 9) of the printed circuit board 7 through the plurality of fourth conductive vias (V41, V42, V43, V44) (see FIG. 8) to be absorbed by the ground plane. In case that any part of the second wave energy or the third wave energy is not cancelled, the part may flow into the ground plane of the printed circuit board 7 through the plurality of fourth conductive vias (V41, V42, V43, V44) (see FIG. 8) to be absorbed by the ground plane.

Figure 19:
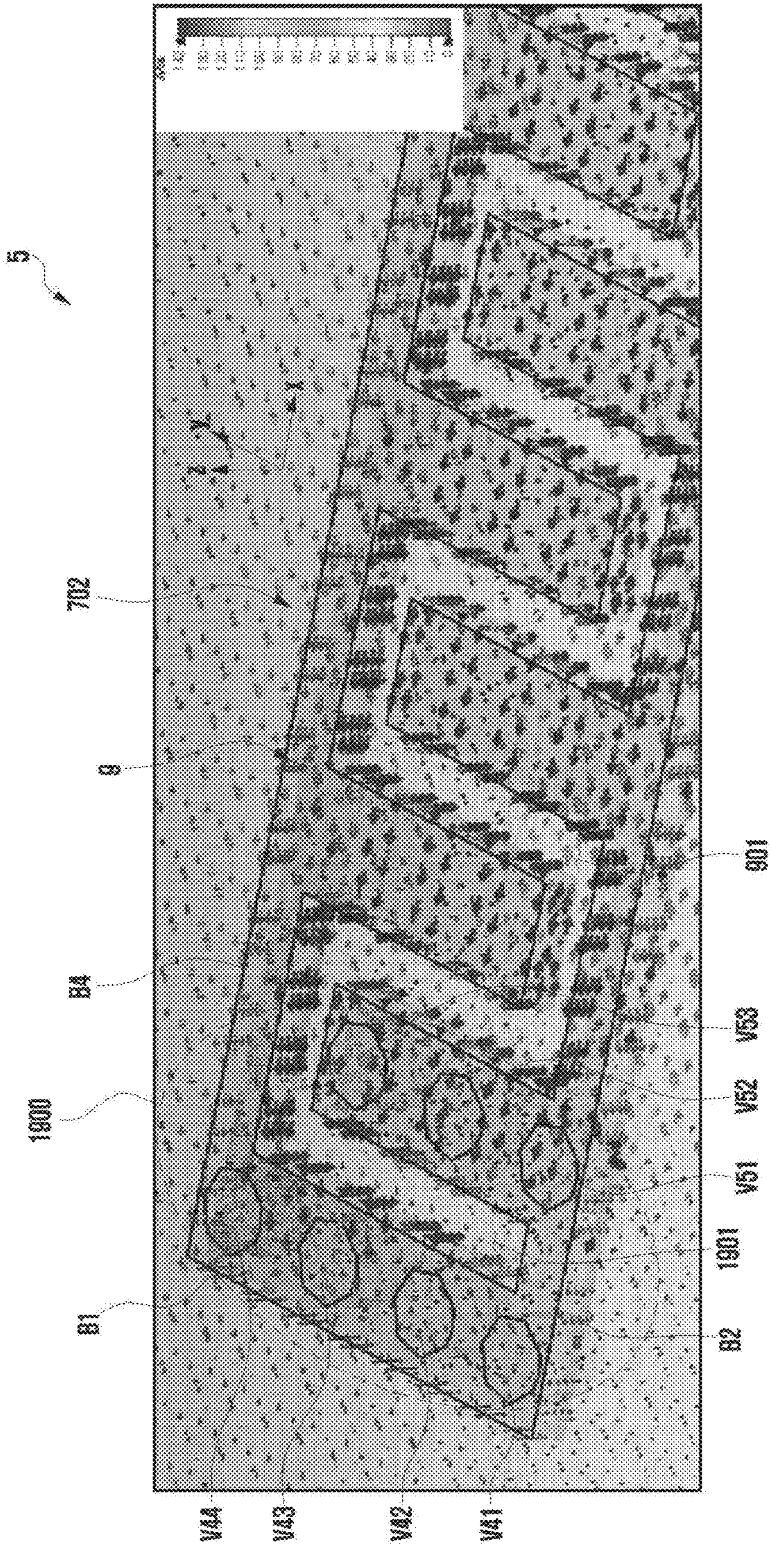
FIG. 19 shows a flow of a surface current in a portion of an antenna structure according to certain embodiments in case that a radiation current is provided to a second feeding pattern in the antenna structure.

FIG. 19 shows a flow of a surface current in a portion of the antenna structure 5 according to certain embodiments in case that a radiation current is provided to the second feeding pattern (PP2) (see FIG. 15) in the antenna structure 5.

Referring to FIG. 19, the antenna structure 5 may include a plurality of fourth conductive vias (V41, V42, V43, V44) and a plurality of fifth conductive vias (V51, V52, V53). The plurality of fourth conductive vias (V41, V42, V43, V44) and the plurality of fifth conductive vias (V51, V52, V53) may electrically connect the conductive pattern 9 and the second conductive layer 702 (e.g., a ground plane) of the printed circuit board 7 to each other. The plurality of fourth conductive vias (V41, V42, V43, V44) may be positioned adjacent to the first border (B1) of the conductive pattern 9 and may be arranged in the y-axis direction. The plurality of fifth conductive vias (V51, V52, V53) may be spaced apart from the plurality of fourth conductive vias (V41, V42, V43, V44) in the +x-axis direction and may be arranged in the y-axis direction. In one embodiment, among the meander patterns 902 (see FIG. 8) of the opening 901, the pattern 1901 located closest to the first border (B1) of the conductive pattern 9 and extending in the y-axis direction may be positioned between the plurality of fourth conductive vias (V41, V42, V43, V44) and the plurality of fifth conductive vias (V51, V52, V53) when viewed from above the first surface 7A (see FIG. 7) of the printed circuit board 7 (e.g., when viewed in the −z axis direction). The surface current excited to the first antenna 51 due to the electromagnetic coupling between the first antenna 51 (see FIG. 7) and the second antenna 52 (see FIG. 7) may be transferred (or transmitted, excited, or induced) to the conductive patterns 9 due to the electromagnetic coupling between the first antenna 51 and the conductive patterns 9 to flow thereinto. The surface current flowing in the conductive pattern 9 may flow into the second conductive layer 702 (e.g., a ground plane) through the plurality of fourth conductive vias (V41, V42, V43, V44) and the plurality of fifth conductive vias (V51, V52, V53) to be absorbed by the second conductive layer 702. In one embodiment, the embodiment in FIG. 19 including the plurality of fifth conductive vias (V51, V52, V53) may reduce energy (or reflected energy or reflected energy component) returned from and around the first border (B1) of the conductive pattern 9, compared to the embodiment in FIG. 8 including the plurality of fourth conductive vias (V41, V42, V43, V44). The illustrated example shows two rows of conductive vias (e.g., the two rows of conductive via structure 1900) including a plurality of fourth conductive vias (V41, V42, V43, V44) and the plurality of fifth conductive vias (V51, V52, V53). However, in an embodiment, a conductive via structure including three or more rows of conductive vias may be implemented. The position or number of the fourth conductive vias or the fifth conductive vias are not limited to the illustrated examples and may vary. In an embodiment, the plurality of fourth conductive vias or the plurality of fifth conductive vias may be positioned adjacent to the second border (B2) or the fourth border (B4) of the conductive pattern 9 and may be arranged in the x-axis direction. In an embodiment, the plurality of fourth conductive vias may be arranged in the x-axis direction to be adjacent to the second border (B2) of the conductive pattern 9, and the plurality of fifth conductive vias may be arranged in the x-axis direction to be adjacent to the fourth border (B4) of the conductive pattern 9.

Figure 20:
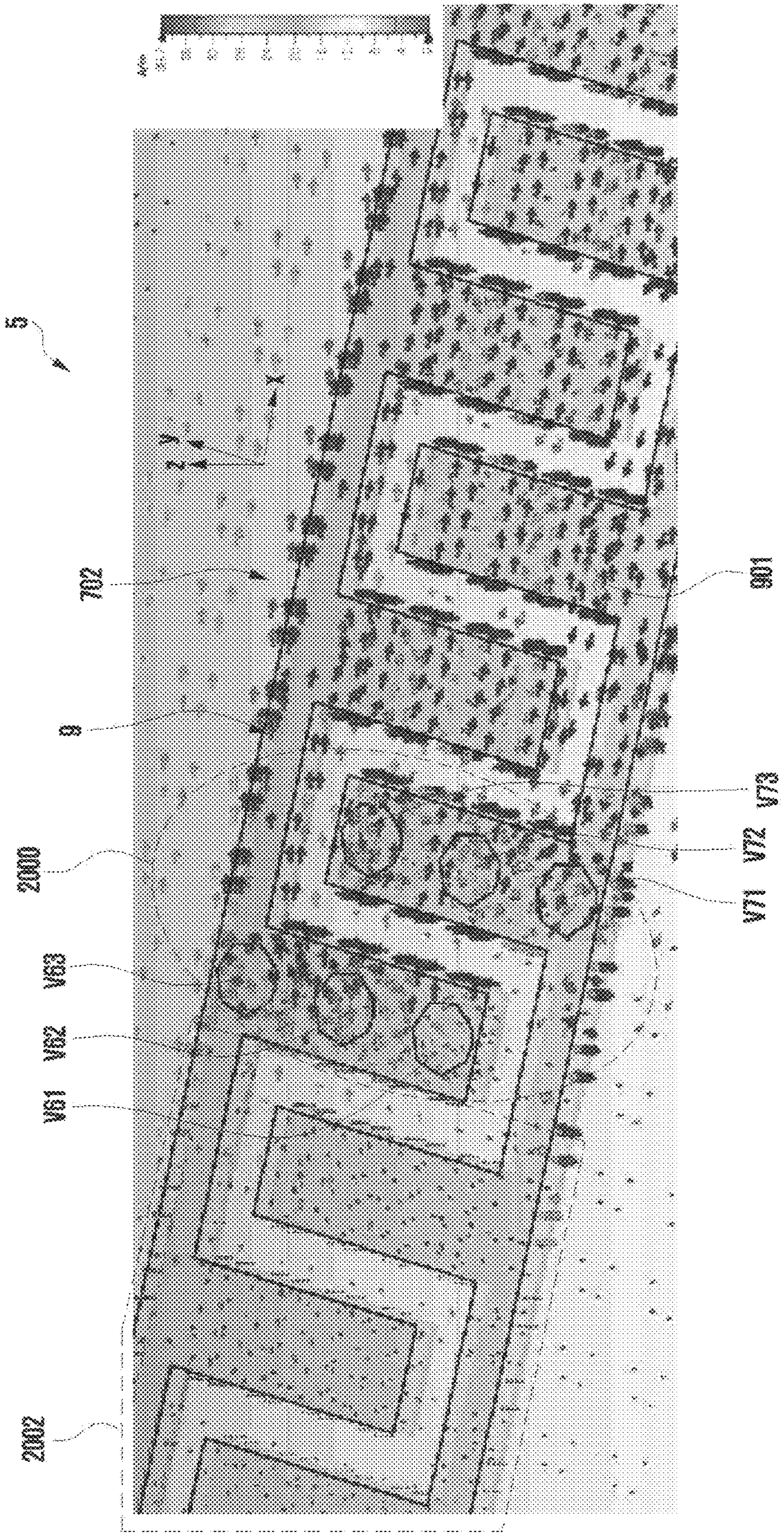
FIG. 20 shows a flow of a surface current in a portion of an antenna structure according to certain embodiments in case that a radiation current is provided to a second feeding pattern in the antenna structure.

FIG. 20 shows a flow of a surface current in a portion of the antenna structure 5 according to certain embodiments in case that a radiation current is provided to the second feeding pattern (PP2) (see FIG. 15) in the antenna structure 5.

Referring to FIG. 20, the antenna structure 5 may include two rows of conductive via structures 2000 (e.g., the two rows of conductive via structures 1900 in FIG. 19) including a plurality of sixth conductive vias (V61, V62, V63, V64) and a plurality of seventh conductive vias (V71, V72, V73) which electrically connect the conductive pattern 9 and the second conductive layer 702 (e.g., aground plane). The conductive pattern 9 in FIG. 20 is a modified example of the conductive pattern 9 in FIG. 19, and may include a portion (hereafter, an extension portion 2002) further extending in the −x axis direction from the two rows of the conductive via structures 2000, compared to the conductive pattern 9 in FIG. 19. The opening 901 may extend to the extension portion 2002. In an embodiment, the extension portion 2002 may include at least one conductive pattern. The extension portion 2002 may include a plurality of vias. The surface current excited to the first antenna 51 due to the electromagnetic coupling between the first antenna 51 (see FIG. 7) and the second antenna 52 (see FIG. 7) may be transferred (or transmitted, excited, or induced) to the conductive patterns 9 due to the electromagnetic coupling between the first antenna 51 and the conductive patterns 9 to flow thereinto. The surface current flowing in the conductive pattern 9 may flow to the second conductive layer 702 (e.g., a ground plane) through the two rows of conductive via structures 2000 to be absorbed by the second conductive layer 702. Surface current does not substantially flow in the extension portion 2002 of the conductive pattern 9, so that energy (or radio waves) radiated through the extension portion 2002 may not be substantially generated.

Figure 21:
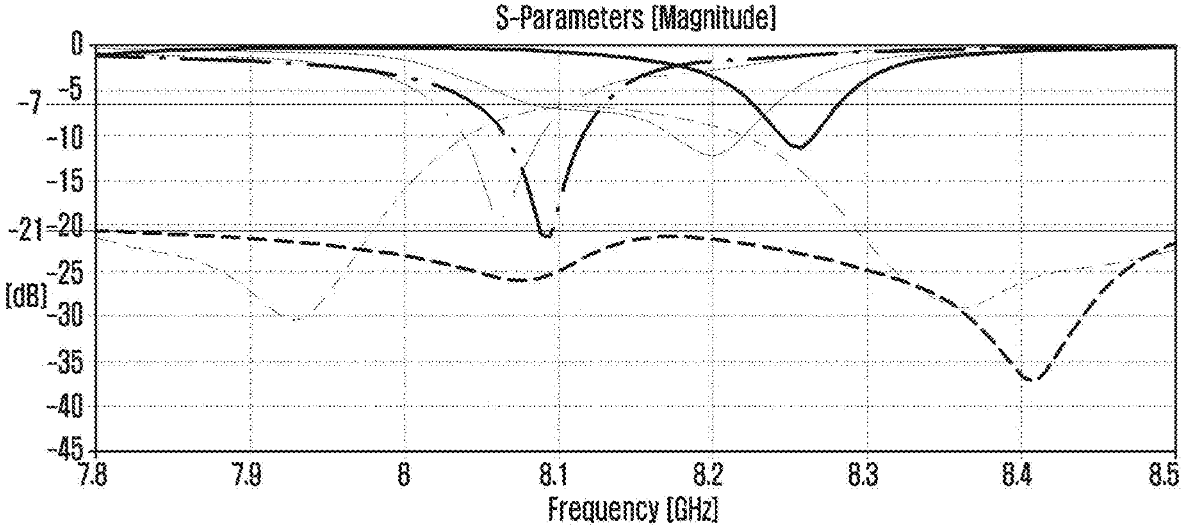
FIG. 21 is a graph showing radiation characteristics of a first antenna according to one embodiment in case that power is supplied to a second antenna in an antenna structure, and showing radiation characteristics of the first antenna wherein power is supplied to the second antenna in an antenna structure.

FIG. 21 is a graph showing radiation characteristics (e.g., S-parameters) of the first antenna 51 as a function of frequency, according to one embodiment in case that power is supplied to the second antenna 52 in the antenna structure 5 (see FIG. 7), and showing radiation characteristics of the first antenna 51 according to a case that power is supplied to the second antenna 52 in the antenna structure 1100 (see FIG. 11).

Referring to FIGS. 7, 11, and 21, the antenna structure 5 according to one embodiment may be electrically connected to a ground plane (e.g., the second conductive layer 702 in FIG. 9) and thus improve isolation of the first antenna 51 with respect to the second antenna 52, compared to the antenna structure 1100, due to the conductive pattern 9 electromagnetically coupled to the first antenna 51. For example, in case that power is supplied to the second antenna 52 from the antenna structure 1100, the isolation of the first antenna 51 with respect to the second antenna 52 in a designated or selected frequency band (or a used frequency band) (e.g., a band including a used frequency of about 8 GHz to about 8.3 GHz) may be a peak value of about −7 dB, which makes it difficult to secure antenna radiation performance. For example, in case that power is supplied to the second antenna 52 from the antenna structure 5 The isolation of the first antenna 51 with respect to the second antenna 52 in a designated or selected frequency band (e.g., a band including a used frequency of about 8 GHz) may be a peak value of about −21 dB, which is a designated value (e.g., about −15 dB) or higher at which antenna radiation performance can be secured.

The conductive pattern 9 included in the antenna structure 5 may affect the resonance characteristic of the first antenna 51. In one embodiment, the antenna radiation performance is only not substantially deviated from a desired level or range by the effect of the conductive pattern 9 on the resonance characteristic of the first antenna 51. For example, the resonance frequency of the first antenna element ① (see FIG. 7) may be shifted higher to about 50 MHz (see S11) or shifted higher to about 40 MHz (see S22) due to the conductive pattern 9, but may not deviate from a selected or designated frequency band. In an embodiment, the electronic device may further include at least one matching circuit (e.g., various elements or frequency adjustment circuit implemented as a conductive pattern) connected to a transmission line between the antenna structure 5 and the wireless communication circuit (e.g., the wireless communication module 192 in FIG. 1) or included in the antenna structure 5. For example, the matching circuit included in the antenna structure 5 may be disposed on the printed circuit board 7 (see FIG. 7) to be electrically connected to the first electrical path (EP1). The matching circuit may contribute to causing the first antenna element ① to substantially resonate at the used frequency. In an embodiment, a desired resonance characteristic (e.g., a resonance frequency) may be formed by using a method of deforming (or adjusting) the shape of the first antenna element ① in consideration of the effect of the conductive pattern 9.

According to one embodiment, since the conductive pattern 9 included in the antenna structure 5 may affect the resonance characteristic of the first antenna 51, the conductive pattern 9 may have an electrical length (e.g., a length expressed as a ratio of wavelengths) that can contribute to causing the first antenna element ① (see FIG. 7) to substantially resonate at a used frequency. For example, the meander pattern 902 of the opening 901 included in the conductive pattern 9 may contribute to reducing the physical size (or physical length) of the conductive pattern 9 while securing the electrical length.

In one embodiment, referring to FIG. 8, when viewed from above the first surface 7A of the printed circuit board 7 (e.g., when viewed in the −z axis direction), the resonance characteristic of the first antenna 51 may vary according to a degree of overlap between the conductive pattern 9 and the first antenna element ① (e.g., parameter sweep). For example, in case that the conductive pattern 9 is moved in the +x-axis direction and positioned differently from the example shown in FIG. 8, the first area 91 overlapping the first antenna element ① may be increased, the second area 92 that does not overlap the antenna element ① may be reduced, and the resonance frequency of the first antenna element ① may be shifted to high frequency. For example, in case that the conductive pattern 9 is moved in the −x-axis direction and positioned differently from the example shown in FIG. 8, the first area 91 overlapping the first antenna element ① may be reduced, the second area 92 that does not overlap the first antenna element ① may be increased, and the resonant frequency of the first antenna element ① may be shifted to high frequency. The position at which the conductive pattern 9 is arranged in the y-axis direction, when viewed from above the first surface 7A of the printed circuit board 7, may be determined such that the first antenna 51 can resonate in the selected or designated frequency band.

Figure 22:
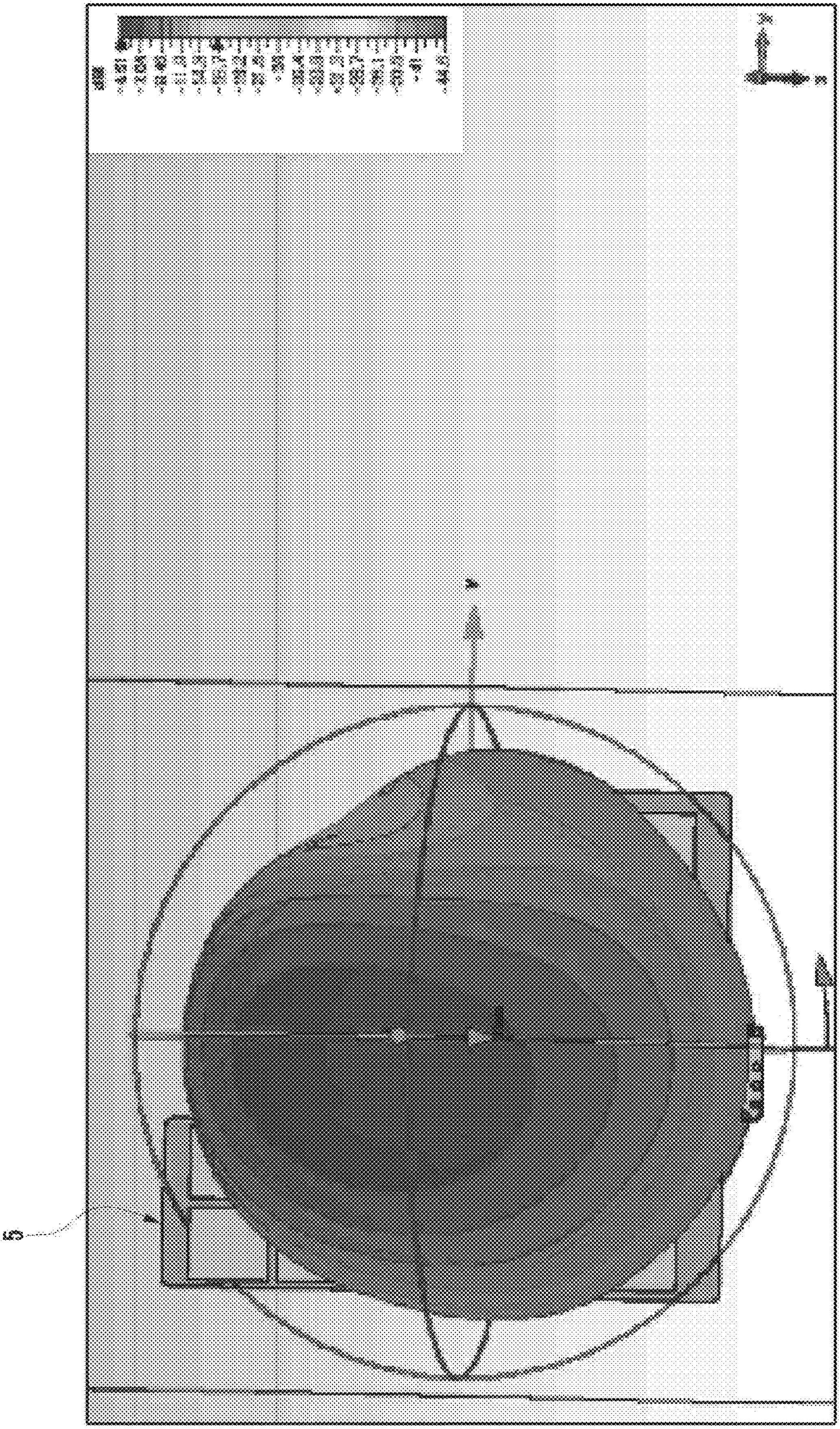
FIGS. 22 and 23 show radiation patterns for the antenna structure in FIG. 7 according to one embodiment.
Figure 23:
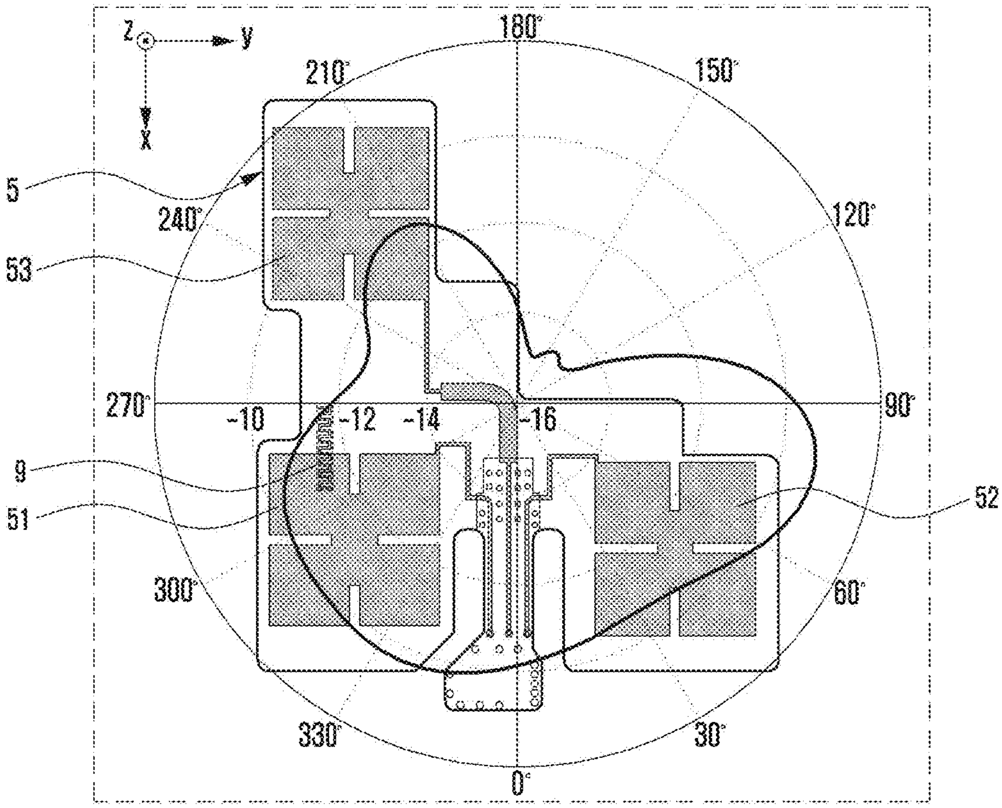
Figure 23:
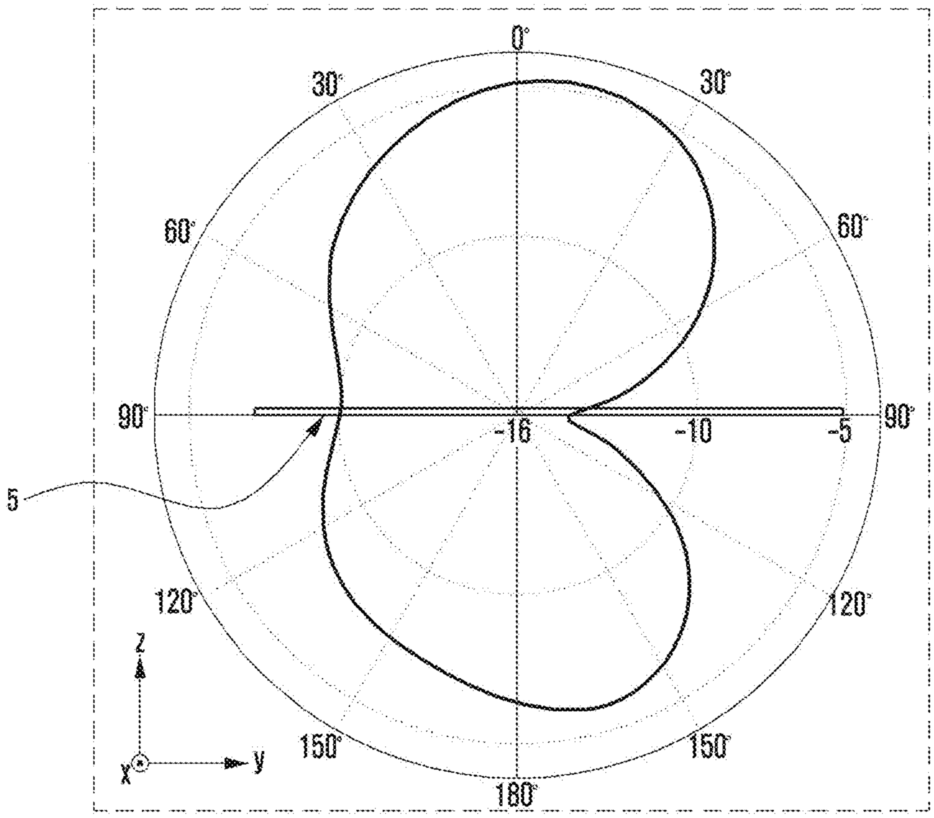
Figure 24:
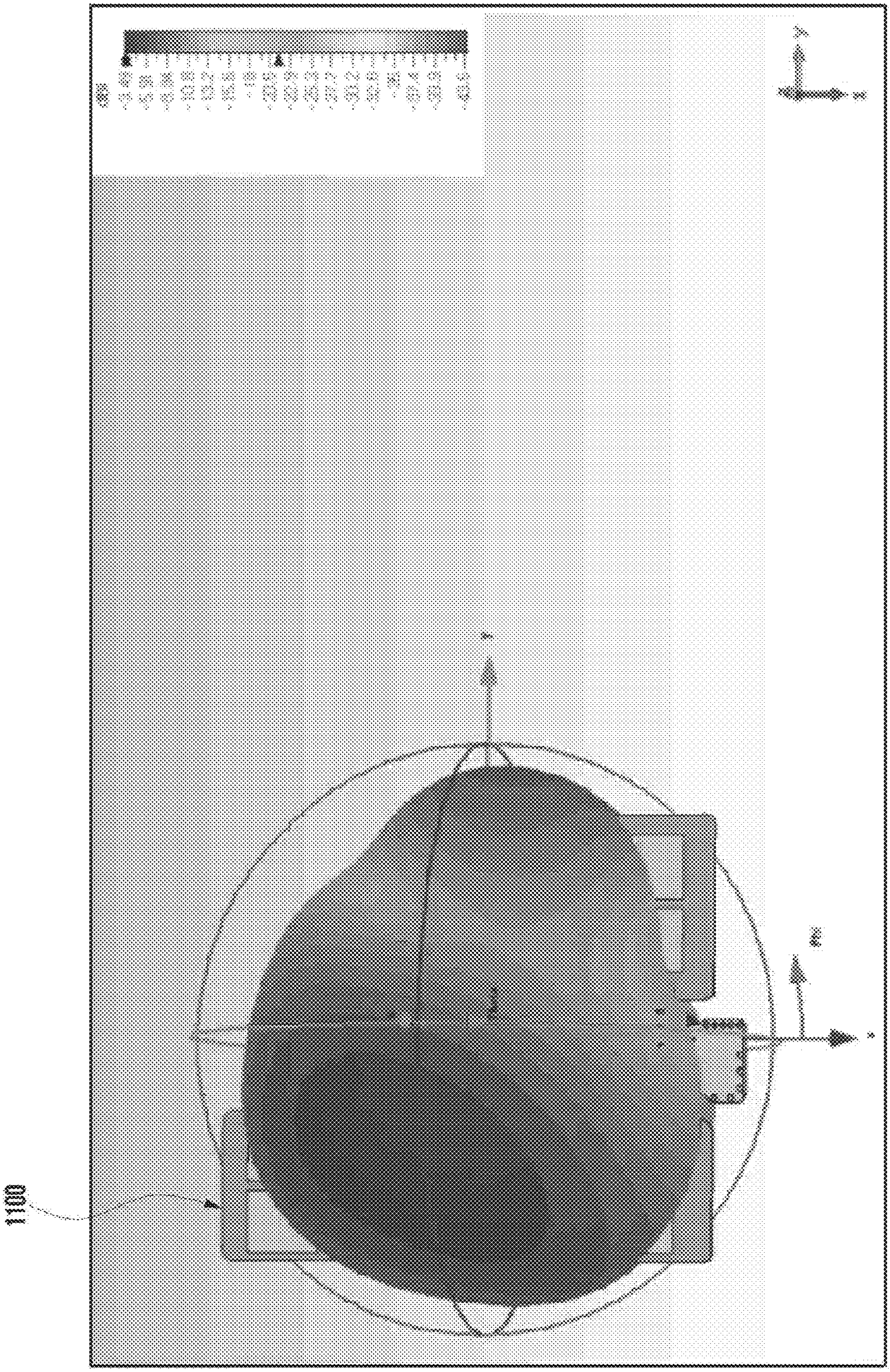
FIGS. 24 and 25 show radiation patterns for the antenna structure in FIG. 11.
Figure 25:
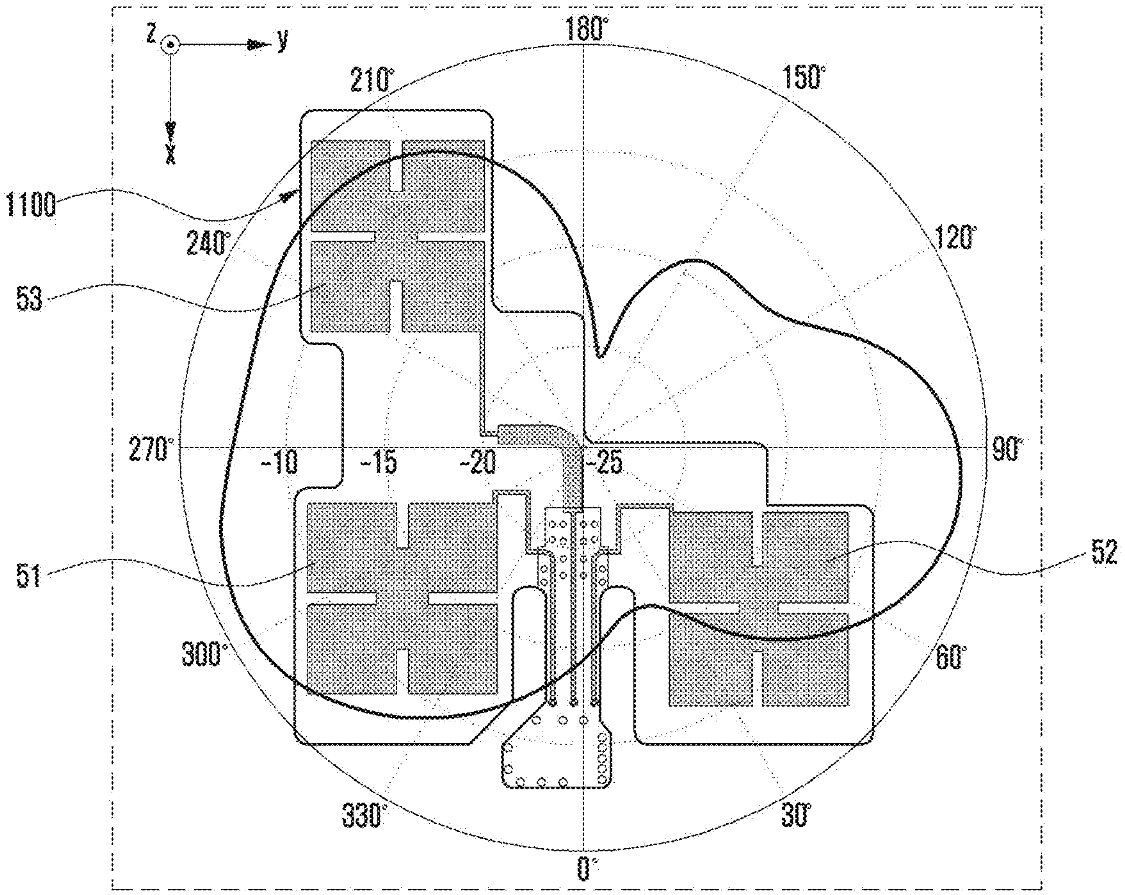

FIGS. 22 and 23 show radiation patterns for the antenna structure 5 in FIG. 7 according to one embodiment. FIGS. 24 and 25 show radiation patterns for the antenna structure 11 in FIG. 11.

Referring to FIGS. 22, 23, 24, and 25, compared to the antenna structure 1100, the antenna structure 11 according to one embodiment may be electrically connected to the ground plane (e.g., the second conductive layer 702 in FIG. 9) and may have a radiation pattern (or a beam pattern) (e.g., an omni-directional radiation pattern) enabling wider and more uniform radiation in space in the +z-axis direction (e.g., the direction in which the rear surface 300B of the electronic device 200 faces, in FIG. 3) due to the conductive pattern 9 for improving the isolation of the first antenna 51 with respect to the second antenna 52. A main lobe in the antenna structure 5 according to one embodiment may form an angle of about 99.7 degrees with respect to the x-y plane, and may have a radiation energy value of about 4.77 dB. A main lobe in the antenna structure 1100 may form an angle of about 75 degrees with respect to the x-y plane, and may have a radiation energy value of about 5.48 dB. The main lobe, for example, refers to a beam of the beam pattern in which a relatively large amount of energy is radiated in the maximum radiation boresight, and the antenna structure 5 may substantially transmit and/or receive a frequency signal through the main lobe. In the case of the antenna structure 5 according to one embodiment, at a used frequency of about 8.2 GHz, the main lobe magnitude may be about −4.77 dBi and the 3 dB angular width may be about 99.7 degrees. In the case of the antenna structure 11 according to the example in FIG. 25, at a used frequency of about 8.2 GHz, the main lobe magnitude may be about −5.48 dBi and the 3 dB angular width may be about 16.0 degrees. The antenna structure 5 according to one embodiment may form a main lobe capable of securing radio wave transmission/reception performance at a used frequency, compared to the antenna structure 1100 according to the example. Compared to the antenna structure 1100 according to the example, the antenna structure 5 according to one embodiment may have an improved 3 dB angular width, that is, a half power beam width, thereby having a further omnidirectional radiation pattern (or beam pattern).

Figure 26:
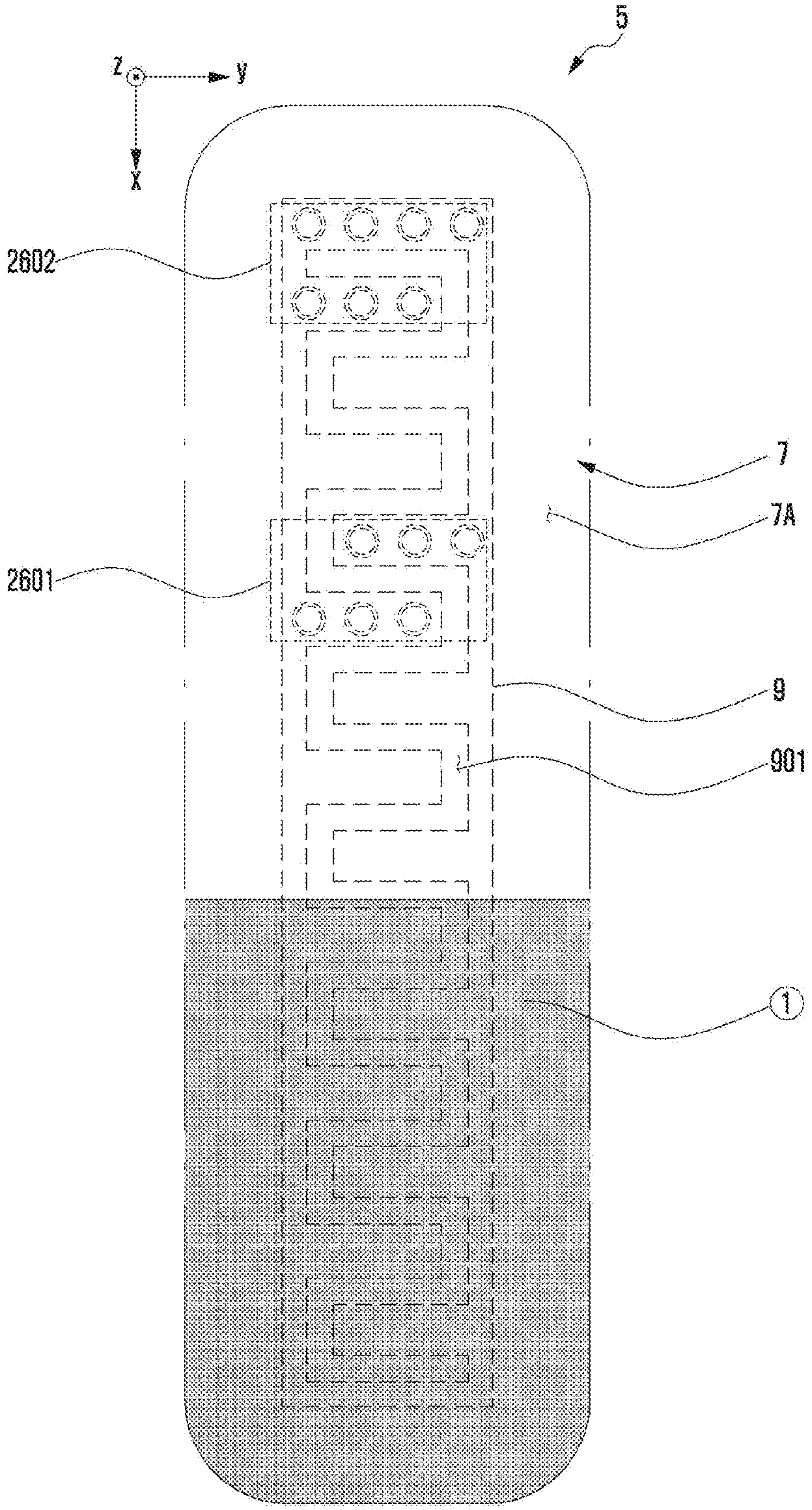
FIG. 26 is an x-y plan view of a portion of a printed circuit board included in an antenna structure according to certain embodiments.
Figure 27:
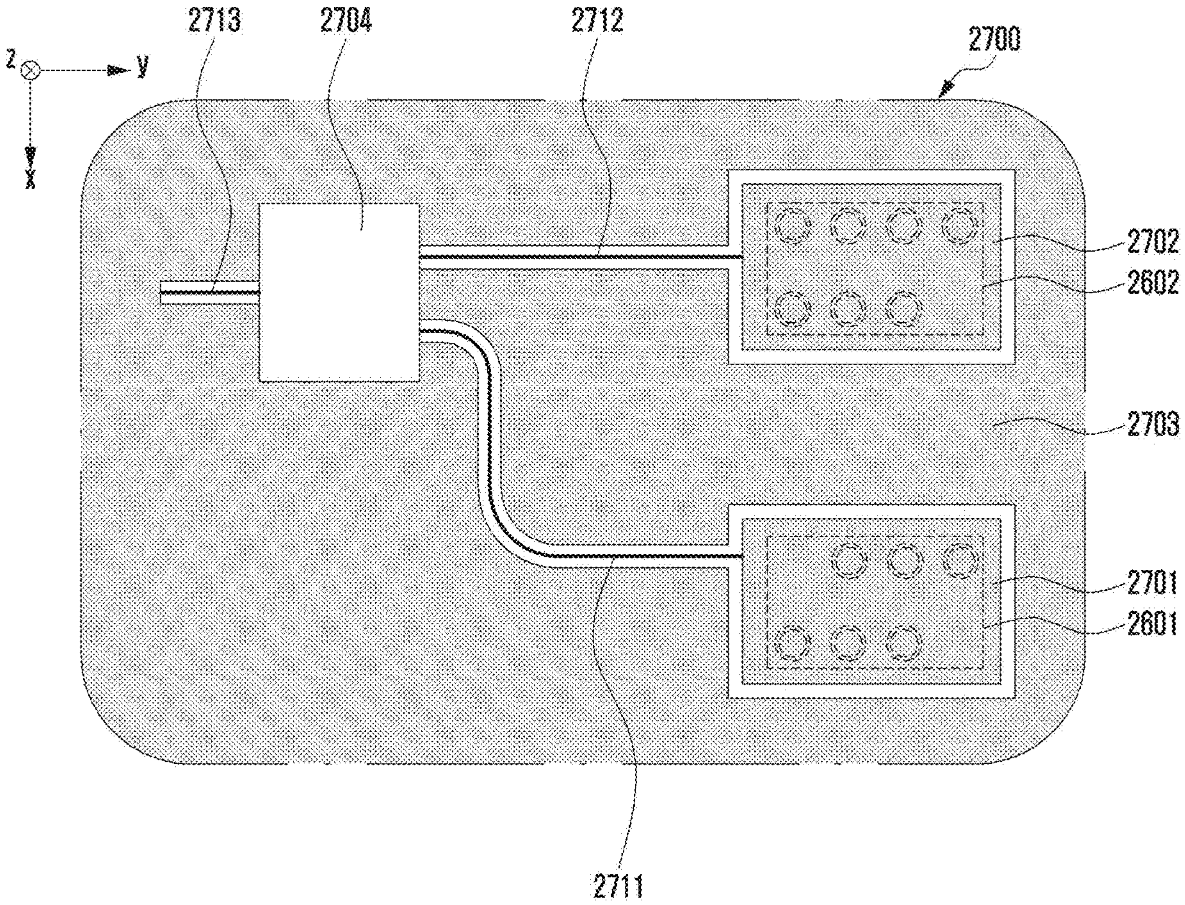
FIG. 27 is an x-y plan view of a second conductive layer included in the printed circuit board in connection with the embodiment in FIG. 26.
Figure 28:
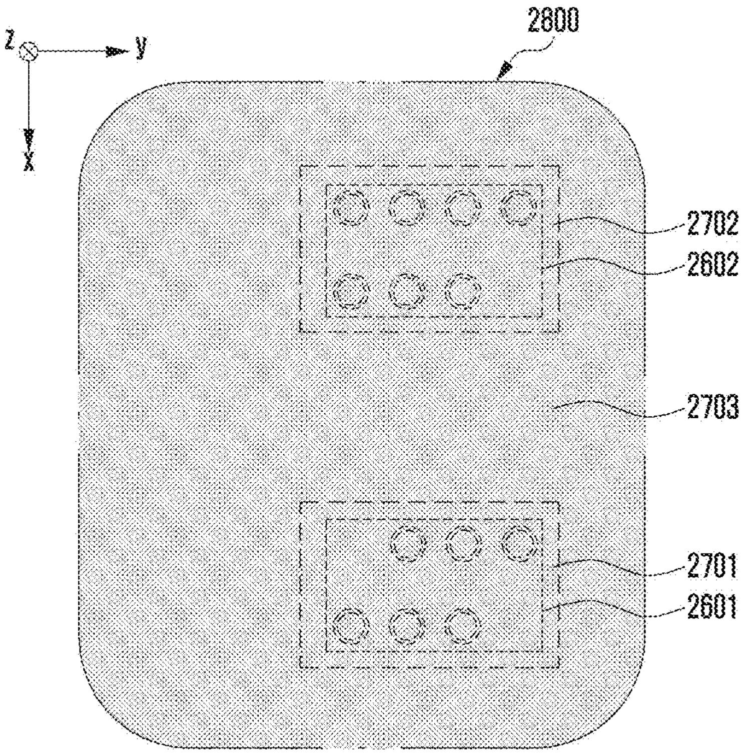
FIG. 28 is an x-y plan view of a second conductive layer included in the printed circuit board in connection with the embodiment in FIG. 26, according to certain embodiments.
Figure 29:
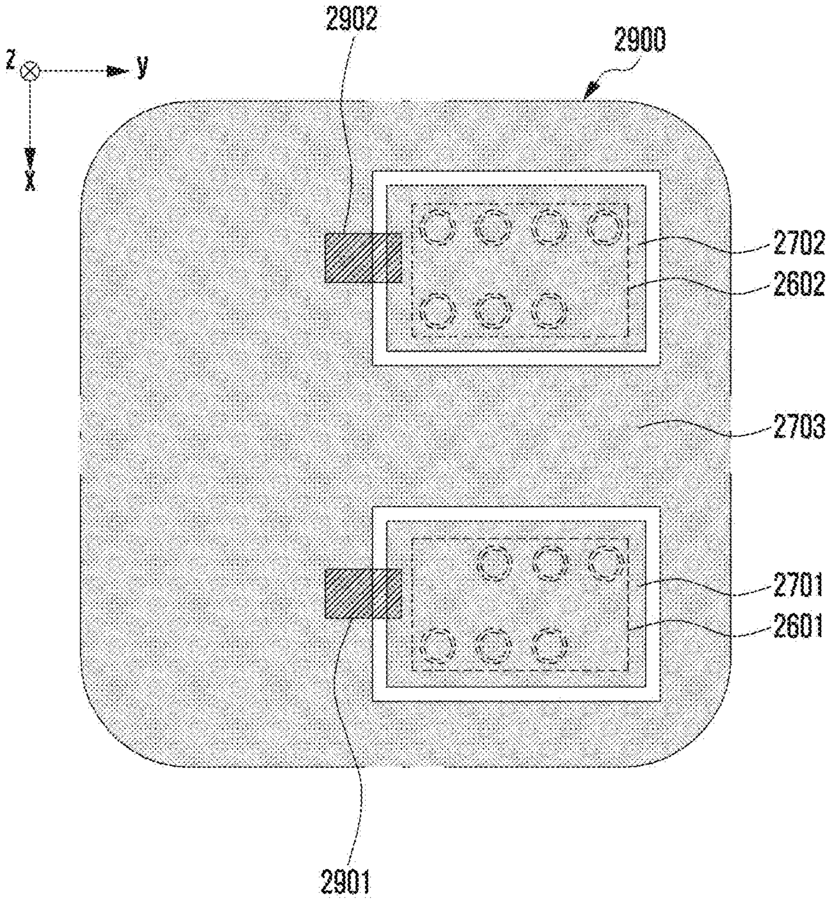
FIG. 29 is an x-y plan view of a second conductive layer included in the printed circuit board in connection with the embodiment in FIG. 26, according to certain embodiments.

FIG. 26 is an x-y plan view of a portion of a printed circuit board (see FIG. 7) included in the antenna structure 5 according to certain embodiments. FIG. 27 is an x-y plan view of a second conductive layer 2700 included in the printed circuit board 7 in connection with the embodiment in FIG. 26. FIG. 28 is an x-y plan view of a second conductive layer 2800 included in the printed circuit board 7 in connection with the embodiment in FIG. 26, according to certain embodiments. FIG. 29 is an x-y plan view of a second conductive layer 2900 included in the printed circuit board 7 in connection with the embodiment in FIG. 26, according to certain embodiments.

Referring to FIGS. 26 and 27, the antenna structure 5 may include a conductive pattern 9, a first antenna element ①, a first conductive via structure (or at least one first conductive via) 2601, a second a conductive via structure (or at least one second conductive via) 2602, a second conductive layer 2700, and/or a switching circuit 2704. The conductive pattern 9, the first antenna element ①, the first conductive via structure 2601, the second conductive via structure 2602, and the second conductive layer 2700 may be included in the printed circuit board 7. The switching circuit 2704 may be located on the second surface 7 (e.g., the second surface 7B in FIG. 7) of the printed circuit board. When viewed from above the first surface 7A (e.g., when viewed in the −z axis direction), a portion of the conductive pattern 9 may overlap the first antenna element ①. The first conductive via structure 2601 or the second conductive via structure 2602 may be provided substantially in the same manner as, for example, the two rows of conductive via structure 1900 in FIG. 19 or the two rows of conductive via structure 2000 in FIG. 20. In an embodiment, the first conductive via structure 2601 or the second conductive via structure 2602 may be changed into one row of conductive via structures (see FIG. 8) or three or more rows of conductive via structures. The second conductive layer 2700 may be only different in shape from the second conductive layer 702 in FIG. 9, and may be electrically connected to the conductive pattern 9 through the first conductive via structure 2601 and the second conductive via structure 2602. In one embodiment, the first conductive via structure 2601 may be located closer to the first antenna element ① than the second conductive via structure 2602 when viewed from above the first surface 7A.

The second conductive layer 2700 may include a first conductive area 2701, a second conductive area 2702, a third conductive area 2703, a first path pattern 2711, a second path pattern 2712, and/or a third path pattern 2713. The first conductive area 2701, the second conductive area 2702, and the third conductive area 2703 may be physically separated from each other. The first conductive area (or first ground pattern) 2701 may be electrically connected to the conductive pattern 9 through the first conductive via structure 2601. The second conductive area (or second ground pattern) 2702 may be electrically connected to the conductive pattern 9 through the second conductive via structure 2602. The first path pattern 2711 may electrically connect the switching circuit 2704 and the first conductive area 2701 to each other. The second path pattern 2712 may electrically connect the switching circuit 2704 and the second conductive area 2702 to each other. The third path pattern 2713 may electrically connect the switching circuit 2704 and the third conductive area (or the third ground pattern) 2703 to each other. The third conductive area 2703 may be electrically connected to the ground included in the first board assembly 440 (see FIG. 4, 5, or 6), to substantially have an effect on the radiation performance of the antenna structure 5 or the electromagnetic shielding function with respect to the antenna structure 5. The switching circuit 2704 may selectively electrically connect the third path pattern 2713 to the first path pattern 2711 or the second path pattern 2712 under the control of a processor (e.g., the processor 120 in FIG. 1). The antenna structure 5 may resonate at a first used frequency (e.g., about 8 GHz) and a second used frequency (e.g., about 6.5 GHz). The processor may control the switching circuit 2704 according to the frequency of signals transmitted and/or received through the antenna structure 5.

According to one embodiment, in case that a signal of a first used frequency (e.g., about 8 GHz) is transmitted and/or received through the antenna structure 5, the switching circuit 2704 may electrically connect the third path pattern 2713 and the first path pattern 2711 under the control of the processor. In case that the third path pattern 2713 and the first path pattern 2711 are electrically connected by the switching circuit 2704, the first conductive area 2701 corresponding to the first conductive via structure 2601 may be electrically connected to the third conductive area 2703. In case that the conductive pattern 9 is electrically connected to the third conductive area 2703 through the first conductive via structure 2601, the isolation of the first antenna 51 with respect to the second antenna 52 (see FIG. 7) may be formed to have a designated value or higher at which antenna radiation performance can be secured at the first used frequency, due to the first electrical length of the conductive pattern 9 electromagnetically acting on the first antenna 51 (see FIG. 7).

According to one embodiment, in case that a signal of the second used frequency (e.g., about 6.5 GHz) is transmitted and/or received through the antenna structure 5, the switching circuit 2704 may electrically connect the third path pattern 2713 and the second path pattern 2712 under the control of the processor. In case that the third path pattern 2713 and the second path pattern 2712 are electrically connected by the switching circuit 2704, the second conductive area 2702 corresponding to the second conductive via structure 2602 may be electrically connected to the third conductive area 2703. In case that the conductive pattern 9 is electrically connected to the third conductive area 2703 through the second conductive via structure 2602, the isolation of the first antenna 51 with respect to the second antenna 52 (see FIG. 7) may be formed to have a designated value or higher at which antenna radiation performance can be secured at the first used frequency, due to the second electrical length of the conductive pattern 9 electromagnetically acting on the first antenna 51 (see FIG. 7).

The antenna structure 5 may include a conductive pattern 9, a first antenna element ①, a first conductive via structure (or at least one first conductive via) 2601, and a second conductive via structure (or at least one second conductive via) 2602. Electrical connection to the second conductive layer 2700 may be achieved using the conductive pattern 9, the first antenna element ①, the first conductive via structure 2601, and the second conductive via structure 2602. Referring to FIG. 28, the second conductive layer 2800 may be formed in an integral form in which the third conductive area 2703 is physically connected to the first conductive area 2701 and the second conductive area 2702.

The second conductive layer 2700 may include a first conductive area 2701, a second conductive area 2702, and a third conductive area 2703. The first conductive area 2701, the second conductive area 2702, and the third conductive area 2703 may be physically separated from each other. The first conductive area (or first ground pattern) 2701 may be electrically connected to the conductive pattern 9 through the first conductive via structure 2601. The second conductive area (or second ground pattern) 2702 may be electrically connected to the conductive pattern 9 through the second conductive via structure 2602. Unlike the embodiment in FIG. 27, the first path pattern 2711, the second path pattern 2712, and the third path pattern 2713 may be omitted in the embodiment in FIG. 29. According to the embodiment in FIG. 29, the first switching circuit 2901 may selectively electrically connect the first conductive area 2701 and the third conductive area 2703 under the control of a processor (e.g., the processor 120 in FIG. 1). According to the embodiment in FIG. 29, the second switching circuit 2902 may selectively electrically connect the second conductive area 2702 and the third conductive area 2703 under the control of the processor. In an embodiment, an integrated switching circuit including the first switching circuit 2901 and the second switching circuit 2902 may be implemented, and the integrated switching circuit may selectively electrically connect the third conductive area 2703 to the first conductive area 2701 or the second conductive area 2702 under the control of the processor.

According to an embodiment of the disclosure, an electronic device (e.g., the electronic device 200 in FIG. 2) may include a housing (e.g., the housing 300 in FIG. 2). The electronic device may include an antenna structure (e.g., the antenna structure 5 in FIG. 3) positioned within the housing. The antenna structure may include a printed circuit board (e.g., the printed circuit board 7 in FIG. 7). The printed circuit board may have a first surface (e.g., a first surface 7A in FIG. 7) and a second surface (e.g., the second surface 7B in FIG. 7) opposite to the first surface. The antenna structure may include a conductive pattern (e.g., the conductive pattern 9 in FIG. 7) positioned inside the printed circuit board. The printed circuit board may include a first conductive layer (e.g., the first conductive layer 701 in FIG. 9). The first conductive layer may be located closer to the first surface than to the second surface. The first conductive layer may include a first antenna element (e.g., the first antenna element ①) in FIG. 7) and a second antenna element (e.g., the second antenna element ② in FIG. 7) wherein the first antenna and the second antenna are non-overlapping when viewed from above the first surface. The printed circuit board may include a second conductive layer (e.g., the second conductive layer 702 in FIG. 9) located closer to the second surface than the first conductive layer. The second conductive layer may form a ground plane. The printed circuit board may include a dielectric (e.g., the dielectric 703 in FIG. 9) positioned between the first conductive layer and the second conductive layer. The conductive pattern may be electrically connected to the ground plane through one or more conductive vias (e.g., the plurality of fourth conductive vias (V41, V42, V43, V44) in FIG. 8) disposed in the printed circuit board. The conductive pattern may be located between the first conductive layer and the second conductive layer and physically separated from the first conductive layer and the second conductive layer. The conductive pattern may at least partially overlap with the first antenna element when viewed from above the first surface. The conductive pattern may include an opening (e.g., the opening 901 in FIG. 8).

According to an embodiment of the disclosure, the opening (e.g., the opening 901 in FIG. 8) may have a meander-shaped pattern (e.g., the meander pattern 902 in FIG. 8).

According to an embodiment of the disclosure, the conductive pattern (e.g., the conductive pattern 9 in FIG. 8) may include, when viewed from above the first surface (e.g., the first surface 7A in FIG. 7), a first area (e.g., the first area 91 in FIG. 8) overlapping with the first antenna element (e.g., the first antenna element ① in FIG. 8) and a second area (e.g., the second area 92 in FIG. 8) that does not overlap with the first antenna element. The one or more conductive vias (e.g., the plurality of fourth conductive vias (V41, V42, V43, V44 in FIG. 8) may electrically connect the second area and the ground plane (e.g., the second conductive layer 702 in FIG. 9) to each other.

According to an embodiment of the disclosure, the opening (e.g., the opening 901 in FIG. 8) may extend to the first area (e.g., the first area 91 in FIG. 8) from the second area (e.g., the second area 92 in FIG. 8).

According to an embodiment of the disclosure, the printed circuit board (e.g., the printed circuit board 7 in FIG. 7) may further include a first electrical path (e.g., the first electrical path (EP1) in FIG. 7) configured to provide radiation current to the first antenna element (e.g., the first antenna element ① in FIG. 7), and a second electrical path (e.g., the second electrical path (EP2) in FIG. 7) for configured to provide radiation current to the second antenna element (e.g., the second antenna element ② in FIG. 7). The first electrical path and the second electrical path may extend between the first antenna element and the second antenna element when viewed from above the first surface (e.g., the first surface 7A in FIG. 7).

According to an embodiment of the disclosure, the electronic device may further include a matching circuit disposed on the printed circuit board. The matching circuit may be electrically connected to the first electrical path (e.g., the first electrical path (EP1) in FIG. 7).

According to an embodiment of the disclosure, the one or more conductive vias may include at least one first conductive via (e.g., the first conductive via structure 2601 in FIG. 26) and at least one second conductive via (e.g., the second conductive via structure 2602 in FIG. 26). The at least one first conductive via may be located closer to the first antenna element (e.g., the first antenna element ① in FIG. 26) than the at least one second conductive via when viewed from above the first surface (e.g., the first surface 7A in FIG. 26).

According to an embodiment of the disclosure, a first distance (e.g., the first distance (D1) in FIG. 10) at which the conductive pattern (e.g., the conductive pattern 9 in FIG. 10) is spaced apart from the first antenna element (e.g., the first antenna element ① in FIG. 10) in a first direction (e.g., the +z-axis direction in FIG. 10) facing the second surface from the first surface may be greater than a second distance (e.g., the second distance (D2) in FIG. 10) at which the conductive pattern is spaced apart from the second conductive layer (e.g., the second conductive layer 702 in FIG. 10) in a second direction (e.g., the −z axis direction in FIG. 10).

According to an embodiment of the disclosure, the electronic device may further include a switching circuit (e.g., the switching circuit 2704 in FIG. 27) disposed on the printed circuit board (e.g., the printed circuit board 7 in FIG. 7). The one or more conductive vias may include at least one first conductive via (e.g., the first conductive via structure 2601 in FIG. 6) and at least one second conductive via (e.g., the second conductive via structure 2062 in FIG. 6). The switching circuit may electrically connect the conductive pattern to the ground plane (e.g., the third conductive area 2703 in FIG. 27) through the at least one first conductive via, or may connect the conductive pattern to the ground plane through the at least one second conductive via.

According to an embodiment of the disclosure, the electronic device may further include a processor (e.g., the processor 120 of FIG. 1). The processor may control the switching circuit (e.g., the switching circuit 2704 in FIG. 27) according to a frequency of a signal transmitted and/or received through the antenna structure (e.g., the antenna structure 5 in FIG. 7).

According to an embodiment of the disclosure, the antenna structure (e.g., the antenna structure 5 in FIG. 7) may transmit and/or receive a signal in a frequency band related to an UWB.

According to an embodiment of the disclosure, the electronic device may further include a wireless communication circuit (e.g., the wireless communication module 192 in FIG. 1) configured to transmit and/or receive a signal in a selected or designated frequency band through the antenna structure (e.g., the antenna structure 5 in FIG. 7). The electronic device may further include a processor (e.g., the processor 120 in FIG. 1) electrically connected to the wireless communication circuit, and the processor may be configured to perform a positioning function with respect to a signal source, based on signals received through the first antenna element (e.g., the first antenna element ① in FIG. 7) and the second antenna element (e.g., the second antenna element ② in FIG. 7).

According to an embodiment of the disclosure, the printed circuit board (e.g., the printed circuit board 7 in FIG. 7) may further include a third antenna element (e.g., the third antenna element ③ in FIG. 7) included in the first conductive layer (e.g., the first conductive layer 701 in FIG. 9). When viewed from above the first surface (e.g., the first surface 7A in FIG. 7), the first antenna element (e.g., the first antenna element ①) in FIG. 7) and the second antenna element (e.g., the second antenna element ② in FIG. 7) may be spaced apart from each other in a first direction (e.g., the y-axis direction in FIG. 7), and the first antenna element and the third antenna element may be spaced apart from each other in a second direction (e.g., the x-axis direction in FIG. 7) substantially perpendicular to the first direction. The conductive pattern (e.g., the conductive pattern 9 in FIG. 8) may include a first area (e.g., the first area 91 in FIG. 8) overlapping with the first antenna element, and a second area (e.g., the second area 92 in FIG. 8) positioned between the first antenna element and the third antenna element when viewed from above the first surface.

According to an embodiment of the disclosure, the printed circuit board (e.g., the printed circuit board 7 in FIG. 7) may include a flexible printed circuit board.

According to an embodiment of the disclosure, the housing (e.g., the housing 300 in FIG. 2) may provide a front surface of the electronic device (e.g., the front surface 300A in FIG. 2), a rear surface device (e.g., the rear surface 300B in FIG. 3) of the electronic device, and a side surface (e.g., the side surface 300C in FIG. 3) of the electronic device. The electronic device may further include a display positioned in the housing, and the display may be visually exposed through the front surface. The first surface (e.g., the first surface 7A in FIG. 7) may face the rear surface.

According to an embodiment of the disclosure, an antenna structure (e.g., the antenna structure 5 in FIG. 3) may include a printed circuit board (e.g., the printed circuit board 7 in FIG. 7). The printed circuit board may include a first surface (e.g., the first surface 7A in FIG. 7) and a second surface (e.g., the second surface 7B in FIG. 7) opposite to the first surface. The antenna structure may include a conductive pattern (e.g., the conductive pattern 9 in FIG. 7) positioned inside the printed circuit board. The printed circuit board may include a first conductive layer (e.g., the first conductive layer 701 in FIG. 9). The first conductive layer may be located closer to the first surface than to the second surface. The first conductive layer may include a first antenna element (e.g., the first antenna element ①) in FIG. 7) and a second antenna element (e.g., the second antenna element ② in FIG. 7), wherein the second antenna is non-overlapping with the first antenna. The printed circuit board may include a second conductive layer (e.g., the second conductive layer 702 in FIG. 9) located closer to the second surface than the first conductive layer. The second conductive layer forming a ground plane. The printed circuit board may include a dielectric (e.g., the dielectric 703 in FIG. 9) positioned between the first conductive layer and the second conductive layer. The conductive pattern may be electrically connected to the ground plane through one or more conductive vias (e.g., the plurality of fourth conductive vias (V41, V42, V43, V44) in FIG. 8) included in the printed circuit board. The conductive pattern may be located between the first conductive layer and the second conductive layer and physically separated from the first conductive layer and the second conductive layer. The conductive pattern may at least partially overlap with the first antenna element when viewed from above the first surface. The conductive pattern may include an opening (e.g., the opening 901 in FIG. 8).

According to an exemplary embodiment of the disclosure, the opening (e.g., the opening 901 in FIG. 8) may have a meander-shaped pattern (e.g., the meander pattern 9020 in FIG. 8).

According to an exemplary embodiment of the disclosure, the conductive pattern (e.g., the conductive pattern 9 in FIG. 8) may include, when viewed from above the first surface (e.g., the first surface 7A in FIG. 8), a first area (e.g., the first area 91 in FIG. 8) overlapping with the first antenna element (e.g., the first antenna element ① in FIG. 8) and a second area (e.g., the second area 92 in FIG. 8) which non-overlapping with the first antenna element. The one or more conductive vias (e.g., the plurality of fourth conductive vias (V41, V42, V43, V44) in FIG. 8) may electrically connect the second area and the ground plane (e.g., the second conductive layer 702 in FIG. 9) to each other.

According to an exemplary embodiment of the disclosure, the opening (e.g., the opening 901 in FIG. 8) may extend to the first area (e.g., the first area 91 in FIG. 8) from the second area (e.g., the second area 92 in FIG. 8).

According to an exemplary embodiment of the disclosure, the printed circuit board (e.g., the printed circuit board 7 in FIG. 7) may further include a first electrical path (e.g., the first electrical path (EP1) in FIG. 7) configured to provide a radiation current to the first antenna element (e.g., the first antenna element ① in FIG. 7), and a second electrical path (e.g., the second electrical path (EP2) in FIG. 7) configured to provide a radiation current to the second antenna element (e.g., the second antenna element ② in FIG. 7). The first electrical path and the second electrical path may extend between the first antenna element and the second antenna element when viewed from above the first surface (e.g., the first surface 7A in FIG. 7).

Embodiments disclosed in the disclosure and drawings are merely presented as specific examples to assist in explaining technical content and help understanding of the embodiments. The embodiments are not intended to limit the scope of the embodiments. Therefore, the scope of certain embodiments of the disclosure should be interpreted as including changes or modifications in addition to the embodiments disclosed herein.

What is claimed is:

1. An electronic device comprising:
- a housing; and
- an antenna structure positioned within the housing, and comprising a printed circuit board and a conductive pattern inside the printed circuit board, the printed circuit board having a first surface and a second surface opposite to the first surface,
- wherein the printed circuit board comprises:
- a first conductive layer located closer to the first surface than to the second surface and comprising a first antenna element and a second antenna element, wherein the first antenna element and the second antenna element are non-overlapping when viewed from above the first surface;
- a second conductive layer comprising a ground plane and located closer to the second surface than the first conductive layer; and
- a dielectric located between the first conductive layer and the second conductive layer, and
- wherein the conductive pattern:
- electrically connects to the ground plane through one or more conductive vias included in the printed circuit board,
- is disposed between the first conductive layer and the second conductive layer, physically separated from the first conductive layer and the second conductive layer,
- at least partially overlaps with the first antenna element when viewed from above the first surface, and
- comprises an opening.

2. The electronic device of claim 1, wherein the opening has a meander-shaped pattern.

3. The electronic device of claim 1, wherein the conductive pattern comprises, when viewed from above the first surface, a first area overlapping with the first antenna element, and a second area which does not overlap with the first antenna element, and
- wherein the one or more conductive vias electrically connect the second area and the ground plane to each other.

4. The electronic device of claim 3, wherein the opening extends to the first area from the second area.

5. The electronic device of claim 1, wherein the printed circuit board further comprises a first electrical path configured to provide radiation current to the first antenna element, and a second electrical path configured to provide radiation current to the second antenna element, and
- wherein the first electrical path and the second electrical path extend between the first antenna element and the second antenna element when viewed from above the first surface.

6. The electronic device of claim 5, further comprising a matching circuit disposed on the printed circuit board,
- wherein the matching circuit is electrically connected to the first electrical path.

7. The electronic device of claim 1, wherein the one or more conductive vias comprise at least one first conductive via and at least one second conductive via, and
- wherein the at least one first conductive via is located closer to the first antenna element than the at least one second conductive via when viewed from above the first surface.

8. The electronic device of claim 1, wherein a first distance separating the conductive pattern is spaced apart from the first antenna element is greater than a second distance separating the conductive pattern from the second conductive layer.

9. The electronic device of claim 1, further comprising a switching circuit disposed on the printed circuit board,
- wherein the one or more conductive vias comprise at least one first conductive via and at least one second conductive via, and
- wherein the switching circuit electrically connects the conductive pattern to the ground plane through the at least one first conductive via or connects the conductive pattern to the ground plane through the at least one second conductive via.

10. The electronic device of claim 9, further comprising a processor,
- wherein the processor controls the switching circuit according to a frequency of a signal transmitted and/or received through the antenna structure.

11. The electronic device of claim 1, wherein the antenna structure transmits and/or receives a signal in a frequency band related to an ultra-wide band (UWB).

12. The electronic device of claim 1, further comprising:

a wireless communication circuit configured to transmit and/or receive a signal in a selected or designated frequency band through the antenna structure; and a processor electrically connected to the wireless communication circuit, wherein the processor is configured to perform a positioning function with respect to a signal source, based on signals received through the first antenna element and the second antenna element.

13. The electronic device of claim 1, wherein the printed circuit board further comprises a third antenna element included in the first conductive layer, wherein, when viewed from above the first surface, the first antenna element and the second antenna element are spaced apart from each other in a first direction, and the first antenna element and the third antenna element are spaced apart from each other in a second direction substantially perpendicular to the first direction, and wherein the conductive pattern comprises a first area overlapping with the first antenna element, and a second area located between the first antenna element and the third antenna element when viewed from above the first surface.

14. The electronic device of claim 1, wherein the printed circuit board comprises a flexible printed circuit board.

15. The electronic device of claim 1, wherein the housing provides a front surface of the electronic device, a rear surface of the electronic device, and a side surface of the electronic device, and further comprises a display located in the housing and visually exposed through the front surface, and wherein the first surface faces the rear surface.

16. An antenna structure comprising:

a printed circuit board comprising a first surface and a second surface opposite to the first surface; and a conductive pattern located inside the printed circuit board, wherein the printed circuit board comprises:

a first conductive layer located closer to the first surface than to the second surface and comprising a first antenna element and a second antenna element, wherein the second antenna element is non-overlapping the first antenna element when viewed from above of the first surface;

a second conductive layer forming a ground plane and located closer to the second surface than the first conductive layer; and a dielectric located between the first conductive layer and the second conductive layer, and wherein the conductive pattern is electrically connected to the ground plane through one or more conductive vias included in the printed circuit board, is located between the first conductive layer and the second conductive layer and physically separated from the first conductive layer and the second conductive layer, at least partially overlaps with the first antenna element when viewed from above the first surface, and comprises an opening.

17. The antenna structure of claim 16, wherein the opening has a meander-shaped pattern.

18. The antenna structure of claim 16, wherein the conductive pattern comprises, when viewed from above the first surface, a first area overlapping with the first antenna element, and a second area non-overlapping with the first antenna element, and wherein the one or more conductive vias electrically connect the second area and the ground plane to each other.

19. The antenna structure of claim 18, wherein the opening extends to the first area from the second area.

20. The antenna structure of claim 16, wherein the printed circuit board further comprises a first electrical path configured to provide radiation current to the first antenna element, and a second electrical path configured to provide radiation current to the second antenna element, and wherein the first electrical path and the second electrical path extend between the first antenna element and the second antenna element when viewed from above the first surface.

* * * * *